(12) United States Patent
Futch et al.

(10) Patent No.: US 7,590,145 B2
(45) Date of Patent: Sep. 15, 2009

(54) MULTIPLEXING OCTETS FROM A DATA FLOW OVER MPEG PACKETS

(75) Inventors: Richard J. Futch, Lawrenceville, GA (US); Thai-Bao H. Kien, Suwanee, GA (US); Bin Yang, Duluth, GA (US); Christopher J. Topazi, Decatur, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 947 days.

(21) Appl. No.: 10/881,258

(22) Filed: Jun. 30, 2004

(65) Prior Publication Data

US 2004/0264511 A1  Dec. 30, 2004

Related U.S. Application Data

(63) Continuation-in-part of application No. 10/245,853, filed on Sep. 17, 2002, now Pat. No. 7,218,901.

(51) Int. Cl.
*H04J 3/16* (2006.01)
(52) U.S. Cl. ...................................... 370/466; 370/537
(58) Field of Classification Search ................. 370/465, 370/466, 474, 467
See application file for complete search history.

(56) References Cited

U.S. PATENT DOCUMENTS

| | | | |
|---|---|---|---|
| 3,573,366 A | 4/1971 | Cavelos | |
| 5,450,621 A | 9/1995 | Kianush et al. | |
| 5,678,223 A | 10/1997 | Callway, Jr. et al. | |
| 5,926,479 A * | 7/1999 | Baran | 370/395.61 |
| 5,987,518 A | 11/1999 | Gotwald | |

(Continued)

FOREIGN PATENT DOCUMENTS

| WO | WO 00/54473 | 9/2000 |
|---|---|---|
| WO | WO 01/15455 | 3/2001 |

OTHER PUBLICATIONS

Clausen H D et al: "MPEG-2 as a Transmission System for Internet Traffic" Performance, Computing and Communications, 1998. IPCC '98, IEEE International Tempe/Phoenix, AZ, USA, Feb. 16-18, 1998 pp. 101-107.

(Continued)

*Primary Examiner*—Ricky Ngo
*Assistant Examiner*—Kan Yuen
(74) *Attorney, Agent, or Firm*—Tarolli, Sundheim, Covell & Tummino LLP

(57) ABSTRACT

Multiplexing of information from a plurality of information flows into fixed-length packets such as, but not limited to, MPEG packets allows efficient utilization of bandwidth and also can be used to reduce transmission latency. In addition, utilizing MPEG packets and transport streams for octet multiplexing allows the packets carrying octet-multiplexed data to easily be integrated with other MPEG packets for other services that are commonly found in cable transmission networks of all coax, hybrid fiber coax, and/or all fiber. Moreover, the multiplexing techniques described herein will work in both wired (or constrained media) and wireless (or free-space propagation) environments. The multiplexing/demultiplexing of octets using MPEG packets generally is described by mappings that specify the use of octets in MPEG packets. Changes to allocations in a map generally should be propagated in a way that reliably ensures that both the transmitter and receiver have a consistent view of the octet mappings.

42 Claims, 29 Drawing Sheets

U.S. PATENT DOCUMENTS

| | | | |
|---|---|---|---|
| 6,028,900 | A | 2/2000 | Taura et al. |
| 6,058,118 | A | 5/2000 | Rault |
| 6,400,720 | B1 * | 6/2002 | Ovadia et al. .......... 370/395.64 |
| 6,601,209 | B1 * | 7/2003 | Lewis et al. ................. 714/756 |
| 6,870,861 | B1 * | 3/2005 | Negishi et al. .............. 370/537 |
| 6,873,603 | B1 * | 3/2005 | Ivaturi ........................ 370/255 |
| 6,885,661 | B1 * | 4/2005 | Hopper et al. .............. 370/354 |
| 7,085,261 | B2 * | 8/2006 | Ethridge et al. ............. 370/352 |
| 2001/0015985 | A1 * | 8/2001 | Van Grinsven et al. ...... 370/471 |
| 2002/0007494 | A1 | 1/2002 | Hodge |
| 2003/0053476 | A1 | 3/2003 | Sorenson |
| 2003/0053493 | A1 | 3/2003 | Mobley |
| 2004/0264511 | A1 | 12/2004 | Futch |
| 2006/0285551 | A1 * | 12/2006 | Barker et al. ................ 370/465 |

OTHER PUBLICATIONS

DAVIC Intranet, Technical Platform Specification DAVIC 1.5 Specification Revision 1.0 Geneva, Switzerland 1999.

DAVIC Cable Modem DAVIC 1.5 Specification Revision 3.1 Geneva, Switzerland 1999.

Data-Over-Cable Service Interface Radio Frequency Interface Specification SP-FRI-105-9911105 Cable Television Laboratories, Inc. 1999.

* cited by examiner

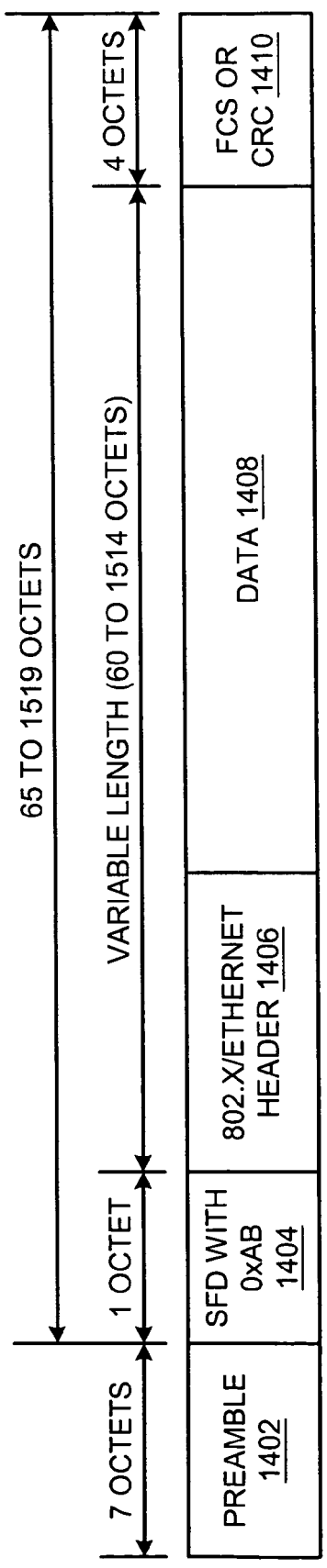
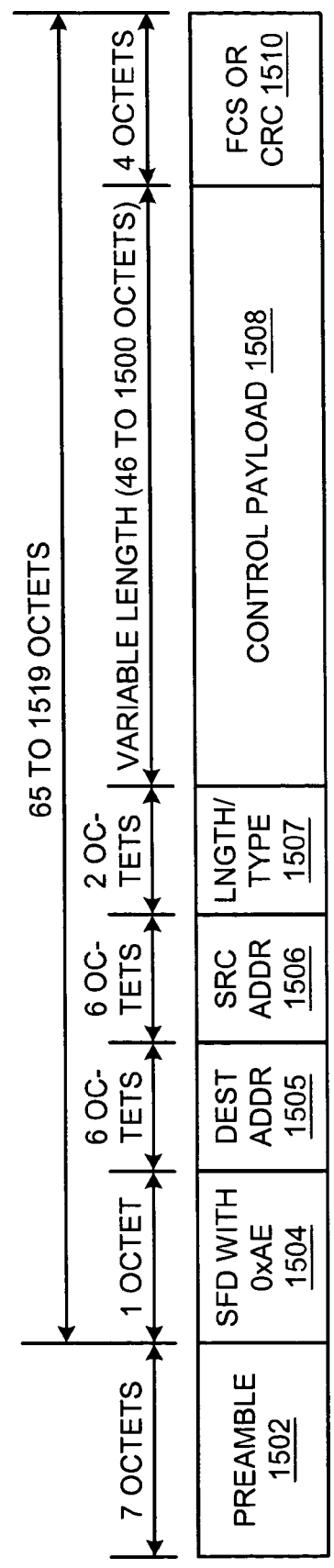
FIG. 14 - PRIOR ART
FIG. 15

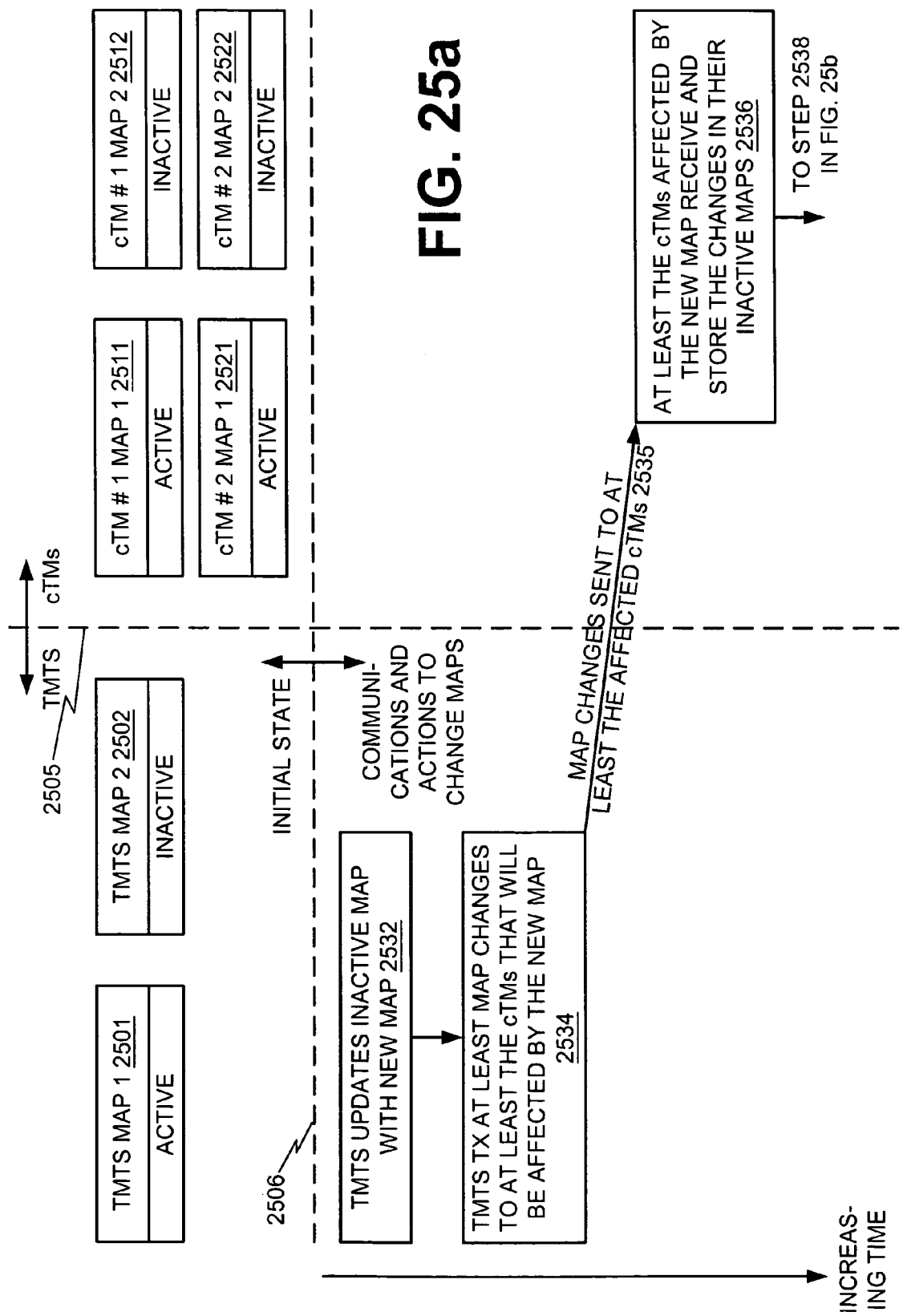

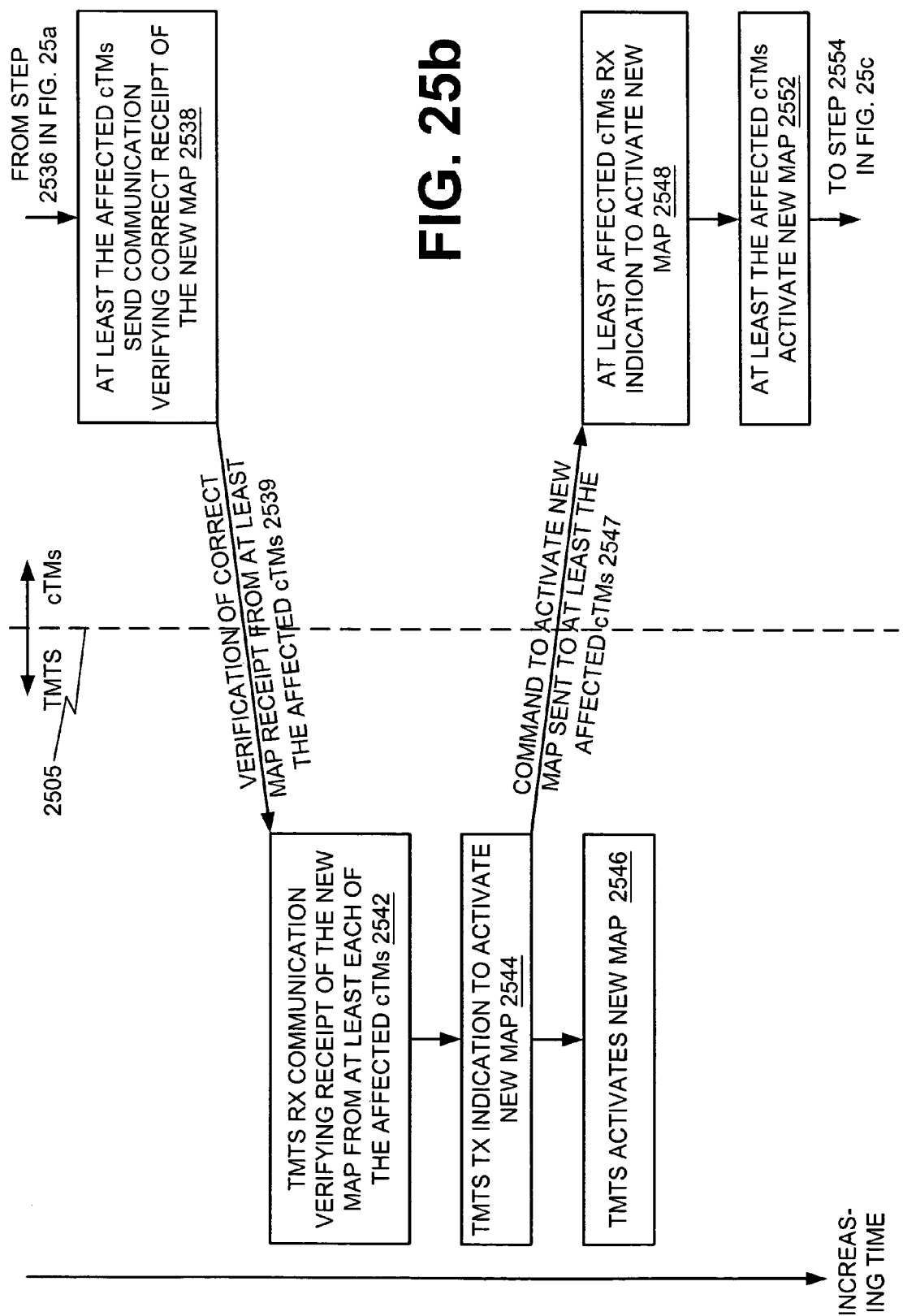

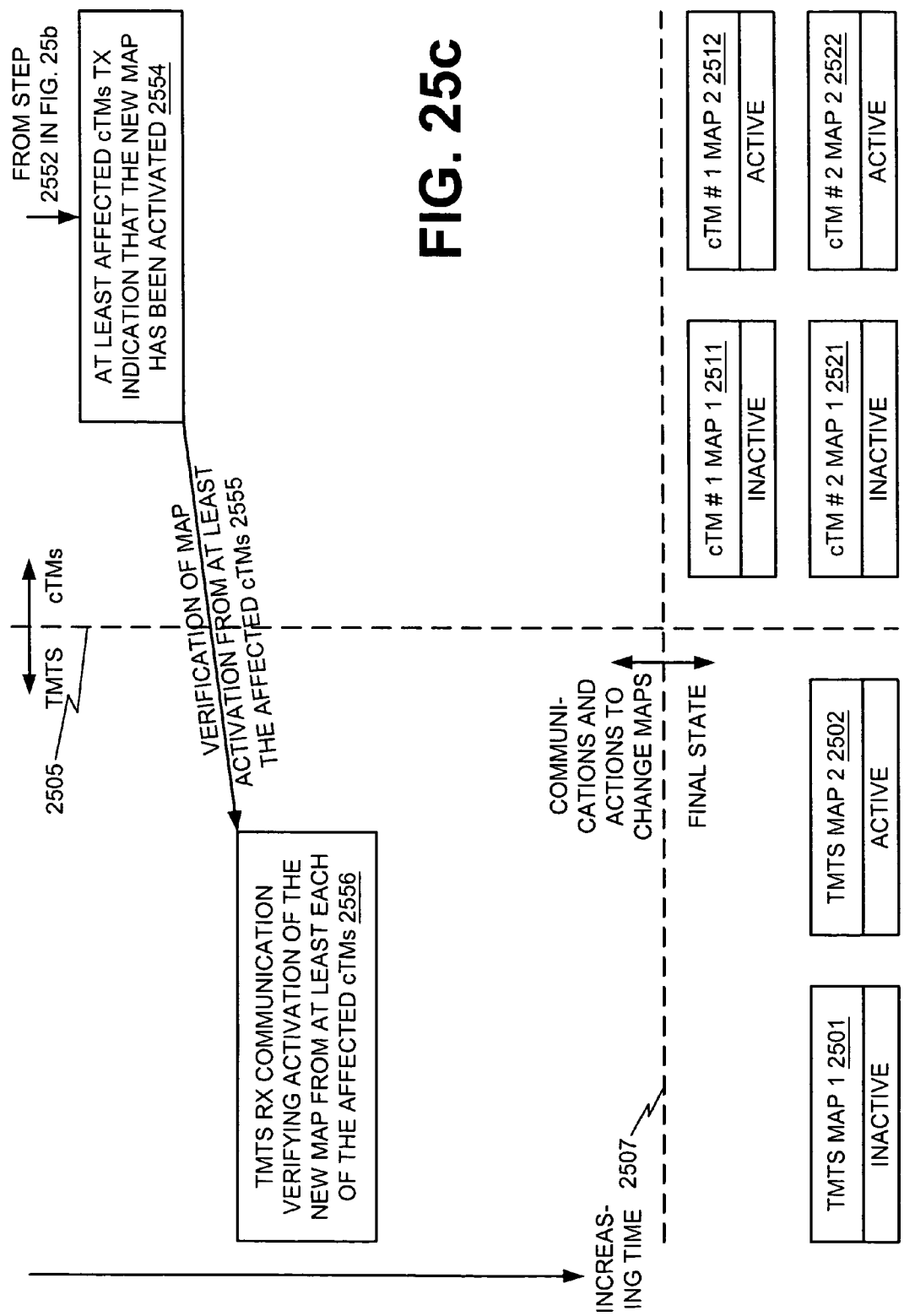

MULTIPLEXING OCTETS FROM A DATA FLOW OVER MPEG PACKETS

CROSS-REFERENCE TO RELATED PATENT APPLICATIONS

This present application is a continuation-in-part that claims priority to U.S. application having Ser. No. 10/245,853, which was filed on Sep. 17, 2002 now U.S. Pat. No. 7,218,901 and is entirely incorporated herein by reference.

Furthermore, the present application is related to 6 patent applications that were previously filed on Sep. 17, 2002. The 6 patent applications listed by serial number and title are the following:

- Ser. No. 10/245,054—"Allocation of Bit Streams for Communication over Multi-Carrier Frequency-Division Multiplexing (FDM)"
- Ser. No. 10/245,250—"MPEG Program Clock Reference (PCR) Delivery for Support of Accurate Network Clocks"
- Ser. No. 10/244,899—"Multi-Carrier Frequency-Division Multiplexing (FDM) Architecture for High Speed Digital Service"
- Ser. No. 10/245,179—"Multi-Carrier Frequency-Division Multiplexing (FDM) Architecture for High Speed Digital Service in Local Networks"
- Ser. No. 10/245,853—"Ethernet over Multi-Carrier Frequency-Division Multiplexing (FDM)"
- Ser. No. 10/245,032—"Mapping of Bit Streams into MPEG Frames"

FIELD OF THE INVENTION

The present invention relates generally to the field of communication networks and systems for using multiplexing to carry data across broadband networks with the potential to support a plurality of subscribers at high data rates.

BACKGROUND OF THE INVENTION

Many solutions have been tried for delivering digital data services to customers over cable networks. Historically, cable networks were designed for community antenna television (CATV) delivery supporting 6 MHz analog channels that were frequency-division multiplexed into a radio-frequency (RF) medium that was primarily coaxial cable or coax. To support higher throughput and advanced digital services, many of these cable TV networks migrated to a hybrid fiber-coax (HFC) architecture. With the development of HFC networks to support advanced services, such as digital television channels, the capability to provide bi-directional data services also evolved.

At present bi-directional data services are often available to customers using systems based upon the DOCSIS (Data-Over-Cable Service Interface Specifications) industry standards promulgated by Cable Television Laboratories or CableLabs. The DOCSIS standards comprise many documents that specify mechanisms and protocols for carrying digital data between a cable modem (CM), generally located at a customer premises, and a cable modem termination system (CMTS), commonly located within the headend of the service provider. Within distribution networks in the cable industry, data flowing from a service provider to a customer premises is commonly referred to as downstream traffic, while data flowing from a customer premises to a service provider is generally known as upstream traffic. Although DOCSIS is a bridged architecture that is capable of carrying other network protocols besides and/or in addition to the Internet Protocol (IP), it is primarily designed and used for Internet access using IP.

Furthermore, for many cable system operators (also known as multiple system operators or MSOs) the primary market for selling services such as cable TV, Internet access, and/or local phone services has been residential customers. Although DOCSIS cable modems could be used by business customers, DOCSIS was primarily designed to meet the Internet access needs of residential users. To make the deployment of DOCSIS systems economically feasible, the DOCSIS standards were designed to support a large number of price-sensitive residential, Internet-access users on a single DOCSIS system. Though home users may desire extremely high speed Internet access, generally they are unwilling to pay significantly higher monthly fees. To handle this situation DOCSIS was designed to share the bandwidth among a large number of users. In general, DOCSIS systems are deployed on HFC networks supporting many CATV channels. In addition, the data bandwidth used for DOCSIS generally is shared among multiple users using a time-division multiple-access (TDMA) process.

In the downstream direction the DOCSIS CMTS transmits to a plurality of cable modems that may share at least one downstream frequency. In effect the CMTS dynamically or statistically time-division multiplexes downstream data for a plurality of cable modems. In general, based on destination addresses the cable modems receive this traffic and forward the proper information to user PCs or hosts. In the upstream direction the plurality of cable modems generally contend for access to transmit at a certain time on an upstream frequency. This contention for upstream slots of time has the potential of causing collisions between the upstream transmissions of multiple cable modems. To resolve these and many other problems resulting from multiple users sharing an upstream frequency channel to minimize costs for residential users, DOCSIS implements a media access control (MAC) algorithm. The DOCSIS layer 2 MAC protocol is defined in the DOCSIS radio frequency interface (RFI) specifications, versions 1.0, 1.1, and/or 2.0. DOCSIS RFI 2.0 actually introduces a code division multiple access (CDMA) physical layer that may be used instead of or in addition to the TDMA functionality described in DOCSIS RFI 1.0 and/or 1.1.

However, the design of DOCSIS to provide a large enough revenue stream by deploying systems shared by a large number of residential customers has some drawbacks. First, the DOCSIS MAC is generally asymmetric with respect to bandwidth, with cable modems contending for upstream transmission and with the CMTS making downstream forwarding decisions. Also, though DOCSIS supports multiple frequency channels, it does not have mechanisms to quickly and efficiently allocate additional frequency channels to users in a dynamic frequency-division multiple access (FDMA) manner. Furthermore, while the data rates of DOCSIS are a vast improvement over analog dial-up V.90 modems and Basic Rate Interface (BRI) ISDN (integrated services digital network) lines, the speeds of DOCSIS cable modems are not significantly better than other services which are targeted at business users.

Because businesses generally place high value on the daily use of networking technologies, these commercial customers often are willing to pay higher fees in exchange for faster data services than are available through DOCSIS. The data service needs of businesses might be met by using all-fiber optic networks with their large bandwidth potential. However, in many cases fiber optic lines are not readily available between business locations. Often new installations of fiber optic lines, though technically feasible, are cost prohibitive based on factors such as having to dig up the street to place the lines. Also, in many cases the devices used in optical transmission (including, but not limited to, fiber optic lines) are relatively newer than the devices used in electrical transmission (including, but not limited to coax cable transmission lines). (Both electrical and optical transmission systems may use constrained media such as, but not limited to, electrical conductors, waveguides, and/or fiber as well as unconstrained media in wireless and/or free-space transmission.) As a result, generally more development time has been invested in simplifying and reducing the costs of devices used in electrical communication systems, such as but not limited to coax CATV systems, than the development time that has been invested in devices used in optical communication systems. Thus, although fiber optics certainly has the capability of offering high data rates, these issues tend to drive up the costs of fiber optic communication systems.

Furthermore, in deploying networks to support primarily residential access, the transmission lines of the MSOs generally run past many businesses. Thus, a technical solution that functions over existing HFC networks of the MSOs, that provides higher data rates than DOCSIS, and that has the capability of working in the future over all fiber networks is a distinct improvement over the prior art and has the capability of meeting the needs of a previously untapped market segment.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The reference numbers in the drawings have at least three digits with the two rightmost digits being reference numbers within a figure. The digits to the left of those two digits are the number of the figure in which the item identified by the reference number first appears. For example, an item with reference number 211 first appears in FIG. 2.

FIG. 14 shows the IEEE 802.3/ethernet frame format.

FIG. 15 shows the control frame format.

FIG. 25a shows the initial state of two maps for the TMTS, cTM #1, and cTM #2, and also shows the first of three parts of communications and actions to change the TMTS and cTM maps.

FIG. 25b shows the second of three parts of communications and actions to change the TMTS and cTM maps.

FIG. 25c shows the third of three parts of communications and actions to change the TMTS and cTM maps and also shows the final state of two maps for the TMTS, cTM #1, and cTM #2.

DETAILED DESCRIPTION

Figure 1:
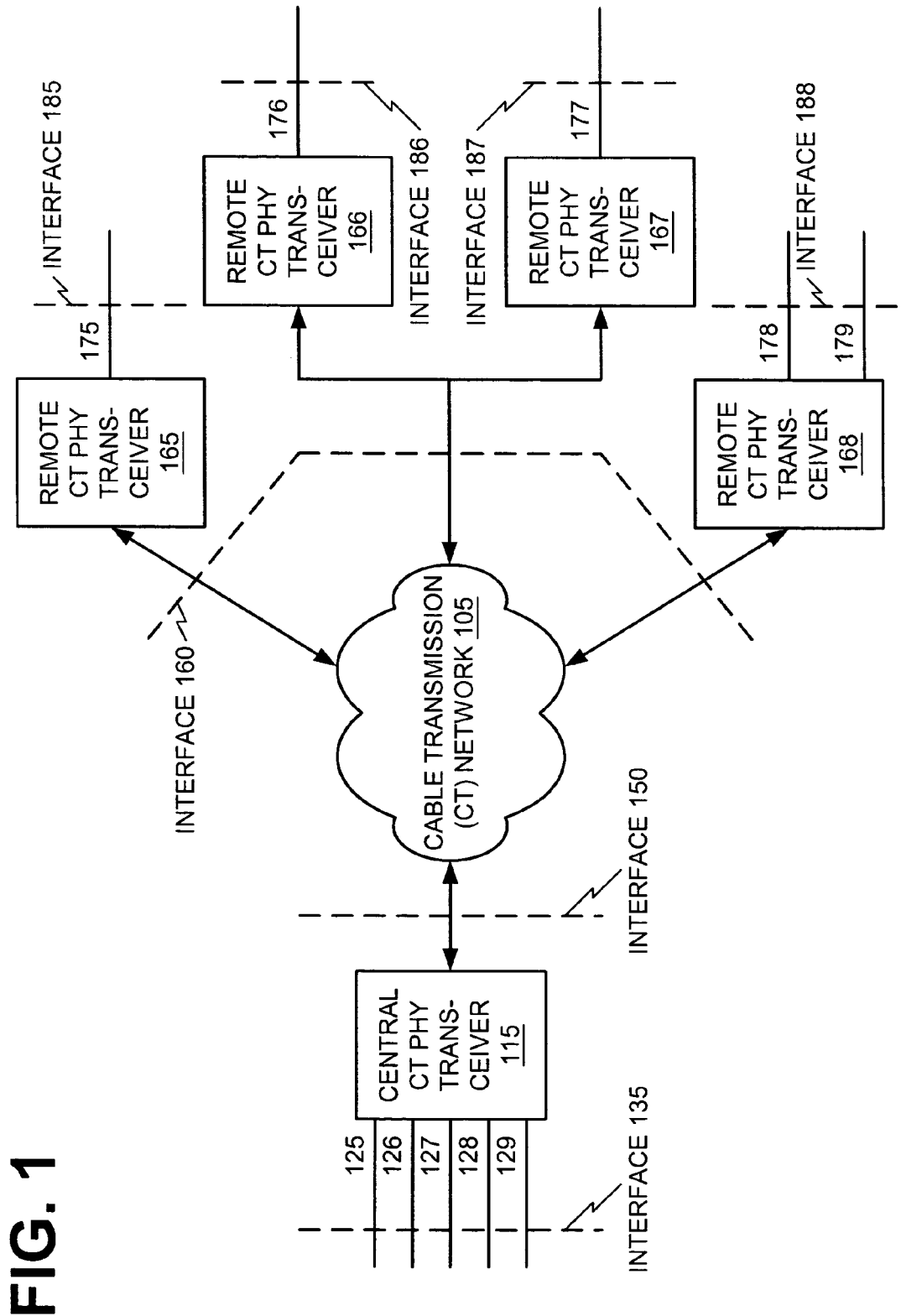
FIG. 1 shows a block diagram of central and remote transceivers connected to a cable transmission network.

In general, the seven-layer Open Systems Interconnect (OSI) model is a useful abstraction in analyzing and describing communication protocols and/or systems. The seven layers of the OSI model from lowest to highest are: 1) the physical layer, 2) the data link layer, 3) the network layer, 4) the transport layer, 5) the session layer, 6) the presentation layer, and 7) the application layer. This OSI model is well-known to those of ordinary skill in the art. Furthermore, the OSI model layers have often been broken down into sublayers in various contexts. For example, the level two, data link layer may be divided into a medium access control (MAC) sublayer and a logical link control (LLC) sublayer in the documentation of the IEEE (Institute for Electrical and Electronic Engineers) standard 802. Furthermore, some of the IEEE standards (such as for 100 Mbps fast ethernet and 1 Gbps gigabit ethernet) break level one (i.e., the physical layer) down into sublayers such as, but not limited to, the physical coding sublayer (PCS), the physical medium attachment layer (PMA), and the physical media dependent (PMD) sublayer. These sublayers are described more fully in the IEEE 802 specifications and more specifically in the IEEE 802.3/ethernet specifications. The specifications of IEEE 802 (including, but not limited to, IEEE 802.3) are incorporated by reference in their entirety herein.

In general, the preferred embodiments of the present invention comprise physical layer protocols that may be implemented in physical layer transceivers. The physical layer interfaces and/or protocols of the preferred embodiments of the present invention may be incorporated into other networking methods, devices, and/or systems to provide various types of additional functionality. Often the behavior and capabilities of networking devices are categorized based on the level of the OSI model at which the networking device operates.

Repeater, bridge, switch, router, and gateway are some commonly used terms for interconnection devices in networks. Though these terms are commonly used in networking their definition does vary from context to context, especially with respect to the term switch. However, a brief description of some of the terms generally associated with various types of networking devices may be useful. Repeaters generally operate at the physical layer of the OSI model. In general, digital repeaters interpret incoming digital signals and generate outgoing digital signals based on the interpreted incoming signals. Basically, repeaters act to repeat the signals and generally do not make many decisions as to which signals to forward. As a non-limiting example, most ethernet hubs are repeater devices. Hubs in some contexts are called layer one switches. In contrast to repeaters, bridges and/or layer-two switches generally operate at layer two of the OSI model and evaluate the data link layer or MAC layer (or sublayer) addresses in incoming frames. Bridges and/or layer two switches generally only forward frames that have destination addresses that are across the bridge. Basically, bridges or layer two switches generally are connected between two shared contention media using media access control (MAC) algorithms. In general, a bridge or layer two switch performs an instance of a MAC algorithm for each of its interfaces. In this way, bridges and/or layer two switches generally may be used to break shared or contention media into smaller collision domains.

Routers (and layer three switches) generally make forwarding decisions based at least upon the layer three network addresses of packets. Often routers modify the frames transversing the router by changing the source and/or destination data link, MAC, or hardware addresses when a packet is forwarded. Finally, the more modern usage of the term gateway refers to networking devices that generally make forwarding decisions based upon information above layer three, the network layer. (Some older Internet usage of the term gateway basically referred to devices performing a layer three routing function as gateways. This usage of the term gateway is now less common.)

One skilled in the art will be aware of these basic categories of networking devices. Furthermore, often actual networking devices incorporate functions that are hybrids of these basic categories. Generally, because the preferred embodiments of the present invention comprise a physical layer, the preferred embodiments of the present invention may be utilized in repeaters, bridges, switches, routers, gateways, hybrid devices and/or any other type of networking device that utilizes a physical layer interface. "Routing and Switching: Time of Convergence", which was published in 2002, by Rita Puzmanova and "Interconnections, Second Edition: Bridges, Router, Switches, and Internetworking Protocols", which was published in 2000, by Radia Perlman are two books describing some of the types of networking devices that might potentially utilize the preferred embodiments of the present invention. These two books are incorporated in their entirety by reference herein.

Overview

In general, the preferred embodiments of the present invention(s) involve many concepts. Because of the large number of concepts of the preferred embodiments of the present invention, to facilitate easy reading and comprehension of these concepts, the document is divided into sections with appropriate headings. None of these headings are intended to imply any limitations on the scope of the present invention(s). In general, the "Network Model" section at least partially covers the forwarding constructs of the preferred embodiments of the present invention(s). The section entitled "Integration Into Existing Cable Network Architectures" generally relates to utilization of the preferred embodiments of the present invention in cable network architectures. The "Protocol Models" section describes a non-limiting abstract model that might be used to facilitate understanding of the preferred embodiments of the present invention(s). The "Frame Management Sublayer (FMS) Data Flows" section describes the formation of FMS data flows. The section entitled "MPEG Packets" describes the format of MPEG packets as utilized in the preferred embodiments of the present invention(s). The "Network Clocking" section generally covers distribution of the network clock.

The "Downstream Multiplexing" section generally covers the downstream multiplexing using MPEG packets in the preferred embodiments of the present invention(s). The "Upstream Multiplexing" section generally relates to upstream multiplexing across one or more active tones. The section entitled "Division of Upstream Data" generally relates to the division of data into blocks for forward error correction (FEC) processing and to the formation of superframes lasting 2048 symbol clock periods. The next section is entitled "Upstream Client Transport Modem (cTM) Inverse Multiplexing Sublayer (IMS)" and generally covers upstream multiplexing in a client transport modem. The section entitled "Upstream Transport Modem Termination System (TMTS) Inverse Multiplexing Sublayer (IMS)" generally covers upstream multiplexing in a transport modem termination system.

In addition, the section entitled "Downstream Client Transport Modem (cTM) Demodulation and Physical Coding Sublayer (PCS)" generally relates to cTM downstream demodulation. The section entitled "Upstream Client Transport Modem (cTM) Modulation and Physical Coding Sublayer (PCS)" generally covers cTM upstream modulation. The next section is entitled "Upstream Transport Modem Termination System (TMTS) Demodulation and Physical Coding Sublayer (PCS)" and generally covers TMTS upstream demodulation. Also, the section entitled "Upstream Forward Error Correction (FEC) and Non-Limiting Example with Four Active Tones at 256 QAM, 64 QAM, 16 QAM, and QPSK Respectively" generally relates to forward error correction. Finally, the section entitled "Client Transport Modem (cTM) and Transport Modem Termination System (TMTS) Physical Medium Dependent (PMD) Sublayer" generally relates to physical medium dependent sublayer interfaces.

Network Model

FIG. 1 generally shows one preferred embodiment of the present invention. In general, the preferred embodiment of the present invention allows physical layer connectivity over a cable transmission network 105. One skilled in the art will be aware of the types of technologies and devices used in a cable transmission (CT) network 105. Furthermore, many of the devices and technologies are described in "Modem Cable Television Technology: Video, Voice, and Data Communications", which was published in 1999, by Walter Ciciora, James Farmer, and David Large. CT network 105 generally has evolved from the networks designed to allow service providers to deliver community antenna television (CATV, also known as cable TV) to customers or subscribers. However, the networking technologies in CATV may be used by other environments.

Often the terms service provider and subscriber or customer are used to reference various parts of CATV networks and to provide reference points in describing the interfaces found in CATV networks. Usually, the CATV network may be divided into service provider and subscriber or customer portions based on the demarcation of physical ownership of the equipment and/or transmission facilities. Though some of the industry terms used herein may refer to service provider and/or subscriber reference points and/or interfaces, one of ordinary skill in the art will be aware that the preferred embodiments of the present invention still apply to networks regardless of the legal ownership of specific devices and/or transmission facilities in the network. Thus, although cable transmission (CT) network 105 may be a CATV network that is primarily owned by cable service providers or multiple system operators (MSOs) with an interface at the customer or subscriber premises, one skilled in the art will be aware that the preferred embodiments of the present invention will work even if ownership of all or portions of cable transmission (CT) network 105 is different than the ownership commonly found in the industry. Thus, cable transmission (CT) network 105 may be privately owned.

As one skilled in the art will be aware, cable transmission (CT) network 105 generally is designed for connecting service providers with subscribers or customers. However, the terms service provider and subscriber or customer generally are just used to describe the relative relationship of various interfaces and functions associated with CT network 105. Often the service-provider-side of CT network 105 is located at a central site, and there are a plurality of subscriber-side interfaces located at various remote sites. The terms central and remote also are just used to refer to the relative relationship of the interfaces to cable transmission (CT) network 105. Normally, a headend and/or distribution hub is a central location where service provider equipment is concentrated to support a plurality of remote locations at subscriber or customer premises.

Given this relative relationship among equipment connected to cable transmission (CT) network 105, the preferred embodiment of the present invention may comprise a central cable transmission (CT) physical (PHY) layer transceiver 115. The central CT PHY transceiver (TX/RX) 115 generally may have at least one port on the central-side or service-provider-side of the transceiver 115. Ports 125, 126, 127, 128, and 129 are examples of the central-side ports of central CT PHY transceiver 115. In general, interface 135 may define the behavior of central CT PHY transceiver 115 with respect to at least one central-side port such as central-side ports 125, 126, 127, 128, and 129. Interface 135 for the central-side ports 125, 126, 127, 128, and 129 may represent separate hardware interfaces for each port of central CT PHY transceiver 115. However, interface 135 may be implemented using various technologies to share physical interfaces such that central-side ports 125, 126, 127, 128, and 129 may be only logical channels on a shared physical interface or media. These logical channels may use various multiplexing and/or media sharing techniques and algorithms. Furthermore, one skilled in the art will be aware that the central-side ports 125, 126, 127, 128, and 129 of central CT PHY transceiver 115 may be serial and/or parallel interfaces and/or buses.

Therefore, the preferred embodiments of the present invention are not limited to specific implementations of interface 135, and one skilled in the art will be aware of many possibilities. As a non-limiting example, although central CT PHY transceiver 115 generally is for use inside of networking devices, a serial-interface shared medium such as ethernet/802.3 could be used on each of the central-side ports 125, 126, 127, 128, and 129 inside of a networking device. Often the decision to use different technologies for interface 135 will vary based on costs and transmission line lengths.

Central CT PHY transceiver 115 further is connected through interface 150 to cable transmission (CT) network 105. In addition to the central-side or service-provider-side at interface 150 of cable transmission (CT) network 105, interface 160 generally is on the subscriber-side, customer-side, or remote-side of cable transmission (CT) network 105. Generally, at least one remote transceiver (such as remote cable transmission (CT) physical (PHY) transceivers 165, 166, 167, and 168) is connected to interface 160 on the subscriber-side or remote-side of CT network 105. Each remote CT PHY transceiver 165, 166, and 167 is associated with at least one remote-side port, 175, 176, and 177 respectively. Furthermore, remote CT PHY transceiver 168 also is associated with at least one remote-side port, with the two remote-side ports 178 and 179 actually being shown in FIG. 1. Each remote CT PHY transceiver 165, 166, 167, and 168 can be considered to have an interface 185, 186, 187, and 188, respectively, through which it receives information for upstream transmission and through which it delivers information from downstream reception.

In general, digital transceivers (such as central CT PHY transceiver 115 and remote CT PHY transceivers 165, 166, 167, and 168) comprise a transmitter and a receiver as are generally needed to support bi-directional applications. Although the preferred embodiments of the present invention generally are designed for bi-directional communication, the preferred embodiments of the present invention certainly could be used for uni-directional communications without one half of the transmitter/receiver pair in some of the transceivers. In general, digital transmitters basically are concerned with taking discrete units of information (or digital information) and forming the proper electromagnetic signals for transmission over networks such as cable transmission (CT) network 105. Digital receivers generally are concerned with recovering the digital information from the incoming electromagnetic signals. Thus, central CT PHY transceiver 115 and remote CT PHY transceivers 165, 166, 167, and 168 generally are concerned with communicating information between interface 135 and interfaces 185, 186, 187, and 188, respectively. Based on the theories of Claude Shannon, the minimum quanta of information is the base-two binary digit or bit. Therefore, the information communicated by digital transceivers often is represented as bits, though the preferred embodiments of the present invention are not necessarily limited to implementations designed to communicate information in base two bits.

The preferred embodiments of the present invention generally have a point-to-point configuration such that there generally is a one-to-one relationship between the central-side ports 125, 126, 127, 128, and 129 of the central CT PHY transceiver 115 and the remote-side ports 175, 176, 177, 178, and 179, respectively. Like interface 135 for a plurality of central-side ports 125, 126, 127, 128, and 129, interface 188 with a plurality of remote-side ports 178 and 179 may represent separate hardware interfaces for each port of remote CT PHY transceiver 168. However, interface 188 may be implemented using various technologies to share physical interfaces such that remote-side ports 178 and 179 may only be logical channels on a shared physical interface or media. These logical channels may use various multiplexing and/or media sharing techniques and algorithms. Furthermore, one skilled in the art will be aware that the remote-side ports 178 and 179 of remote CT PHY transceiver 168 may be serial and/or parallel interfaces and/or buses.

In general, the preferred embodiments of the present invention comprise a one-to-one or point-to-point relationship between active central-side ports and active remote-side ports such that central-side port 125 may be associated with remote-side port 175, central-side port 126 may be associated with remote-side port 176, central-side port 127 may be associated with remote-side port 177, central-side port 128 may be associated with remote-side port 178, and central-side port 129 may be associated with remote-side port 179. Though this relationship between active central-side ports and active remote-side ports is one-to-one or point-to-point, many technologies such as, but not limited to, multiplexing and/or switching may be used to carry the point-to-point communications between active central-side ports and active remote-side ports.

In general, active ports are allocated at least some bandwidth through cable transmission (CT) network 105. Normally, most dial-up modem phone calls through the public switched telephone network (PSTN) are considered to be point-to-point connections even though the phone call may go through various switches and/or multiplexers that often use time-division multiplexing (TDM). Establishment of an active phone call generally allocates bandwidth in the PSTN to carry the point-to-point communications through the PSTN. In a similar fashion, the preferred embodiments of the present invention generally provide point-to-point connectivity between active ports of the central CT PHY transceiver 115 and the active ports of remote CT PHY transceivers 165, 166, 167, and 168. However, the preferred embodiments of the present invention generally work over cable transmission (CT) network 105, which is not like the generally time-division multiplexed PSTN. (Note: references in this specification to point-to-point should not be limited to the Point-to-Point Protocol, PPP, which generally is only one specific protocol that may be used over point-to-point connections.)

Also, the use of five central-side ports 125, 126, 127, 128, and 129 is not intended to be limiting and is only shown for example purposes. In general, central CT PHY transceiver 115 may support at least one central-side port. In addition, the use of four remote CT PHY transceivers 165, 166, 167, and 168 is only for example purposes and is not intended to be limiting. In general, central CT PHY transceiver 115 might communicate with at least one remote CT PHY transceiver (such as 165, 166, 167, and 168). Also, each remote CT PHY transceiver 165, 166, 167, and 168 may have at least one remote side port, and remote CT PHY transceiver 168 is shown with a plurality of remote-side ports 178 and 179.

Figure 2A:
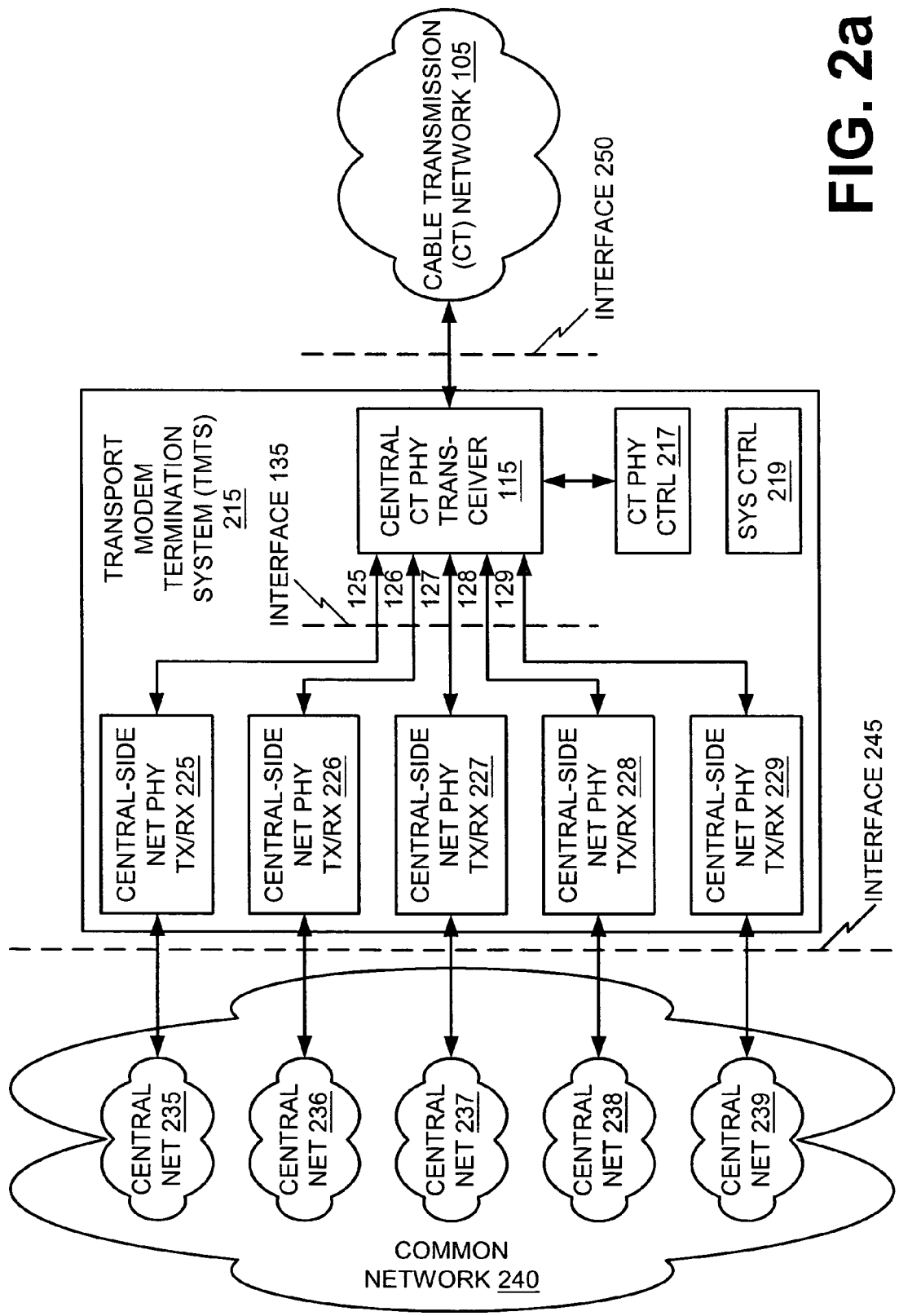
FIG. 2a shows a block diagram of a transport modem termination system connected to a cable transmission network.
Figure 2B:
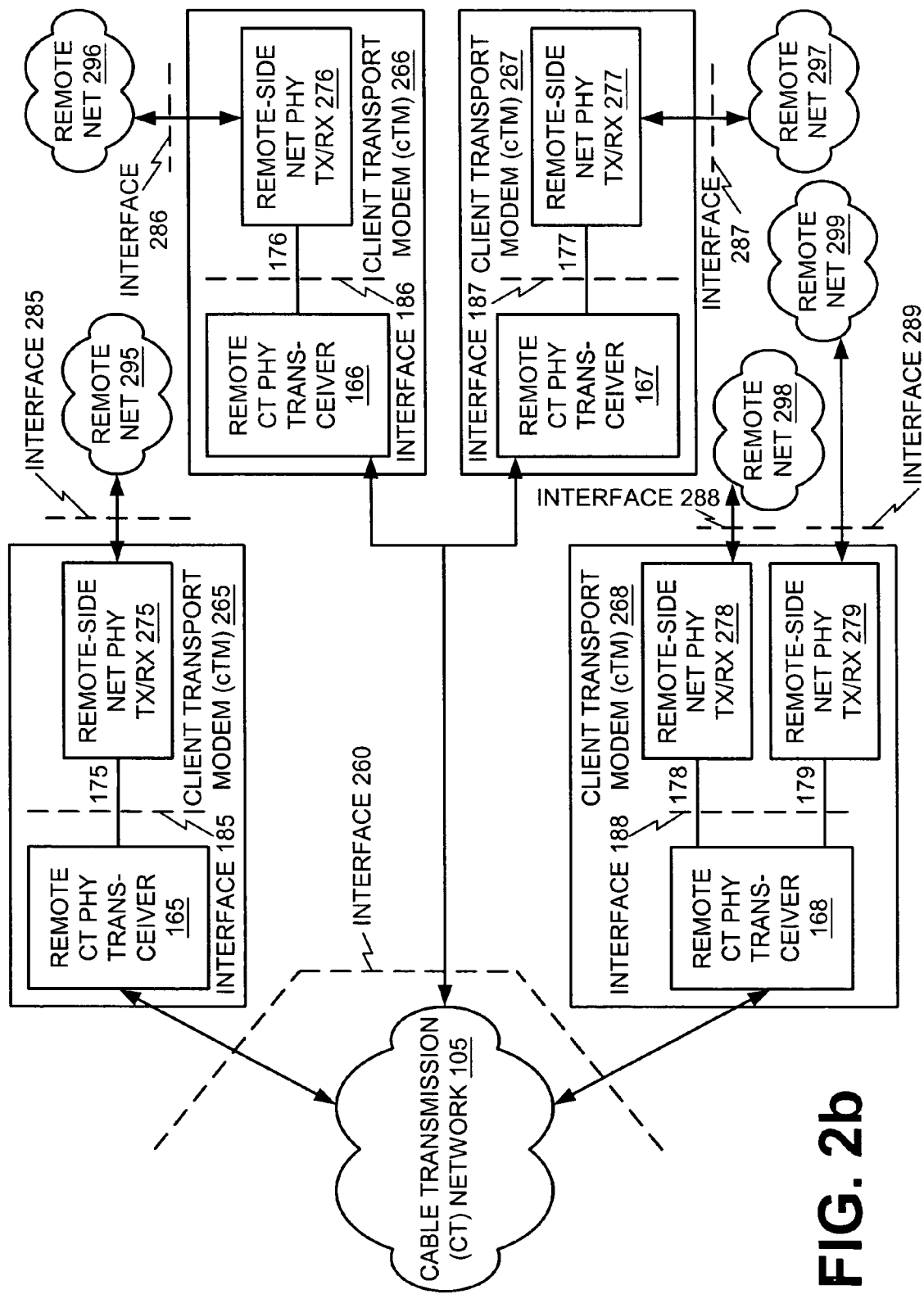
FIG. 2b shows a block diagram of a plurality of client transport modems connected to a cable transmission network.

FIGS. 2*a* and 2*b* show further detail on the use of central CT PHY transceiver 115 and remote CT PHY transceivers 165, 166, 167, and 168 in networking devices. As shown in FIG. 2*a*, central CT PHY transceiver 115 generally might be incorporated into a transport modem termination system (TMTS) 215. In addition to central CT PHY transceiver 115, TMTS 215 comprises cable transmission (CT) physical layer (PHY) control 217 and system control 219. In general, CT PHY control 217 is concerned with handling bandwidth allocations in cable transmission (CT) network 105, and system control 219 generally is concerned with TMTS management and/or configuration. Each one of the central-side ports 125, 126, 127, 128, and 129 of central CT PHY transceiver 115 may be connected over interface 135 to central-side network physical layer (PHY) transceivers (TX/RX) 225, 226, 227, 228, and 229, respectively. As discussed with respect to FIG. 1, interface 135 may actually be some sort of shared interface among the various central-side ports (125, 126, 127, 128, and 129) and central-side network physical (PHY) transceivers (225, 226, 227, 228, and 229).

Generally, most communication systems have transmitters and/or receivers (or transceivers) that handle transmitting and/or receiving signals on communication media. Often these transmitters and/or receivers (or transceivers) are responsible for converting between the electromagnetic signals used to convey information within a device (such as in baseband transistor-transistor logic (TTL) or complementary metal-oxide semiconductor (CMOS) signal levels) to electromagnetic signal levels that are suitable for transmission through external media that may be wired, wireless, waveguides, electrical, optical, etc. Although interface 135 is shown as individual connections between the central-side ports 125, 126, 127, 128, and 129 of central CT PHY transceiver 115 and central-side network PHY transceivers 225, 226, 227, 228, and 229, one skilled in the art will be aware that many possible implementations for interface 135 are possible including, but not limited, to serial interfaces, parallel interfaces, and/or buses that may use various technologies for multiplexing and/or access control to share at least one physical communications medium at interface 135.

In general, central-side network physical interfaces 225, 226, 227, 228, and 229 are connected to central networks 235, 236, 237, 238, and 239, respectively. Based upon the policy decisions of the service provider (and/or the owners of the TMTS 215 and of the associated central-side network PHY transceivers 225, 226, 227, 228, and/or 229), central networks 235, 236, 237, 238, and 239 may be connected together into a common network 240. One skilled in the art will be aware that many different configurations for connecting central networks 235, 236, 237, 238, and 239 are possible based upon different policy decisions of the owners of the equipment and any customers paying for connectivity through the equipment.

Central-side network PHY transceivers 225, 226, 227, 228, and 229 generally are connected over interface 245 to central networks 235, 236, 237, 238, and 239, respectively. In the preferred embodiment of the present invention central-side network PHY transceivers 225, 226, 227, 228, and 229 are ethernet/802.3 interfaces, and each ethernet/802.3 interface may be connected to a separate central network. However, other connections for interface 245 are possible that allow one or more transmission media to be shared using various techniques and/or media access control algorithms the may perform various multiplexing strategies. Although one skilled in the art will be aware that various methods could be used to share communications media at interface 245, in general having separate ethernet/802.3 ports and/or separate T1 ports (i.e., N×56/64 ports) at interface 135 for each central-side network PHY transceiver 225, 226, 227, 228, and 229 offers maximum flexibility in allowing service providers or equipment owners to make policy decisions and also offers low cost based on the ubiquitous availability of ethernet/802.3 interfaces and equipment.

Furthermore, one skilled in the art will be aware that there are many data speeds and physical layer specifications for ethernet/802.3. In general, the preferred embodiments of the present invention will work with any of the ethernet/802.3 specifications. Thus, if central-side network physical (PHY)

transceivers (TX/RX) 225, 226, 227, 228, and 228 are ethernet/802.3 interfaces, they may utilize any of the ethernet/802.3 speeds and/or physical layer interfaces. Also, each central-side PHY transceiver 225, 226, 227, 228, and 229 might use a different ethernet/802.3 speed and/or a physical layer specification from any of the other central-side network PHY transceivers 225, 226, 227, 228, and 229.

FIG. 2b generally shows the remote-side, customer-side, or subscriber-side equipment and connections, whereas FIG. 2a generally shows the central-side or service-provider-side equipment and connections. In FIG. 2b, cable transmission (CT) network 105 is repeated from FIG. 2a. In addition, FIG. 2a shows the five remote CT PHY transceivers 165, 166, 167, 168, and 169 as they might be used inside four client transport modems (cTMs) 265, 266, 267, and 268, respectively.

Client transport modem 265 comprises remote CT PHY transceiver 165 that is connected through connection 175 across interface 185 to at least one remote-side network physical layer (PHY) transceiver (TX/RX) 275. Also, client transport modem 266 comprises remote CT PHY transceiver 166 that is connected through connection 176 across interface 186 to at least one remote-side network physical layer (PHY) transceiver (TX/RX) 276. In addition, client transport modem 267 comprises remote CT PHY transceiver 167 that is connected through connection 177 across interface 187 to at least one remote-side network physical layer (PHY) transceiver (TX/RX) 277. Finally, client transport modem 268 comprises remote CT PHY transceiver 168 that is connected through connection 178 across interface 188 to at least one remote-side network physical layer (PHY) transceiver (TX/RX) 278 and that is connected through connection 179 across interface 189 to at least one remote-side network physical layer (PHY) transceiver (TX/RX) 279.

In general, the use of four client transport modems (cTMs) 265, 266, 267, and 268 in FIG. 2b is only for illustrative purposes and is not meant to imply any limitations on the number of client transport modems (cTMs) that may be supported. Furthermore, one skilled in the art will be aware that based upon networking needs the capabilities of multiple client transport modems (cTMs) could be integrated into a single unit. Thus, a single unit connected to the customer-side, subscriber-side, or remote-side of the cable transmission (CT) network 105 could actually have a plurality of remote CT PHY transceivers.

In general, the remote-side network physical (PHY) transceivers (TX/RX) 275, 276, 277, 278, and 279 are connected across interfaces 285, 286, 287, 288, and 289 to remote networks 295, 296, 297, 298, and 299, respectively. In the preferred embodiment of the present invention, interfaces 285, 286, 287, 288, and/or 289 are ethernet/802.3 interfaces. However, one skilled in the art will be aware that other interfaces and technologies might be used with the concepts disclosed in this specification. As a non-limiting example, an interface of a client transport modem (cTM) might be used to support circuit emulation services (CES) to carry N×56 kbps and/or N×64 kbps (where N is a positive integer) digital data streams. One skilled in the art will be aware that various N×56 and N×64 configurations are commonly designated as various digital speeds such as, but not limited to, DS0, DS1, DS3, etc. Also, one skilled in the art will be aware that the various N×56 and/or N×64 services are often delivered over plesiochronous digital hierarchy (PDH) interfaces such as, but not limited to, T1, T3, etc. and/or synchronous digital hierarchy (SDH) interfaces such as, but not limited to, Synchronous Transport Signal, Level 1 (STS-1), STS-3, etc. Often the STS frames are carried in a synchronous optical network (SONET) on optical carriers that are generally referred to as OC-1 (optical carrier 1), OC-3, etc. In addition, to these higher order multiplexings of multiple DS0s, interfaces such as switched 56/64 and basic rate interface (BRI) ISDN offer support for smaller numbers of 56/64 kbps DS0s.

One skilled in the art will be aware of these various N×56 and N×64 technologies and how they generally can be used to connect devices to networks such as the PSTN (public switched telephone network). In addition, one skilled in the art will be aware that such digital N×56 and N×64 kbps connections also may carry digitized voice generally using pulse code modulation (PCM) and various companding techniques such as, but not limited to, A-law and mu-law. Therefore, the remote-side network physical (PHY) transceivers (TX/RX) 275, 276, 277, 278, and 279 do not all have to use 802.3/ethernet. In at least one preferred embodiment of the present invention, a client transport modem (cTM) 268 with a plurality of remote-side network physical (PHY) transceivers (TX/RX) 278 and 279 may support different types of interfaces for each transceiver at interfaces 288 and 289. Thus, as a non-limiting example, remote-side network physical (PHY) transceiver 278 may use ethernet/802.3 to connect to an ethernet/802.3 remote network 298, and remote-side network physical (PHY) transceiver 279 may be a T1 interface to remote network 299. This non-limiting example configuration is expected to be common for many remote offices that need ethernet/802.3 connectivity to carry data and packetized real-time services such as voice or video and that also need T1 interfaces to connect to legacy circuit-switched voice for devices such as PBXs (Private Branch Exchanges).

Furthermore, one skilled in the art will be aware that there are many data speeds and physical layer specifications for ethernet/802.3. In general, the preferred embodiments of the present invention will work with any of the ethernet/802.3 specifications. Thus, if remote-side network physical (PHY) transceivers (TX/RX) 275, 276, 277, 278, and 279 are ethernet/802.3 interfaces, they may utilize any of the ethernet/802.3 speeds and/or physical layer interfaces. Also, each remote-side PHY transceiver 275, 276, 277, 278, and 279 might use a different ethernet/802.3 speed and/or physical layer specification from any of the other remote-side network PHY transceivers 275, 276, 277, 278, and 279.

In general, the preferred embodiments of the present invention might be considered as providing repeater functionality between the central-side network PHY transceivers 225, 226, 227, 228, and 229 and remote-side network PHY transceivers 275, 276, 277, 278, and 279, respectively. Generally, the repeater service may involve corresponding central-side and remote-side interfaces and transceivers having the same speeds. However, one skilled in the art will be aware that ethernet/802.3 hubs are repeaters and that some ethernet/802.3 hubs handle speed conversions such as between 10 Mbps ethernet/802.3 and 100 Mbps fast ethernet/802.3. Thus, one skilled in the art will be aware of using the techniques found in these multi-speed ethernet/802.3 hubs to support different speeds on the interfaces of corresponding central-side and remote-side network physical (PHY) transceivers (TX/RX) and generally still provide repeater functionality. Also, one skilled in the art will be aware that even if a central-side network physical transceiver (such as, but limited to, central-side network physical transceiver 225) and a corresponding remote-side network physical transceiver (such as, but limited to, remote-side network physical transceiver 275) operate at the same data rate, the transceivers may use different types of physical media and portions of the ethernet/802.3 specification such as, but not limited to, 100BaseTX on copper for a central-side network physical transceiver and 100BaseFX on fiber for a remote-side network physical transceiver.

Figure 3:
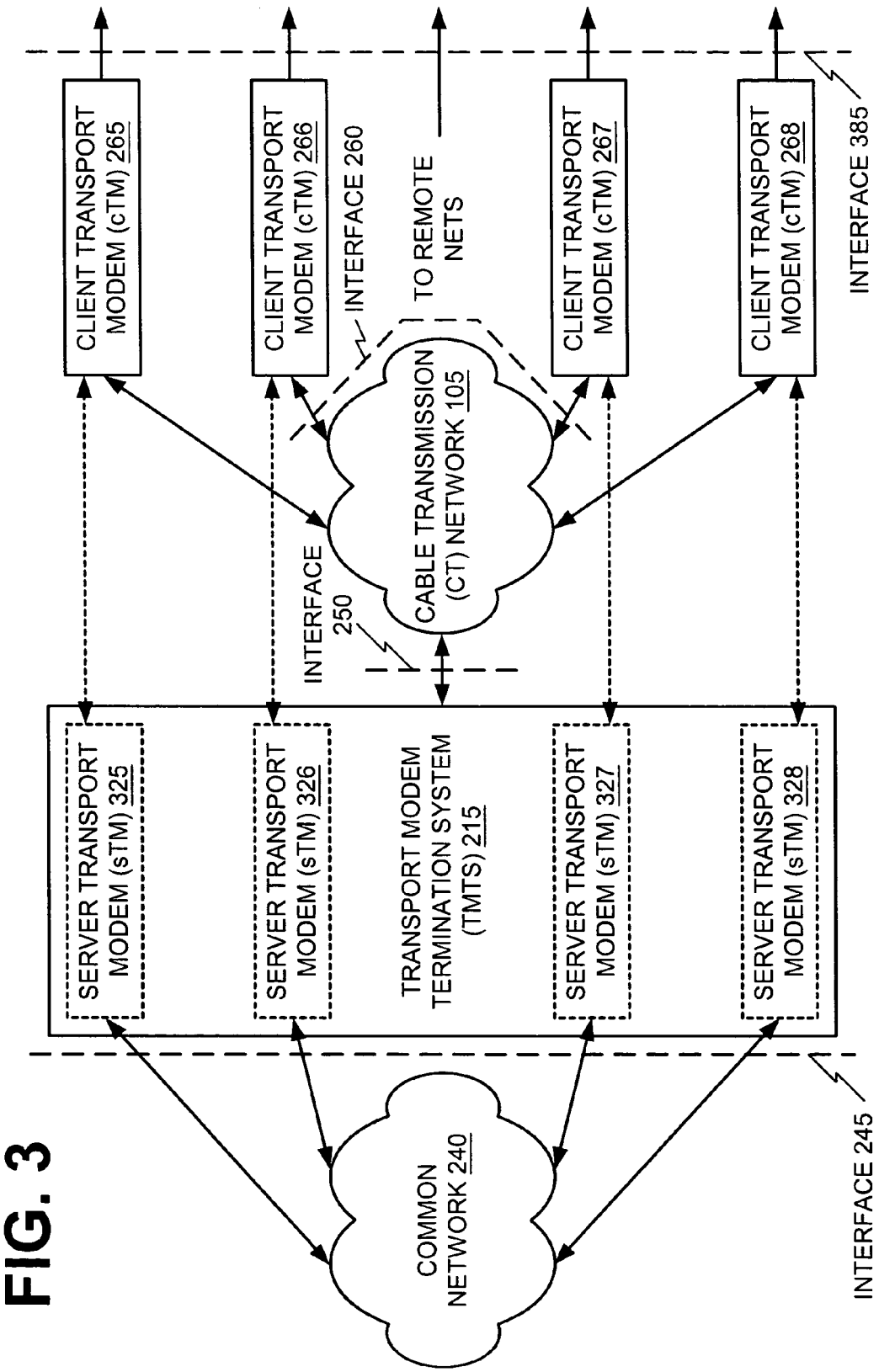
FIG. 3 shows a block diagram of the connection-oriented relationship between client transport modems and ports of a transport modem termination system.

Given the general point-to-point relationship between central-side network physical (PHY) transceivers (TX/RX) 225, 226, 227, 228, and 229 with the corresponding remote-side network physical (PHY) transceivers (TX/RX) 275, 276, 277, 278, and 279, respectively, the client transport modems (cTMs) 265, 266, 267, and 268 can each be thought of as having a corresponding server transport modem (sTM) 325, 326, 327, and 328, respectively, as shown in FIG. 3. In general, the server transport modems (sTMs) 325, 326, 327, and 328 may not be separate equipment, but may instead be implemented using shared hardware in TMTS 215 in the preferred embodiment of the present invention. Although to each client transport modem (cTM) 265, 266, 267, and 268 it may seem like there is a connection to a dedicated server transport modem (sTM), (such as sTMs 325, 326, 327, and 328, respectively), the server transport modems may not be actual individual hardware in the preferred embodiment of the present invention. Even though the preferred embodiments of the present invention may not use individual server transport modems, this does not preclude such implementations.

In the FIG. 3 representation of the preferred embodiments of the present invention, the server transport modems (sTMs) 325, 326, 327, and 328 as well as the corresponding connections to the client transport modems (cTMs) 265, 266, 267, and 268, respectively, are shown as small dashed lines to indicate the virtual nature of the relationship. The server transport modems (sTMs) 325, 326, 327, and 328 may be virtual in the preferred embodiments of the present invention because they generally may be implemented using shared hardware in TMTS 215.

In general, the preferred embodiments of the present invention may act to transparently repeat digital signals between interfaces 245 and 385. Interfaces 245 and/or 385 may have different types of technologies and/or media for the point-to-point connections between active ports on interface 245 and active ports on interface 385. Active ports generally are associated with point-to-point connections between TMTS 215 and a client transport modem 265, 266, 267, or 268, when the point-to-point connection is allocated bandwidth through cable transmission (CT) network 105. In general, TMTS 215 connects at interface 250 to the central-side or service-provider-side of cable transmission (CT) network 105, whereas client transport modems (cTMs) 265, 266, 267, and 268 connect at interface 260 to the remote-side, customer-side, or subscriber-side of cable transmission (CT) network 105. Furthermore, the client transport modems (cTMs) 265, 266, 267, and 268 may be connected to remote networks over interface 385 using various types of media and technologies. The transport modem termination system (TMTS) 215 connected at interface 245 may further be connected into a common network 240, although the technology of the preferred embodiments of the present invention allows other central network configurations based upon various policy decisions and network ownership requirements. Some of these considerations include, but are not limited to, privacy, security, cost, and/or connectivity.

Integration Into Existing Cable Network Architectures

Figure 4:
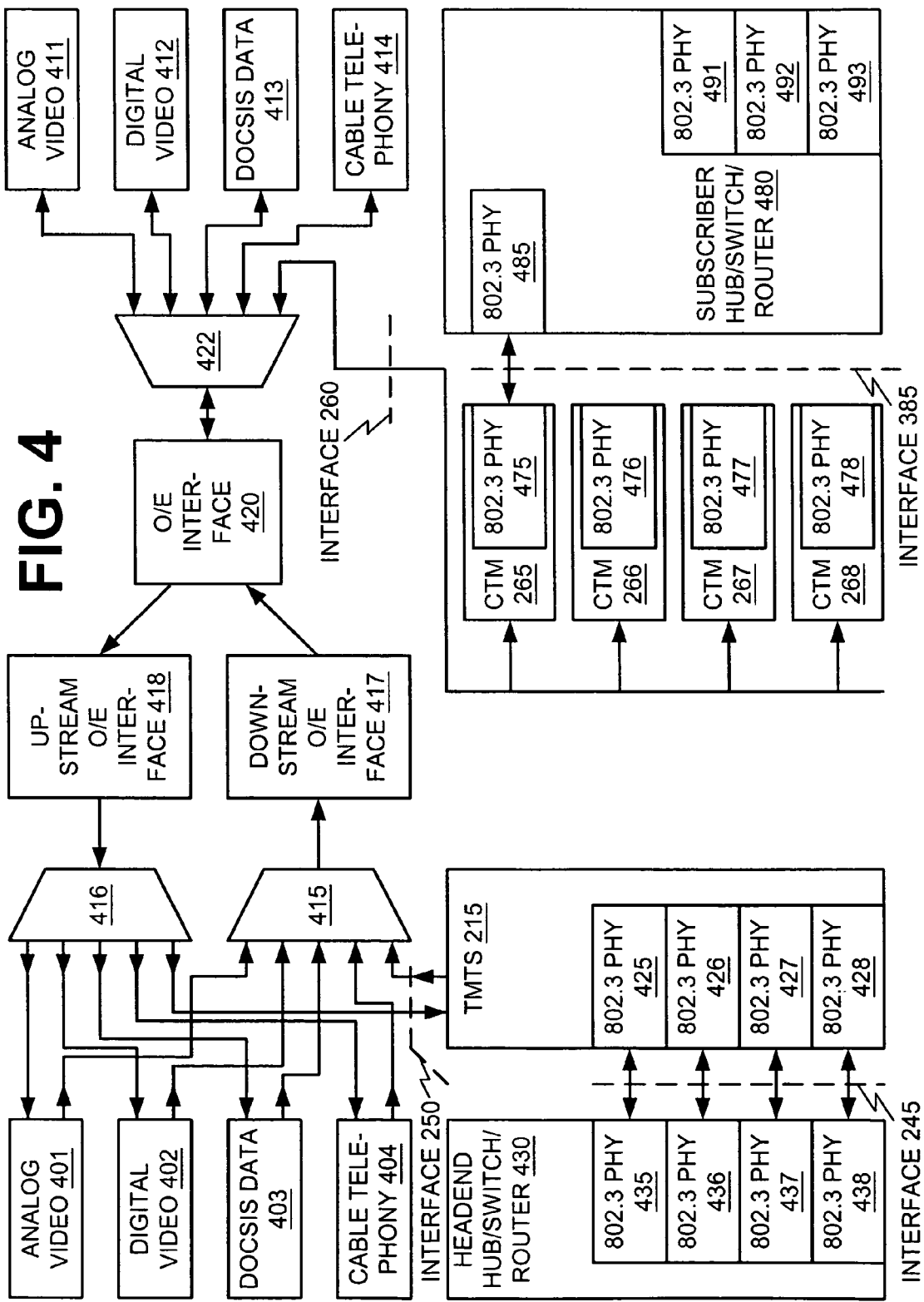
FIG. 4 shows a block diagram of the architecture for integrating a transport modem termination system and a plurality of client transport modems into a system carrying other services.

FIG. 4 shows a more detailed implementation of the preferred embodiment of the present invention from FIGS. 1 through 3 and its use in a cable network that may carry additional services over the cable transmission (CT) network 105. FIG. 4 shows TMTS 215 and cTMs 265, 266, 267, and 268 that were briefly described with respect to FIGS. 2a and 2b. As shown in FIG. 4, each cTM 265, 266, 267, and 268 has at least one ethernet/802.3 physical (PHY) transceiver 475, 476, 477, and 478, respectively. The ethernet/802.3 PHY transceivers 475, 476, 477, and 478 correspond to one non-limiting type of transceiver that may be used in the preferred embodiment of the present invention for remote-side network physical (PHY) transceivers (TX/RX) 275, 276, 277, 278, and 279 at the associated interfaces 285, 286, 287, 288, and 289 of FIG. 2b. Also each cTM 265, 266, 267, and 268 may have one or a plurality of physical transceivers at interface 385. Each one of these transceivers may be an ethernet/802.3 physical interface or any other type of communications interface.

Furthermore, those skilled in the art will be aware of the relatively minor differences between IEEE 802.3 and the Digital-Intel-Xerox (DIX) 2.0 (or II) specification of ethernet and the possibility of carrying multiple frame formats such as, but not limited to, ethernet_II, 802.3 raw, 802.3/802.2 LLC (logical link control), and 802.3/802.2 SNAP (Sub-Network Access Protocol) on networks colloquially known as ethernet. In addition, the preferred embodiments of the present invention also are intended to cover other versions and variations of ethernet/802.3 including, but not limited to, DIX ethernet 1.0. References in this specification to ethernet and/or IEEE 802.3 generally are intended to refer to networks capable of carrying any combination of the various frame types generally carried on such ethernet/802.3 networks. Because the preferred embodiments of the present invention generally provide a physical layer interface that may be used for repeater service, the preferred embodiments of the present invention generally are transparent to the various types of ethernet/802.3 frames.

Although FIG. 4 shows four cTMs and four interfaces on TMTS 215, this is only for illustrative purposes, and the preferred embodiments of the present invention are not limited to providing connectivity to exactly four client transport modems. Instead the preferred embodiment of the present invention will work with at least one client transport modem and at least one corresponding interface on TMTS 215. In general, in FIG. 4 each one of the 802.3 physical (PHY) layer interfaces or transceivers 475, 476, 477, and 478 of the client transport modems (cTMs) generally is associated with a corresponding 802.3 physical layer interface and/or transceiver 425, 426, 427, and 428, respectively, in the TMTS 215. In general, 802.3 physical layer interfaces and/or transceivers 425, 426, 427, and 428 are one non-limiting example of the types of transceivers that may be used in the preferred embodiment of the present invention for central-side network physical (PHY) transceivers (TX/RX) 225, 226, 227, 228, and 229 at the associated interface 245 of FIG. 2a.

As shown in FIG. 4, the 802.3 PHY interfaces and/or transceivers 425, 426, 427, and 428 of the TMTS 215 are further connected to a headend networking device such as hub, switch, and/or router 430 with 802.3 PHY interfaces and/or transceivers 435, 436, 437, and 438, respectively. Those skilled in the art will be aware that this is only one of the many possible ways of connecting the ethernet/802.3 PHY interfaces and/or transceivers 425, 426, 427, and 428 of TMTS 215 to a service-provider common network 240 that may include a service provider backbone network (not shown in FIG. 4). Generally, based on service provider policies and equipment costs, various choices may be made for the specific device(s) to be connected to the 802.3 PHY interfaces and/or transceivers 225, 226, 227, and 228 of TMTS 215. As a non-limiting example, two of the 802.3 PHY interfaces and/or transceivers 225, 226, 227, and 228 may be associated with providing connectivity to two different remote offices of a particular company. That company may just want those two 802.3 PHY interfaces and/or transceivers of TMTS 215 to be directly connected (possibly using an ethernet cross-over cable that is known to one of skill in the art by crossing pins 1 and 3 as well as pins 2 and 6 of an RJ45 connector).

Therefore, the 802.3 PHY interfaces and/or transceivers 425, 426, 427, and 428 of TMTS 215 can be connected based on service provider policies and/or subscriber (or customer) demands. In addition, the present invention is not limited to a specific type of network device or link used to connect the 802.3 PHY interfaces port 225, 226, 227, and 228 of TMTS 215 to a service provider's network, which may be a common network 240 and may include a backbone network (not shown in FIG. 4). Thus, the at least one connection to headend hub/switch/router 430 over interface 245 is only one non-limiting example of how the TMTS 215 can be connected to a service provider backbone network.

Furthermore, as described with respect to FIGS. 1 through 3, the preferred embodiment of the present invention basically functions as a ethernet/802.3 repeater that transparently copies the bits from ethernet/802.3 frames between interfaces 245 and 385 of FIGS. 3 and 4. The transparent support of ethernet/802.3 generally allows the system to transparently carry ethernet/802.3 frames with virtual LAN or label-based multiplexing information such as, but not limited to, the information defined in IEEE 802.1Q (VLAN or Virtual LAN) and/or IEEE 802.17 (RPR or Resilient Packet Ring). Because of the transparency of the preferred embodiment of the present invention to various ethernet virtual LAN and/or tag/label information, service providers using the preferred embodiment of the present invention generally have the flexibility to specify policies for carrying, combining, and/or segregating the traffic of different subscribers based on the types of devices connected to interfaces 245 and 385. Also, subscribers or customers may choose to implement various mechanisms such as, but not limited to, 802.1Q VLAN and/or 802.17 RPR that might be used between two or more subscriber sites that are each connected to the preferred embodiment of the present invention. The transparency of the preferred embodiment of the present invention to this additional information in ethernet/802.3 frames provides versatility to the service provider and the subscriber in deciding on how to use various VLAN, tag, and/or label mechanisms that are capable of being carried with ethernet/802.3 frames.

In addition, FIG. 4 further shows how one client transport modem (cTM) 265 with at least one 802.3 PHY interface or transceiver 475 is connected over interface 385 to 802.3 PHY interface or transceiver 485. Ethernet/802.3 PHY interface 485 may be located in a subscriber hub/switch/router 480 that has more 802.3 PHY interfaces or transceivers 491, 492, and 493 into the customer or subscriber LANs or networks, which are non-limiting examples of portions of remote networks. The other client transport modems (cTMs) 266, 267, and 268 also would likely have connections over interface 385 to various devices of other customer or subscriber LANs, though these are not shown in FIG. 4. Much like headend hub/switch/router 430, the actual type of network device or connection for subscriber hub/switch/router 480 is not limited by the preferred embodiment of the present invention. The preferred embodiment of the present invention generally provides transparent ethernet repeater capability over a cable transmission network 105. In FIG. 4, the interfaces 250 and 260 generally correspond to the central-side or service-provider-side and to the remote-side, customer-side, or subscriber-side, respectively, of cable transmission (CT) network 105. These reference interfaces 250 and 260 in FIG. 4 were shown in FIGS. 2a, 2b, and 3 as the interfaces of cable transmission (CT) network 105.

Those skilled in the art will be aware of the devices and technologies that generally make up cable transmission networks 105. At least some of this cable transmission technology is described in "Modern Cable Television Technology: Video, Voice, and Data Communications" by Walter Ciciora, James Farmer, and David Large, which is incorporated by reference in its entirety herein. In general, the cable transmission networks 105 may carry other services in addition to those of the preferred embodiment of the present invention. For instance, as known by one skilled in the art, a cable transmission network 105 may carry analog video, digital video, DOCSIS data, and/or cable telephony in addition to the information associated with the preferred embodiment of the present invention. Each one of these services generally has equipment located at the service provider, such as analog video equipment 401, digital video equipment 402, DOCSIS data equipment 403, and cable telephony equipment 404 as well as equipment located at various customer or subscriber locations such as analog video equipment 411, digital video equipment 412, DOCSIS data equipment 413, and cable telephony equipment 414. Even though these other services in FIG. 4 are shown as if they are bi-directional, often some of the services such as analog video and digital video have historically been primarily uni-directional services that generally are broadcast from the headend to the subscribers.

In addition, FIG. 4 further shows some of the transmission equipment that might be used in a cable transmission network 105 (generally found between interfaces 250 and 260 in FIG. 4). For example, cable transmission networks 105 might include combiner 415 and splitter 416 to combine and split electromagnetic signals, respectively. As cable transmission network 105 may be a hybrid fiber-coax (HFC) network, it could contain devices for converting electromagnetic signals between electrical and optical formats. For example, downstream optical/electrical (O/E) interface device 417 may convert downstream electrical signals (primarily carried over coaxial cable) to downstream optical signals (primarily carried over fiber optic lines). Also, upstream optical/electrical (O/E) interface device 418 may convert upstream optical signals (primarily carried over fiber optic lines) to upstream electrical signals (primarily carried over coaxial cable). Downstream optical/electrical interface 417 and upstream optical/electrical interface 418 generally are connected to a subscriber or customer premises over at least one fiber optic connection to optical/electrical (O/E) interface 420. The downstream optical communications between downstream O/E interface 417 and O/E interface 420 might be carried on different optical fibers from the fibers carrying upstream optical communications between O/E interface 420 and upstream O/E interface 418. However, one skilled in the art will be aware that a variation on frequency-division multiplexing (FDM) known as wavelength division multiplexing (WDM) could be used to allow bi-directional duplex transmission of both the downstream and upstream optical communications on a single fiber optic link.

Generally, for an HFC system the interfaces at customer or subscriber premises are electrical coax connections. Thus, optical/electrical interface 420 may connect into a splitter/combiner 422 that divides and/or combines electrical signals associated with analog video device 411, digital video device 412, DOCSIS data device 413, and/or cable telephone device 413 that generally are located at the customer or subscriber premises. This description of the splitters, combiners, and optical electrical interfaces of HFC networks that may be used for cable transmission network 105 is basic and does not cover all the other types of equipment that may be used in a cable transmission network 105. Some non-limiting examples of other types of equipment used in a cable transmission network 105 include, but are not limited to, amplifiers and filters. Those skilled in the art will be aware of these as well as many other types of devices and equipment used in cable transmission networks.

Furthermore, one skilled in the art will be aware that the preferred embodiments of the present invention may be used on all-coax, all-fiber, and/or hybrid fiber-coax (HFC) such as cable transmission networks (CT) 105. In general, cable transmission (CT) network 105 generally is a radio frequency (RF) network that generally includes some frequency-division multiplexed (FDM) channels. Also, one skilled in the art will be aware that the preferred embodiments of the present invention may be used on a cable transmission (CT) network 105 that generally is not carrying information for other applications such as, but not limited to, analog video, digital video, DOCSIS data, and/or cable telephony. Alternatively, the preferred embodiments of the present invention may coexist on a cable transmission (CT) network 105 that is carrying information analog video, digital video, DOCSIS data, and/or cable telephony as well as various combinations and permutations thereof. Generally in the preferred embodiments of the present invention, the cable transmission (CT) network 105 is any type of network capable of providing frequency-division multiplexed (FDM) transport of communication signals such as but not limited to electrical and/or optical signals. The FDM transport includes the variation of FDM in optical networks which is generally called wavelength-division multiplexing (WDM).

In addition, the preferred embodiments of the present invention may use one or more MPEG PIDs for downstream transmission of MPEG packets carrying the traffic of Frame Management Sublayer (FMS) data flows. In addition, MPEG packets carrying the octets of one or more FMS data flows of the preferred embodiments of the present invention are capable of being multiplexed into the same frequency channel of a cable transmission network that also carries other MPEG packets that have different PID values and that generally are unrelated to the FMS data flows of the preferred embodiments of the present invention. Thus, not only are both the upstream and the downstream frequency channel usages of the preferred embodiments of the present invention easily integrated into the general frequency-division multiplexing (FDM) bandwidth allocation scheme commonly-found in cable transmission networks, but also the use of the MPEG frame format for downstream transmission in the preferred embodiments of the present invention allows easy integration into the PID-based time-division multiplexing (TDM) of MPEG 2 transport streams that also is commonly-found in cable transmission networks. Thus, one skilled in the art will be aware that the preferred embodiments of the present invention can be easily integrated into the frequency-division multiplexing (FDM) architecture of cable transmission networks.

As one skilled in the art will be aware, in North America cable transmission networks generally were first developed for carrying analog channels of NTSC (National Television Systems Committee) video that generally utilize 6 MHz of frequency bandwidth. Also, one skilled in the art will be aware that other parts of the world outside North America have developed other video coding standards with other cable transmission networks. In particular, Europe commonly utilizes the phase alternating line (PAL) analog video encoding that is generally carried on cable transmission networks in frequency channels with a little more bandwidth than the generally 6 MHz channels, which are commonly used in North American cable transmission networks. Because the frequency channels used in the preferred embodiments of the present invention will fit into the more narrow frequency bandwidth channels that were originally designed to carry analog NTSC video, the frequency channels used in the preferred embodiments of the present invention also will fit into larger frequency bandwidth channels designed for carrying analog PAL video.

In addition, although the preferred embodiments of the present invention are designed to fit within the 6 MHz channels commonly-used for analog NTSC signals and will also fit into cable transmission networks capable of carrying analog PAL signals, one skilled in the art will be aware that the multiplexing techniques utilized in the preferred embodiments of the present invention are general. Thus, the scope of the embodiments of the present invention is not to be limited to just cable transmission systems, which are designed for carrying NTSC and/or PAL signals. Instead, one skilled in the art will be aware that the concepts of the embodiments of the present invention generally apply to transmission facilities that use frequency division multiplexing (FDM) and have a one-to-many communication paradigm for one direction of communication as well as a many-to-one communication paradigm for the other direction of communication.

Furthermore, the preferred embodiments of the present invention generally communicate using signals with similar transmission characteristics to other signals commonly found in cable transmission networks. Thus, one skilled in the art will be aware that the signal transmission characteristics of the preferred embodiments of the present invention are designed to integrate into existing, already-deployed cable transmission networks that may be carrying other types of signals for other services such as, but not limited to, analog and/or digital video, analog and/or digital audio, and/or digital data. The preferred embodiments of the present invention are designed to be carried in the same communications medium that also may be carrying the other services without the preferred embodiments of the present invention introducing undesirable and unexpected interference on the other services. Furthermore, the preferred embodiments of the present invention will operate over various types of communication media including, but not limited to, coaxial (coax) cable, fiber, hybrid fiber-coax, as well as wireless. Because the preferred embodiments of the present invention generally are designed to conform to some of the historical legacy standards of cable networks, the preferred embodiments of the present invention can be used in many existing network infrastructures that are already carrying other services. Therefore, the preferred embodiments of the present invention peacefully coexist with existing historical legacy services. Also, the preferred embodiments of the present invention can be used in other environments that are not limited by historical legacy services (or services compatible with historical legacy standards).

Figure 5A:
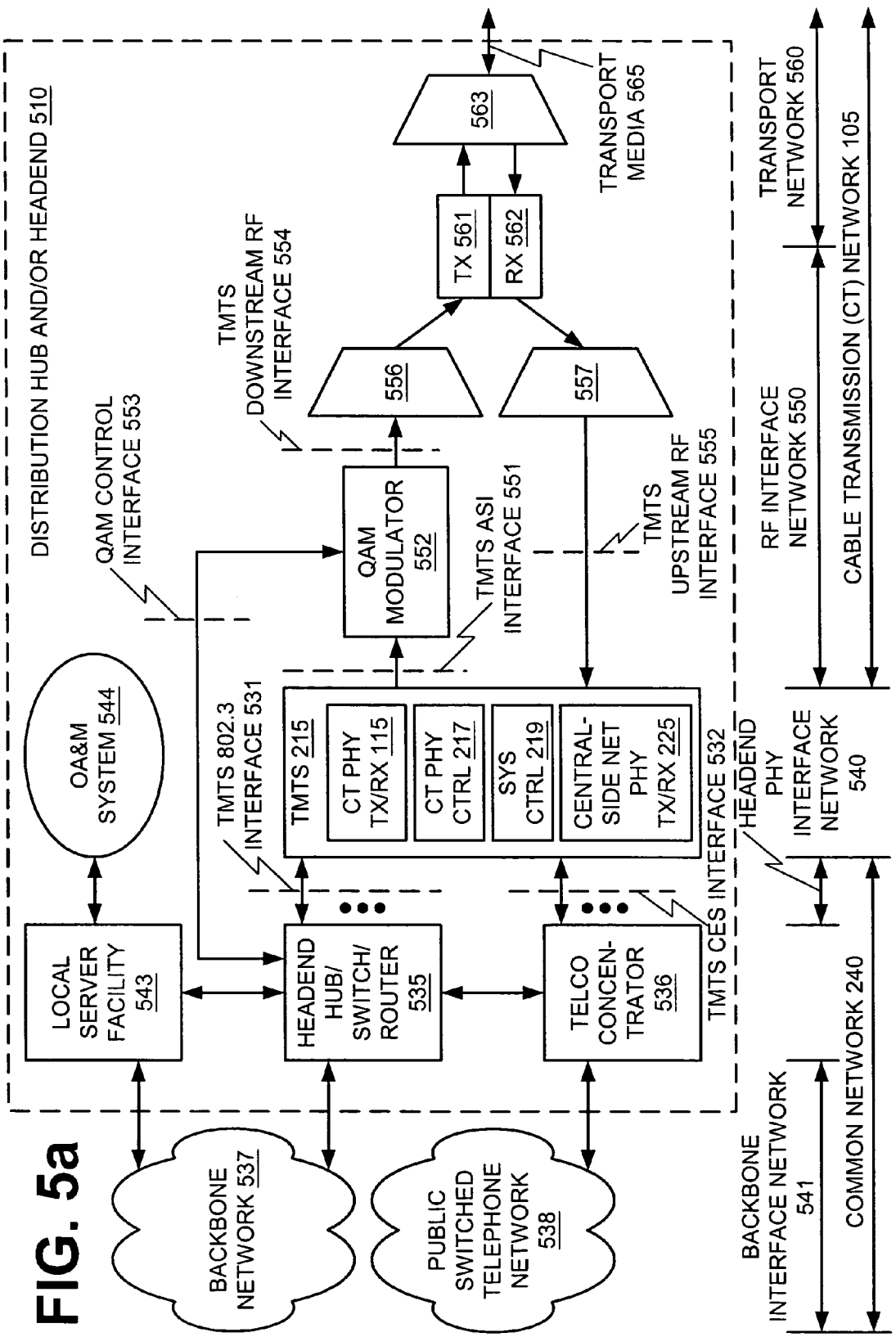
FIG. 5a shows a block diagram of a transport modem termination system connected in a headend.
Figure 5B:
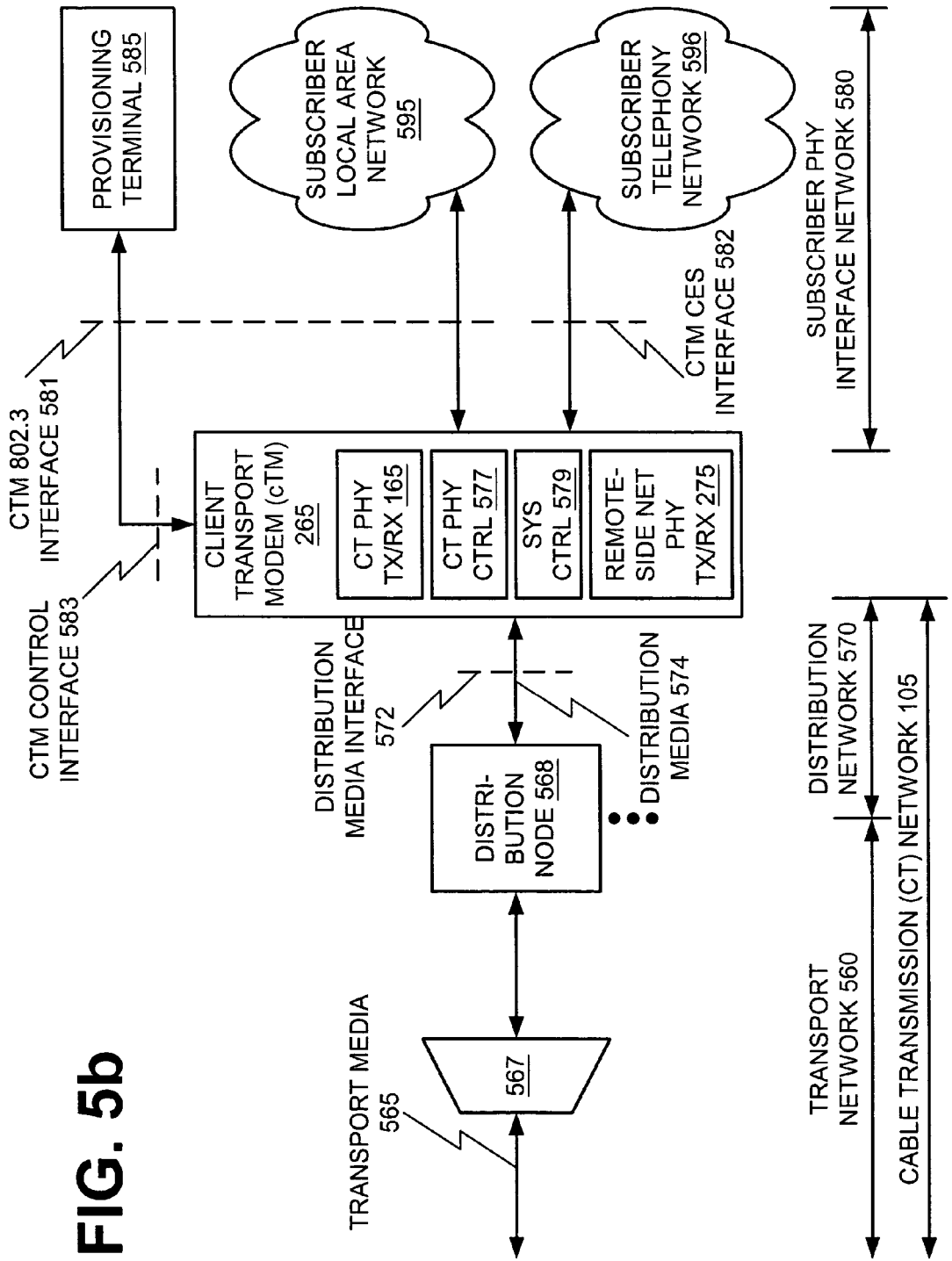
FIG. 5b shows a block diagram of a client transport modem connected to a cable transmission network.

FIGS. 5a and 5b generally show a more detailed system reference diagram for a communication system that might be using a preferred embodiment of the present invention. In general, FIG. 5a covers at least some of the equipment and connections commonly found on the central-side or service-provider-side in a system using the preferred embodiments of the present invention. In contrast, FIG. 5b generally covers at least some of the equipment and connections commonly found on the remote-side, customer-side, or subscriber-side of a system using the preferred embodiments of the present invention. Generally, the approximate demarcation of cable transmission network (CT) 105 network is shown across the FIGS. 5a and 5b. One skilled in the art will be aware that the devices shown in FIGS. 5a and 5b are non-limiting examples of the types of equipment generally found in RF cable networks. Thus, FIGS. 5a and 5b show only a preferred embodiment of the present invention and other embodiments are possible.

In general, the equipment for the central-side, service-provider side, and/or customer-side of the network generally may be located in a distribution hub and/or headend 510. FIG. 5a shows transport modem termination system (TMTS) 215 comprising at least one cable transmission (CT) physical (PHY) transceiver (TX/RX) 115, at least one cable transmission (CT) physical (PHY) control (CTRL) 217, at least system control (SYS CTRL) 219, and at least one central-side network physical (PHY) transceiver (TX/RX) 225. In the preferred embodiments of the present invention, TMTS 215 supports two types of interfaces to common network 240. In FIG. 5a these two types of interfaces are shown as TMTS 802.3 interface 531 and TMTS circuit emulation service (CES) interface 532. In general, there may be multiple instances of both TMTS 802.3 interface 531 and TMTS CES interface 532 that might be used to handle traffic for multiple remote-side network interfaces and/or transceivers on a single client transport modem (cTM) or for multiple remote-side network interfaces on a plurality of client transport modems (cTMs).

In the preferred embodiment of the present invention the at least one TMTS 802.3 interface 531 generally is capable of transparently conveying the information in ethernet/802.3 frames. Generally, at the most basic level, the preferred embodiments of the present invention are capable of acting as an ethernet/802.3 physical layer repeater. However, one skilled in the art will be aware that the generally physical layer concepts of the preferred embodiments of the present invention may be integrated into more complex communication devices and/or systems such as, but not limited to, bridges, switches, routers, and/or gateways.

Generally, at least one TMTS CES interface 532 provides circuit emulation capability that may be used to carry generally historical, legacy interfaces that are commonly associated with circuit-switched networks, such as the public switched telephone network (PSTN). Those skilled in the art will be aware of analog and/or digital interfaces to the PSTN that are commonly found in devices interfacing to the PSTN. In digital form, these interfaces often comprise integer multiples of a DS0 at 56 kbps (N×56) and/or 64 kbps (N×64). Also, a person skilled in the art will be aware of various common multiplexing technologies that may be used to aggregate the integer multiples of DS0s. These multiplexing technologies generally can be divided into the plesiochronous digital hierarchy (PDH) and the synchronous digital hierarchy (SDH) that are well-known to one of ordinary skill in the art.

In general, at least one TMTS 802.3 interface 531 may be connected into a headend hub, switch, or router 535 or any other networking device to implement various policy decisions for providing connectivity between the transport modem termination system 215 and the client transport modems (cTMs) 265. One skilled in the art generally will be aware of the various policy considerations in choosing different types of networking devices and/or connections for connecting to TMTS 802.3 interface 531.

Furthermore, at least one TMTS CES interface 532 might be connected to a telco concentrator that generally might be various switching and/or multiplexing equipment designed to interface to technologies generally used for carrying circuit-switched connections in the PSTN. Thus, telco concentrator 536 might connect to TMTS 215 using analog interfaces and/or digital interfaces that generally are integer multiples of DS0 (56 kbps or 64 kbps). Some non-limiting examples of analog interfaces that are commonly found in the industry are FXS/FXO (foreign exchange station/foreign exchange office) and E&M (ear & mouth). In addition to carrying the actual information related to CES emulation service between TMTS 215 and telco concentrator 536, TMTS CES interface 532 also may carry various signaling information for establishing and releasing circuit-switched calls. One skilled in the art will be aware of many different signaling protocols to handle this function, including but not limited to, channel associated signaling using bit robbing, Q.931 D-channel signaling of ISDN, and standard POTS signaling as well as many others.

In general, one or more devices at the headend, such as headend hub, switch, and/or router 535, generally provide connectivity between TMTS 215 and backbone network 537, which may provide connectivity to various types of network technology and/or services. Also, telco concentrator 536 may be further connected to the public switched telephone network (PSTN). In general, telco concentrator 536 might provide multiplexing and/or switching functionality for the circuit emulation services (CES) before connecting these services to the PSTN. Also, telco concentrator 536 could convert the circuit emulation services (CES) into packet-based services. For example, 64 kbps PCM voice (and associated signaling) carried across TMTS CES interface 532 might be converted into various forms of packetized voice (and associated signaling) that is carried on a connection between telco concentrator 536 and headend hub, switch, and/or router 535. In addition, the connection between telco concentrator 536 and headend hub, switch, and/or router 535 may carry any network management, configuration, and/or control information associated with telco concentrator 536.

In general, TMTS 802.3 interface 531 and TMTS CES interface 532 may be considered to be at least part of the headend physical (PHY) interface network 540. Also, at least part of the common network 240 generally may be considered to be the backbone interface network 541. In addition to the systems and interfaces generally designed for transparently carrying information between the central-side networks (as represented at TMTS 802.3 interface 531 and TMTS CES interface 532) of the TMTS 215 and the remote-side networks of at least one cTM 265, the communication system generally has connections to local server facilities 543 and operations, administration, and maintenance system 544 that may both be part of common network 240. Network management, configuration, maintenance, control, and administration are capabilities that, although optional, are generally expected in many communication systems today. Though the preferred embodiments of the present invention might be implemented without such functions and/or capabilities, such an implementation generally would be less flexible and would probably be significantly more costly to support without some specialized network functions such as, but not limited to, operations, administration, and maintenance (OA&M) 544. Also, local server facility 543 may comprise servers running various protocols for functions such as, but not limited to, dynamic network address assignment (potentially using the dynamic host configuration protocol—DHCP) and/or software uploads as well as configuration file uploads and downloads (potentially using the trivial file transfer protocol—TFTP).

FIG. 5a further shows how cable transmission (CT) physical (PHY) transceiver (TX/RX) 115 in TMTS 215 might interface to RF interface network 550 in the preferred embodiment of the present invention. In an embodiment of the present invention, CT PHY transceiver 115 connects to a TMTS asynchronous serial interface (ASI) 551 for the downstream communication from TMTS 215 towards at least one client transport modem (cTM) 265. In a preferred embodiment of the present invention, the QAM (Quadrature Amplitude Modulation) modulator 552 is external to the TMTS 215. One skilled in the art will be aware that other embodiments of the present invention are possible that may incorporate the at least one QAM modulator 552 into the TMTS 215 for downstream communication. Furthermore, an ASI (asynchronous serial interface) interface is only one non-limiting example of a potential interface for the at least one QAM modulator 522. QAM modulators 552 with ASI interfaces are commonly used in cable transmission networks 105, and reuse of existing technology and/or systems may allow lower cost implementations of the preferred embodiments of the present invention. However, other embodiments using various internal and/or external interfaces to various kinds of modulators might be used in addition to or in place of the TMTS ASI interface 551 to at least one QAM modulator 552.

Because QAM modulators are used for many types of transmission in CATV networks, one skilled in the art will be aware of many interfaces (both internal and external) that might be used for connecting QAM modulator(s) 522 for downstream transmission. The TMTS ASI interface 551 is only one non-limiting example of an interface that is often used in the art and is well-known to one of ordinary skill in the art. As one skilled in the art will be aware, such QAM modulators have been used in CATV networks to support downstream transmission for commonly-deployed services such as, but not limited to, DOCSIS cable modems and digital TV using MPEG video. Due to the common usage of such QAM modulators for digital services and the large variety of external and internal interfaces used by many vendors' equipment, one skilled in the art will be aware that many types of interfaces may be used for transmitting the digital bit streams of a TMTS to QAM modulators for modulation followed by further downstream transmission over cable transmission networks. Thus, in addition to TMTS ASI interface 551, one skilled in the art will be aware of other standard and/or proprietary interfaces that may be internal or external to TMTS 215 and that might be used to communicate digital information to QAM modulator(s) 522 for downstream transmission. These other types of interfaces to QAM modulators are intended to be within the scope of the embodiments of the present invention.

In general, TMTS 215 controls the downstream modulation formats and configurations in the preferred embodiments of the present invention. Thus, when external modulators (such as QAM modulator 552) are used with TMTS 215, some form of control messaging generally exists between TMTS 215 and QAM modulator 552. This control messaging is shown in FIG. 5a as QAM control interface 553, which generally allows communication between at least one QAM modulator 552 and TMTS 215. In the preferred embodiment of the present invention, this communication between at least one QAM modulator 552 and TMTS 215 may go through headend hub, switch, and/or router 535 as well as over TMTS 802.3 interface 531.

Furthermore, modulators such as, but not limited to, at least one QAM modulator 552 often are designed to map information onto a set of physical phenomena or electromagnetic signals that generally are known as a signal space. Generally a signal space with M signal points is known as a M-ary signal space. In general, a signal space with M signal points may completely encode the floor of $\log_2 M$ bits or binary digits of information in each clock period or cycle. The floor of $\log_2 M$ is sometimes written as floor($\log_2 M$) or as $\lfloor \log_2 M \rfloor$. In general, the floor of $\log_2 M$ is the largest integer that is not greater than $\log_2 M$. When M is a power of two (i.e., the signal space has 2, 4, 8, 16, 32, 64, etc. signal points), then the floor of $\log_2 M$ generally is equal to $\log_2 M$, and $\log_2 M$ generally is known as the modulation index. Because the minimum quanta of information is the base-two binary digit or bit, the information to be mapped into a signal space generally is represented as strings of bits. However, one skilled in the art will be aware that the preferred embodiment of the present invention may work with representations of information in other number bases instead of or in addition to base two or binary.

As known to those of ordinary skill in the art, the demodulation process generally is somewhat the reverse of the modulation process and generally involves making best guess or maximum likelihood estimations of the originally transmitted information given that an electromagnetic signal or physical phenomena is received that may have been corrupted by various factors including, but not limited to, noise. In general, TMTS downstream radio frequency (RF) interface 554 carries signals that have been modulated for transmitting information downstream over an RF network. TMTS upstream radio frequency (RF) interface 555 generally carries signals that have to be demodulated to recover upstream information from an RF network. Although the preferred embodiments of the present invention generally use quadrature amplitude modulation (QAM), one skilled in the art will be aware of other possible modulation techniques. Furthermore, "Digital Communications, Fourth Edition" by John G. Proakis and "Digital Communications: Fundamentals and Applications, Second Edition" by Bernard Sklar are two common books on digital communications that describe at least some of the known modulation techniques. These two books by John G. Proakis and Bernard Sklar are incorporated by reference in their entirety herein.

Tables 1, 2, 3 and 4 generally show the transmission parameters used in the preferred embodiments of the present invention. One skilled in the art will be aware that other transmission characteristics and parameters could be used for alternative embodiments of the present invention. Table 1 specifies at least some of the preferred transmission parameters for downstream output from a TMTS. In addition, Table 2 specifies at least some of the preferred transmission parameters for downstream input into a cTM. Also, Table 3 specifies at least some of the preferred transmission parameters for upstream output from a cTM. Finally, Table 4 specifies at least some of the preferred transmission parameters for upstream input to a TMTS.

Furthermore, one skilled in the art will be aware that the concepts of the embodiments of the present invention could be used in different frequency ranges using optional frequency upconverters and/or downconverters. Therefore, although the preferred embodiments of the present invention may be designed to preferably work within the specified frequency ranges, the scope of the concepts of the present invention is also intended to include all variations of the present invention that generally involve frequency shifting the operational range of the upstream and/or downstream channels in a cable distribution network. Frequency shifting signals using upconverters and/or downconverters is known to one of ordinary skill in the art of cable networks.

TABLE 1

Downstream output from TMTS

| Parameter | Value |
|---|---|
| Channel Center Frequency (fc) | 54 MHz to 857 MHz ± 30 kHz |
| Level | Adjustable over the range 50 to 61 dBmV |
| Modulation Type | 64 QAM and 256 QAM |

TABLE 1-continued

Downstream output from TMTS

| Parameter | Value |
|---|---|
| Symbol Rate (nominal) | |
| 64 QAM | 5.056941 Msym/sec |
| 256 QAM | 5.360537 Msym/sec |
| Nominal Channel Spacing | 6 MHz |
| Frequency Response | |
| 64 QAM | ~18% Square Root Raised Cosine Shaping |
| 256 QAM | ~12% Square Root Raised Cosine Shaping |
| Output Impedance | 75 ohms |
| Output Return Loss | >14 dB within an output channel up to 750 MHz; >13 dB in an output channel above 750 MHz |
| Connector | F connector per [IPS-SP-406] |

±30 kHz includes an allowance of 25 kHz for the largest FCC frequency offset normally built into upconverters.

TABLE 2

Downstream input to cTM

| Parameter | Value |
|---|---|
| Center Frequency (fc) | 54 MHz to 857 MHz ± 30 kHz |
| Level | −5 dBmV to +15 dBmV |
| Modulation Type | 64 QAM and 256 QAM |
| Symbol Rate (nominal) | |
| 64 QAM | 5.056941 Msym/sec |
| 256 QAM | 5.360537 Msym/sec |
| Bandwidth | |
| 64 QAM | 6 MHz with ~18% Square Root Raised Cosine Shaping |
| 256 QAM | 6 MHz with ~12% Square Root Raised Cosine Shaping |
| Total Input Power (40-900 MHz) | <30 dBmV |
| Input (load) Impedance | 75 ohms |
| Input Return Loss | >6 dB 54-860 MHz |
| Connector | F connector per [IPS-SP-406] (common with the output) |

TABLE 3

Upstream output from cTM

| Parameter | Value |
|---|---|
| Channel Center Frequency (fc) | |
| Sub-split | 5 MHz to 42 MHz |
| Data-split | 54 MHz to 246 MHz |
| Number of Channels | Up to 3 |
| Nominal Channel Spacing | 6 MHz |
| Channel composition | Up to 14 independently modulated tones |
| Tone Modulation Type | QPSK, 16 QAM, 64 QAM or 256 QAM |
| Symbol Rate (nominal) | 337500 symbols/s |
| Tone Level | Adjustable in 2 dB steps over a range of −1 dBmV to +49 dBmV per tone (+10.5 dBmV to +60.5 dBmV per fully loaded channel, i.e. all 14 tones present) |

TABLE 3-continued

Upstream output from cTM

| Parameter | Value |
|---|---|
| Tone Frequency Response | 25% Square Root Raised Cosine Shaping |
| Occupied Bandwidth per Tone | 421.875 kHz |
| Occupied Bandwidth per Channel | 5.90625 MHz |
| Output Impedance | 75 ohms |
| Output Return Loss | >14 dB |
| Connector | F connector per [IPS-SP-406] |

TABLE 4

Upstream input to TMTS

| Parameter | Value |
|---|---|
| Channel Center Frequency (fc) | |
| Subsplit | 5 MHz to 42 MHz |
| Data-split | 54 MHz to 246 MHz |
| Tone nominal level | +20 dBmV |
| Tone Modulation Type | QPSK, 16 QAM, 64 QAM or 256 QAM |
| Symbol Rate (nominal) | 337500 symbols/s |
| Tone Bandwidth | 421.875 kHz with 25% Square Root Raised Cosine Shaping |
| Total Input Power (5-246 MHz) | <30 dBmV |
| Input (load) Impedance | 75 ohms |
| Input Return Loss | >6 dB 5-246 MHz |
| Connector | F connector per [IPS-SP-406] |

Generally, the downstream signals associated with TMTS 215 may or may not be combined in downstream RF combiner 556 with other downstream RF signals from applications such as, but not limited to, analog video, digital video, DOCSIS data, and/or cable telephony. Upstream RF splitter 557 may split the upstream signals for TMTS 215 from upstream signals for other applications such as, but not limited to, analog video, digital video, DOCSIS data, and/or cable telephony. Also, the downstream RF combiner 556 and upstream RF splitter 557 might be used to carry the communications for multiple transport modem termination systems, such as TMTS 215, over a cable transmission (CT) network 105. The signals used in communication between a TMTS 215 and at least one client transport modem (cTM) 265 generally might be treated like any other RF signals for various applications that generally are multiplexed into cable transmission (CT) network 105 based upon 6 MHz frequency channels.

If cable transmission (CT) network 105 is a hybrid fiber-coax (HFC) network, then the transport network 560 may include transmitter 561 receiver 562 as optical/electrical (O/E) interfaces that convert the RF signals between coaxial cable and fiber optical lines. In addition, transport combiner 563 may handle combining the two directions of optical signals as well as other potential data streams for communication over at least one fiber using techniques such as, but not limited to, wavelength-division multiplexing (WDM). Thus, in a preferred embodiment of the present invention using HFC as at least part of cable transmission (CT) network 105, transport media 565 may be fiber optical communication lines.

FIG. 5b generally shows the continuation of cable transmission (CT) network 105, transport network 560, and transport media 565 in providing connectivity between TMTS 215 and at least one client transport modem (cTM) 265. In a preferred embodiment of the present invention that utilizes fiber optic lines as at least part of transport network 560, transport splitter 567 may provide wavelength division multiplexing (WDM) and demultiplexing to separate the signals carried in the upstream and downstream directions and possibly to multiplex other signals for other applications into the same at least one fiber. If transport network 560 is a fiber network and cable transmission (CT) network 105 is a hybrid fiber-coax network, then at least one distribution node 568 may comprise optical/electrical interfaces to convert between a fiber transport network 560 and a coaxial cable distribution network 570. In general, there may be a distribution media interface 572 and distribution media 574 that provide connectivity between at least one client transport modem (cTM) 265 and distribution node 568.

A client transport modem (cTM) 265 generally comprises a cable transmission physical (PHY) transceiver (TX/RX) 165 as well as a remote-side network physical (PHY) transceiver (TX/RX) 275. In addition, a client transport modem (cTM) 265 comprises cable transmission (CT) physical (PHY) control (CTRL) 577 and system control 579. In general, CT PHY control 577 is concerned with handling bandwidth allocations in cable transmission (CT) network 105, and system control 579 generally is concerned with cTM management and/or configuration.

In the preferred embodiment of the present invention a client transport modem (cTM) 265 generally interfaces with at least one subscriber physical (PHY) interface network 580. Interfaces such as interface 285 in FIG. 2b may comprise a cable transport modem (cTM) 802.3 interface 581 and/or a cTM circuit emulation service (CES) interface 582 in FIG. 5b. Thus, a cTM may have multiple interfaces to different remote-side networks, and the interfaces may use different interface types and/or technologies. Also, a cTM 265 may have a cTM control interface 583 that is used to allow at least one provisioning terminal 585 to perform various tasks such as, but not limited to, configuration, control, operations, administration, and/or maintenance. In the preferred embodiment of the present invention, the cTM control interface 583 may use ethernet/802.3, though other interface types and technologies could be used. Also, cTM control interface 583 could use a separate interface from interfaces used to connect to remote-side networks such as subscriber local area network 595. Based on various policy decisions and criteria, such as but not limited to security, the cTM control interface 583 may be carried over the same communications medium that connects to various remote-side networks or it may be carried over a separate communications medium from that used in connecting to various remote-side networks. In the preferred embodiment of the present invention, the cTM control interface 583 is carried in a separate 802.3/ethernet medium for security.

Also, FIG. 5b shows client transport modem (cTM) 265 being connected over cTM circuit emulation service (CES) interface 582 to another remote-side network, the subscriber telephony network 596. Many remote or subscriber locations have legacy equipment and applications that use various interfaces commonly found in connections to the PSTN. The preferred embodiments of the present invention allow connection of these types of interfaces to the client transport modem (cTM) 265. Some non-limiting examples of these interfaces are analog POTS lines as well as various digital interfaces generally supporting N×56 and N×64 (where N is any positive integer). The digital interfaces may have a plurality of DS0s multiplexed into a larger stream of data using the plesiochronous digital hierarchy (PDH) and/or the synchronous digital hierarchy (SDH). In the preferred embodiments of the present invention, cTM CES interface 582 is a T1 line, which is part of the plesiochronous digital hierarchy (PDH).

Protocol Models

Figure 6:
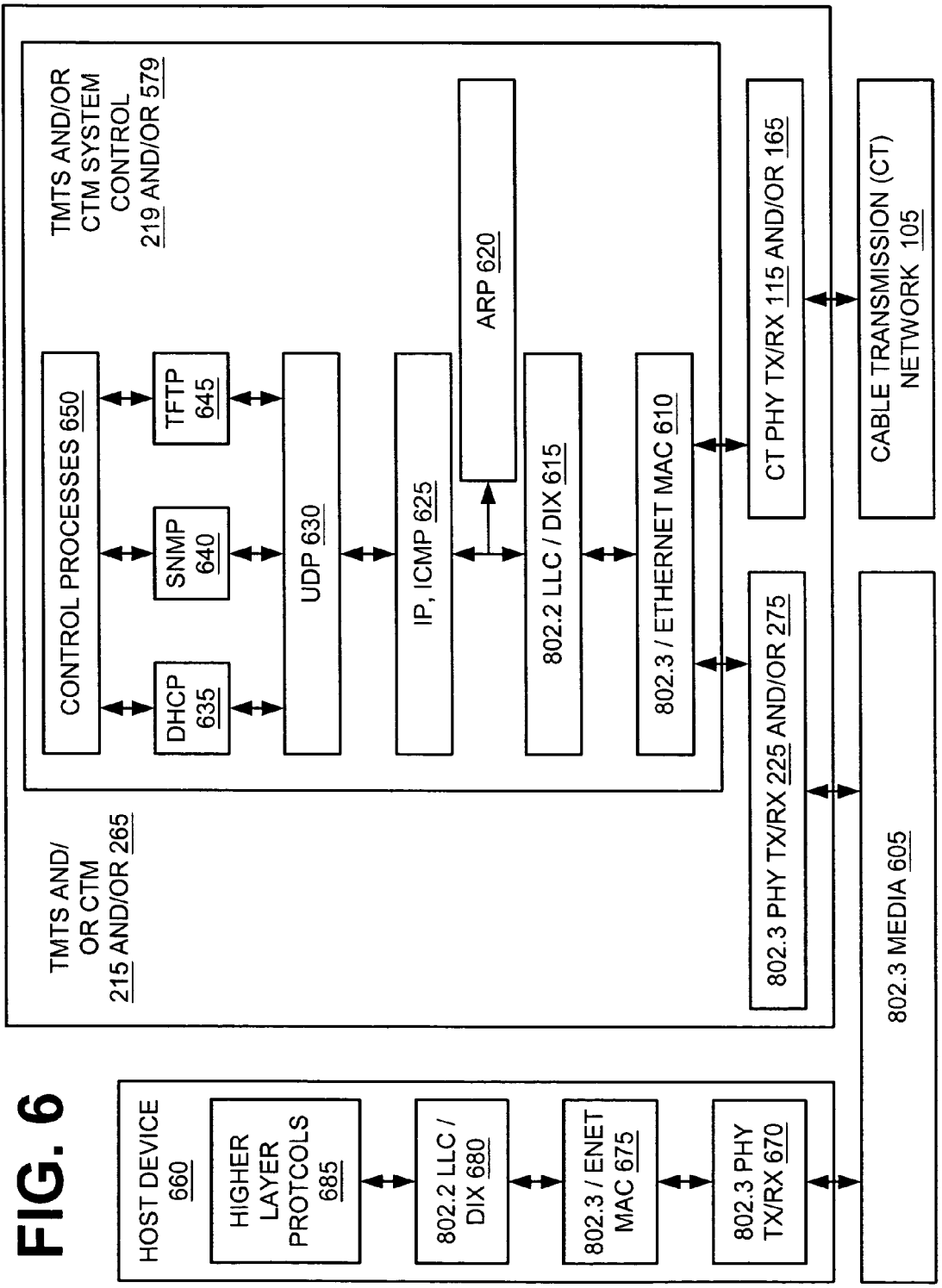
FIG. 6 shows a block diagram of some protocols that may be used in the system control of a transport modem termination system (TMTS) and/or a client transport modem (cTM).

FIG. 6 shows more detail of a preferred embodiment of a transport modem termination system (TMTS) 215 and/or a client transport modem (cTM) 265. In general, for various tasks such as, but not limited to, configuration, management, operations, administration, and/or maintenance, a TMTS 215 and/or a cTM 265 generally may have a capability of system control 219 and/or 579, respectively. In general, the system control 219 and/or 579 may have at least one cable transmission (CT) physical (PHY) transceiver (TX/RX) 115 and/or 165 as well as at least one interface for connecting to central-side and/or remote-side networks with ethernet/802.3 physical (PHY) transceiver 225 and/or 275 being the at least one type of connection to the central-side and/or remote-side networks in the preferred embodiment of the present invention. At least one cable transmission (CT) physical (PHY) transceiver (TX/RX) 115 and/or 165 generally is connected to at least one cable transmission (CT) network 105. Also, in the preferred embodiment of the present invention at least one ethernet/802.3 physical (PHY) transceiver 225 and/or 275 is connected to at least one ethernet/802.3 media 605.

In general, a single instance of a 802.3/ethernet media access control (MAC) algorithm could be used for both the 802.3 physical (PHY) transceiver (TX/RX) 225 and/or 275 as well as the cable transmission (CT) physical (PHY) transceiver (TX/RX) 115 and/or 165. In other embodiments multiple instances of a medium access control (MAC) algorithm may be used. In general, ethernet/802.3 uses a carrier sense multiple access with collision detection (CSMA/CD) MAC algorithm. Each instance of the algorithm generally is responsible for handling the carrier sensing, collision detection, and/or back-off behavior of one MAC collision domain. The details of the 802.3 MAC are further defined in IEEE standard 802.3-2000, "Part 3: Carrier sense multiple access with collision detection (CSMA/CD) access method and physical layer", which was published in 2000, and is incorporated by reference in its entirety herein.

The preferred embodiment of the present invention generally functions as a physical layer repeater between at least one 802.3 media 605 and at least one cable transmission (CT) network 105. Although repeaters may support a particular MAC algorithm for management and control purposes, generally repeaters do not break up a network into different collision domains and/or into different layer three sub-networks. However, one skilled in the art will be aware that other embodiments are possible for devices such as, but not limited to, bridges, switches, routers, and/or gateways. These other embodiments may have multiple instances of the same and/or different MAC algorithms.

Furthermore, the CSMA/CD MAC algorithm as well as the physical layer signals that generally are considered part of the ethernet/802.3 specification may be used to carry different frame types. In the preferred embodiment of the present invention, because of the wide-spread availability of Internet Protocol (IP) technology, the system control 219 for TMTS 215 and/or the system control 579 for cTM 265 generally may use IP for various tasks such as, but not limited to, configuration, management, operations, administration, and/or maintenance. On ethernet/802.3 networks, IP datagrams commonly are carried in Digital-Intel-Xerox (DIX) 2.0 or ethernet_II frames. However, other frame types may be used to carry IP datagrams including, but not limited to, 802.3 frames with 802.2 logical link control (LLC) and a sub-network access protocol (SNAP). Thus, 802.2 LLC/DIX 615 handles the correct frame type information for the IP datagrams communicated to and/or from the system control 219 and/or 579 of TMTS 215 and/or cTM 265, respectively. Often network devices using the internet protocol (IP) are configurable for 802.2 LLC and/or ethernet_II frame types.

In general, for communications with IP devices a mapping should exist between logical network layer addresses (such as IP addresses) and hardware, data link, or MAC layer addresses (such as ethernet/802.3 addresses). One protocol for dynamically determining these mappings between IP addresses and ethernet/802.3 addresses on broadcast media is the address resolution protocol (ARP). ARP is commonly used in IP devices that are connected to broadcast media such as ethernet/802.3 media. Thus, the preferred embodiments of the present invention generally support ARP 620 to allow tasks such as, but not limited to, configuration, management, operations, administration, and/or maintenance of TMTS 215 and/or cTM 265.

In the preferred embodiments of the present invention, TMTS 215 and/or cTM 265 generally support management and/or configuration as IP devices. Thus, system control 219 and/or 579 generally has an IP layer 625 that may also optionally include support for ICMP. The internet control message protocol (ICMP) is commonly used for simple diagnostic tasks such as, but not limited to, echo requests and replies used in packet internet groper (PING) programs. Generally, various transport layer protocols such as, but not limited to, the user datagram protocol (UDP) 630 are carried within IP datagrams. UDP is a connectionless datagram protocol that is used in some basic functions in the TCP/IP (Transmission Control Protocol/Internet Protocol) suite. Generally, UDP 630 supports the dynamic host configuration protocol (DHCP) 635, which is an extension to the bootstrap protocol (BOOTP), the simple network management protocol (SNMP) 640, the trivial file transfer protocol (TFTP) 645, as well as many other protocols within the TCP/IP suite.

DHCP 635 is commonly used in IP devices to allow dynamic assignment of IP addresses to devices such as TMTS 215 and/or cTM 265. SNMP 640 generally supports "sets" to allow a network management system to assign values on the network devices, "gets" to allow a network management system to retrieve values from network devices, and/or "traps" to allow network devices to inform a network management system of alarm conditions and events. TFTP 645 might be used to load a configuration from a file onto a network device, to save off a configuration of a network device to a file, and/or to load new code or program software onto a network device. These protocols of DHCP 635, SNMP 640, and TFTP 645 may be used in the preferred embodiment for control processes 650 in system control 219 and/or 579 of TMTS 219 and/or cTM 265, respectively.

Furthermore, one skilled in the art will be aware that many other interfaces are possible for tasks such as, but not limited to, configuration, management, operations, administration, and/or maintenance of TMTS 215 and/or cTM 265. For example, the system control 219 or 579 in TMTS 215 and/or cTM 265 may support the transmission control protocol (TCP) instead of or in addition to UDP 630. With TCP, control processes 650 could use other TCP/IP suite protocols such as, but not limited to, the file transfer protocol (FTP), the hyper text transfer protocol (HTTP), and the telnet protocol. One skilled in the art will be aware that other networking devices have used FTP for file transfer, HTTP for web browser user interfaces, and telnet for terminal user interfaces. Also, other common user interfaces on network equipment include, but are not limited to, serial ports, such as RS-232 console interfaces, as well as LCD (Liquid Crystal Display) and/or LED (Light Emitting Diode) command panels. Although the preferred embodiments of the present invention may use DHCP 635, SNMP 640, and/or TFTP 645, other embodiments using these other types of interfaces are possible for tasks such as, but not limited to, configuration, management, operations, administration, and/or maintenance of TMTS 215 and/or cTM 265.

In the preferred embodiments of the present invention, the local server facility 543 and/or the OA&M system 544 of FIG. 5a as well as the provisioning terminal 585 of FIG. 5b are at least one host device 660 that communicates with control processes 650 of TMTS 215 and/or cTM 265. In general, at least one host device 660 may be connected to 802.3 media 605 through 802.3 physical (PHY) transceiver (TX/RX) 670. Host device 660 may have an 802.3/ethernet (ENET) media access control (MAC) layer 675, an 802.2 LLC/DIX layer 680, and higher layer protocols 685. Although FIG. 6 shows host device 660 directly connected to the same 802.3 media 605 as TMTS 215 or cTM 265, in general there may be any type of connectivity between host device 660 and TMTS 215 and/or cTM 265. This connectivity may include networking devices such as, but not limited to, repeaters, bridges, switches, routers, and/or gateways. Furthermore, host device 660 does not necessarily have to have the same type of MAC interface as TMTS 215 and/or cTM 265. Instead, host device 660 generally is any type of IP host that has some type of connectivity to TMTS 215 and/or cTM 265 and that supports the proper IP protocols and/or applications for tasks such as, but not limited to, configuration, management, operations, administration, and/or maintenance.

Figure 7:
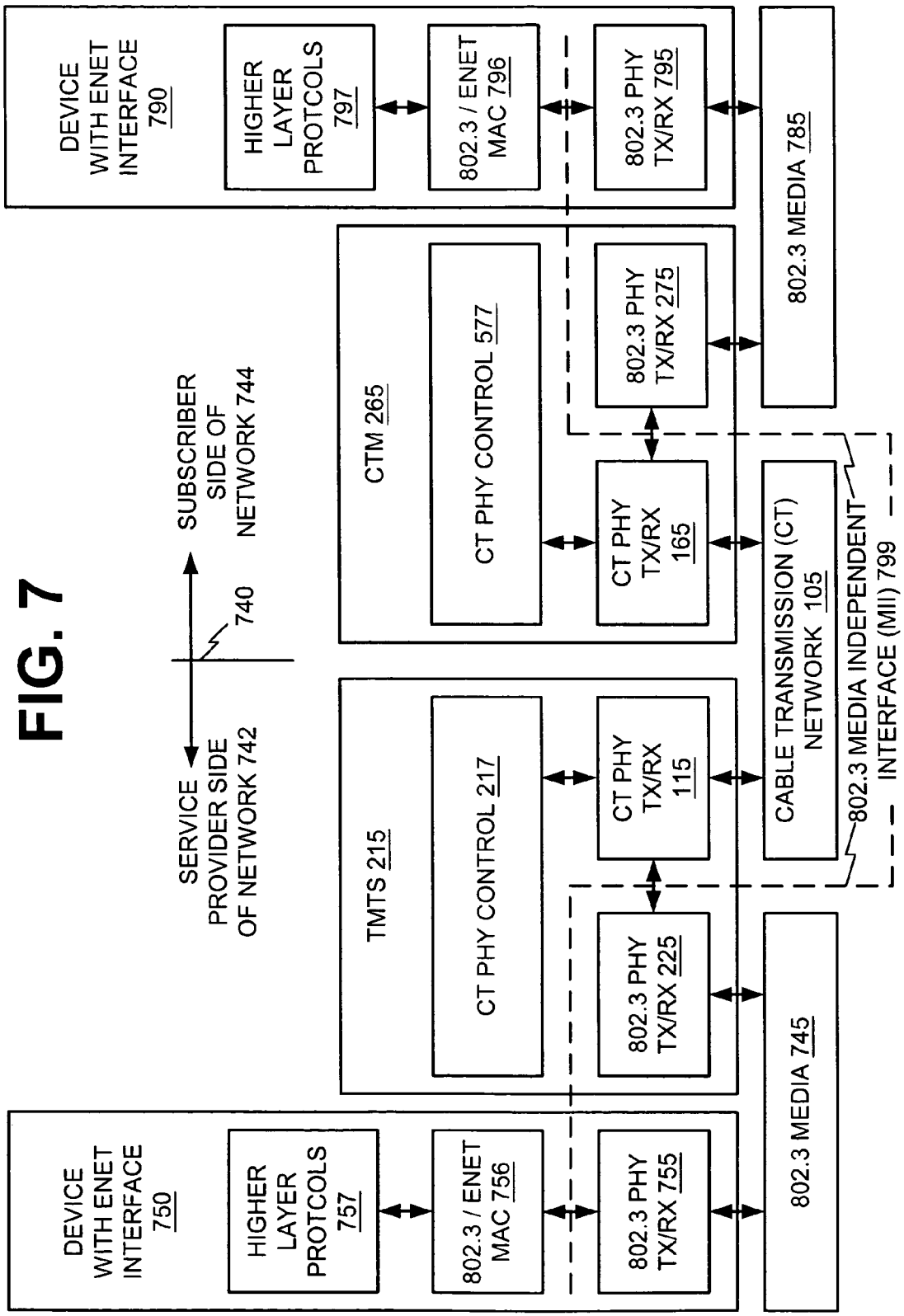
FIG. 7 shows a block diagram of a TMTS and a cTM providing physical layer repeater service.

FIG. 7 shows a more detailed breakdown of how TMTS 215 and cTM 265 might provide communication over cable transmission network 105. The preferred embodiments of the present invention might be used in a network generally divided at point 740 into a service-provider-side (or central-side) of the network 742 as well as a subscriber-side, customer-side, or remote-side of the network 744. In general, TMTS 215 would be more towards the central-side or service-provider-side of the network 742 relative to cTM 265, which would be more towards the subscriber-side, customer-side, or remote-side of the network 744 relative to the TMTS 215. As was shown in FIGS. 5a and 5b, and is shown again in FIG. 7, TMTS 215 may comprise a cable transmission (CT) physical (PHY) transceiver (TX/RX) 115, an ethernet/802.3 physical (PHY) transceiver (TX/RX) 225, and a cable transmission (CT) physical (PHY) control 217. Also, cTM 265 may comprise a cable transmission (CT) physical (PHY) transceiver (TX/RX) 165, an ethernet/802.3 physical (PHY) transceiver (TX/RX) 275, and a cable transmission (CT) physical (PHY) control 577.

In the preferred embodiment of the present invention, TMTS 215 and cTM 265 generally provide layer one, physical level repeater service between ethernet/802.3 physical (PHY) transceiver (TX/RX) 225 and ethernet/802.3 physical (PHY) transceiver (TX/RX) 275. Furthermore, cable transmission (CT) physical (PHY) control 217 in TMTS 215 generally communicates with cable transmission (CT) physical (PHY) control 577 in cTM 265 to allocate and/or assign bandwidth. In addition to allocating and/or assigning bandwidth, cable transmission (CT) physical control 217 and cable transmission (CT) physical control 577 generally may include mechanisms to request and release bandwidth as well as to inform the corresponding cable transmission (CT) physical (PHY) control of the bandwidth allocations. Also, cable transmission (CT) physical control 217 and cable transmission (CT) physical control 577 generally may communicate to negotiate cTM radio frequency (RF) power levels so that the TMTS receives an appropriate signal level.

In the preferred embodiments of the present invention, the TMTS 215 and the cTM 265 generally are transparent to ethernet/802.3 frames communicated between ethernet/802.3 physical (PHY) transceiver (TX/RX) 225 and ethernet/802.3 physical (PHY) transceiver 275. To maintain this transparency, the communication between cable transmission (CT) physical (PHY) control 217 and cable transmission (CT) physical (PHY) control 577 generally do not significantly modify and/or disturb the ethernet frames communicated between 802.3/ethernet physical (PHY) transceiver (TX/RX) 225 and 802.3/ethernet physical (PHY) transceiver (TX/RX) 275. There are many possible ways of communicating between cable transmission (CT) physical (PHY) control 217 and cable transmission (CT) physical (PHY) control 577 of TMTS 215 and cTM 265, respectively, while still maintaining transparency for the 802.3 physical transceivers 225 and/or 275. In the preferred embodiments of the present invention, the traffic between cable transmission (CT) physical (PHY) control 217 and 577 of TMTS 215 and cTM 265, respectively, is multiplexed into the same data stream with 802.3/ethernet traffic between 802.3 physical (PHY) transceivers 225 and 275 of TMTS 215 and cTM 265, respectively. However, the control traffic generally uses a different frame than standard ethernet/802.3 traffic.

Ethernet/802.3 frames generally begin with seven octets of preamble followed by a start frame delimiter of 10101011 binary or AB hexadecimal. (In reality ethernet DIX 2.0 has an eight octet preamble, and IEEE 802.3 has a seven octet preamble followed by a start frame delimiter (SFD). In either case, these initial eight octets are generally the same for both ethernet DIX 2.0 and IEEE 802.3.) To differentiate control frames between cable transmission (CT) physical (PHY) control 217 and 577 from ethernet frames between 802.3 physical (PHY) transceivers (TX/RX) 225 and 275, a different value for the eighth octet (i.e., the start frame delimiter) may be used on the control frames. Because most devices with ethernet/802.3 interfaces would consider a frame with a start frame delimiter (SFD) to be in error, these control frames generally are not propagated through 802.3 physical (PHY) transceivers (TX/RX) 225 and/or 275. This solution offers the advantage of the control frames that communicate bandwidth allocations being generally inaccessible to devices on directly connected 802.3 media. This lack of direct accessibility to the control frames may provide some security for communications about bandwidth allocations, which may be related to various billing policies. Because cable transmission (CT) physical (PHY) control 217 and 577 generally does not generate 802.3 or ethernet frames in the preferred embodiment of the present invention, FIG. 7 shows cable transmission (CT) physical (PHY) control 217 and 577 generally connected to cable transmission (CT) physical (PHY) transceivers (TX/RX) 115 and 165, respectively, and generally not connected to 802.3/ethernet physical (PHY) transceivers (TX/RX) 225 and 275, respectively.

As shown in FIG. 7, ethernet/802.3 physical (PHY) transceiver (TX/RX) 225 in TMTS 215 generally is connected to 802.3/ethernet media 745, which is further connected to at least one device with an ethernet interface 750. Device with ethernet interface 750 may further comprise an 802.3/ethernet physical (PHY) transceiver (TX/RX) 755, an 802.3/ethernet medium access control layer 756, as well as other higher layer protocols 757. Also, ethernet/802.3 physical (PHY) transceiver (TX/RX) 275 in cTM 265 generally is connected to 802.3/ethernet media 785, which is further connected to at least one device with an ethernet interface 790. Device with ethernet interface 790 may further comprise an 802.3/ethernet physical (PHY) transceiver (TX/RX) 795, an 802.3/ethernet medium access control layer 796, as well as other higher layer protocols 797.

In general, the preferred embodiments of the present invention provide transparent physical layer repeater capability that may carry information between device with ethernet interface 750 and device with ethernet interface 790. As a non-limiting example, device with ethernet interface 750 may have information from a higher layer protocol such as, but not limited to, an IP datagram. In FIG. 7, this IP datagram is formed in the higher layer protocols block 757 and is passed down to 802.3/ethernet MAC layer 756, which adds data link information to form an ethernet frame. Then 802.3 physical (PHY) transceiver (TX/RX) 755 handles generating the proper electromagnetic signals to propagate the information over 802.3/ethernet media 745. In the preferred embodiments of the present invention, TMTS 215 functions as a repeater that copies bits (or other forms of information) received from 802.3/ethernet media 745 by 802.3/ethernet physical (PHY) transceiver (TX/RX) 225. The bits are copied over to cable transmission (CT) physical (PHY) transceiver (TX/RX) 115, which generates the proper signals to communicate the information over cable transmission network 105. (Note: in some embodiments some portions of the signal generation may be performed externally to the TMTS 215 as in at least one external QAM modulator 552.)

After propagating through cable transmission (CT) network 105, the bits (or other forms of information) are received in cable transmission (CT) physical (PHY) transceiver (TX/RX) 165 of cTM 265. In the preferred embodiments of the present invention, cTM 265 functions as a repeater that copies bits (or other forms of information) received from cable transmission network 105 by cable transmission (CT) physical (PHY) transceiver (TX/RX) 165. The bits are copied over to 802.3/ethernet physical (PHY) transceiver (TX/RX) 275, which generates the proper signals to communicate the information over 802.3/ethernet media 785.

In device with ethernet interface 790, 802.3/ethernet physical (PHY) transceiver (TX/RX) 795 receives the electromagnetic signals on 802.3/ethernet media 785 and recovers the bits (or other forms of information) from the electromagnetic signals. Next, 802.3/ethernet media access control (MAC) 796 generally checks the ethernet/802.3 framing and verifies the frame check sequence (FCS) or cyclic redundancy code (CRC). Finally, the IP datagram is passed up to higher layer protocols 797. Generally, a reverse process is followed for communications in the opposite direction.

Furthermore, it is to be understood that embodiments of the present invention are capable of providing similar connectivity over cable transmission (CT) network 105 to devices (such as device with ethernet interface 750 and device with ethernet interface 790), which may be directly connected to 802.3/ethernet media 745 and/or 785 as well as other devices that are not directly connected to 802.3/ethernet media 745 and/or 785. Thus, other devices which are indirectly connected to 802.3/ethernet media through other media, links, and/or networking devices may also utilize the connectivity provided by the preferred embodiments of the present invention.

In the preferred embodiments of the present invention, TMTS 215 can be thought of as providing level one, physical layer repeater service between 802.3/ethernet physical (PHY) transceiver (TX/RX) 225 and cable transmission (CT) physical (PHY) transceiver (TX/RX) 115. Also in the preferred embodiments of the present invention, cTM 265 can be thought of as providing level one, physical layer repeater service between 802.3/ethernet physical (PHY) transceiver (TX/RX) 275 and cable transmission (CT) physical (PHY) transceiver (TX/RX) 165. In addition, in the preferred embodiments of the present invention, TMTS 215 and cTM 265 together can be thought of as providing level one, physical layer repeater service between 802.3/ethernet physical (PHY) transceiver (TX/RX) 225 and 802.3/ethernet physical (PHY) transceiver (TX/RX) 275. In providing level one, physical layer repeater service between 802.3/ethernet physical (PHY) transceiver (TX/RX) 225 and 802.3/ethernet physical (PHY) transceiver (TX/RX) 275, TMTS 215 and cTM 265 each may be thought of as half-repeaters of a repeater pair.

In general, networking devices connecting local area networks (or LANs such as, but not limited to, ethernet/802.3 media 745 and 785) over a wide-area network (or WAN such as, but not limited to, cable transmission network 105) may be viewed using at least two abstractions or models. First, the two devices at each end of the WAN may be viewed as independent networking devices each acting as a repeater, bridge, switch, router, gateway, or other type of networking device connecting the LAN and the WAN. Alternatively, a pair of networking devices on each end of a WAN could be viewed based on each networking device providing one half of the service provided over the WAN. Thus, each networking device at the end of a WAN could be thought of as a half-repeater, half-bridge, half-switch, half-router, half-gateway, etc. for a pair of networking devices providing connectivity across a WAN. In addition, one skilled in the art will be aware that the networking devices on each end of a connection may actually perform according to different forwarding constructs or models (such as, but not limited to, repeater, bridge, switch, router, and/or gateway). Thus, one skilled in the art will be aware that one of the networking devices (either the TMTS 215 or a cTM 265) connected to cable transmission network may provide services such as, but not limited to, repeater, bridge, switch, router, and/or gateway while the other networking device (either a cTM 265 or the TMTS 215, respectively) may provide the same or different services such as, but not limited to, repeater, bridge, switch, router, and/or gateway. Furthermore, each networking device could provide different services or forwarding constructs for different protocols.

Therefore, even though the preferred embodiments of the present invention have a repeater service or forwarding construct for both a TMTS 215 and a cTM 265 as well as a TMTS 215 and a cTM 265 jointly, one skilled in the art will be aware that other embodiments of the present invention are possible in which the forwarding construct for a TMTS 215 and/or a cTM may be independently chosen. Furthermore, the forwarding construct could be different for each client transport modem 265, 266, 267, and 268 connected to the same TMTS 215. Also, transport modem termination systems 215 may have different forwarding behavior or forwarding constructs for each port. In addition, multiple TMTS 215 devices might utilize different forwarding constructs but still be connected to the same cable transmission network 105. Also, one skilled in the art will be aware of hybrid forwarding constructs in addition to the general layer one repeater service, layer two bridge service, and/or layer three routing service. Any hybrid type of forwarding construct also might be used as alternative embodiments of the present invention. Therefore, one skilled in the art will be aware that alternative embodiments exist utilizing other forwarding constructs in addition to the layer one, repeater service of the preferred embodiment of the present invention.

FIG. 7 further shows an 802.3/ethernet media independent interface (MII) 799 as a dashed line intersecting connections to various 802.3/ethernet physical layer interfaces or transceivers (755, 225, 275, and 795). In general, the IEEE 802.3 standards define a media independent interface for 100 Mbps ethernet and a Gigabit media independent interface (GMII) for 1000 Mbps ethernet. References in the figures and description to MII and/or GMII are meant to include both MII and GMII. Generally, the MII and GMII interfaces allow 802.3 interfaces to be made that can be interfaced with different physical cables. As a non-limiting example, 100BaseT4, 100BaseTX, and 100BaseFX are three different types of physical cables/optical lines that can be used in the IEEE 802.3 ethernet standards covering 100 Mbps or fast ethernet. 100BaseTX is designed for twisted pair cables, whereas 100BaseFX is designed for fiber optic cables. The media independent interface (MII) provides a standard interface for communicating with devices designed to form and interpret the physical electrical and/or optical signals of different types of media.

Figure 8:
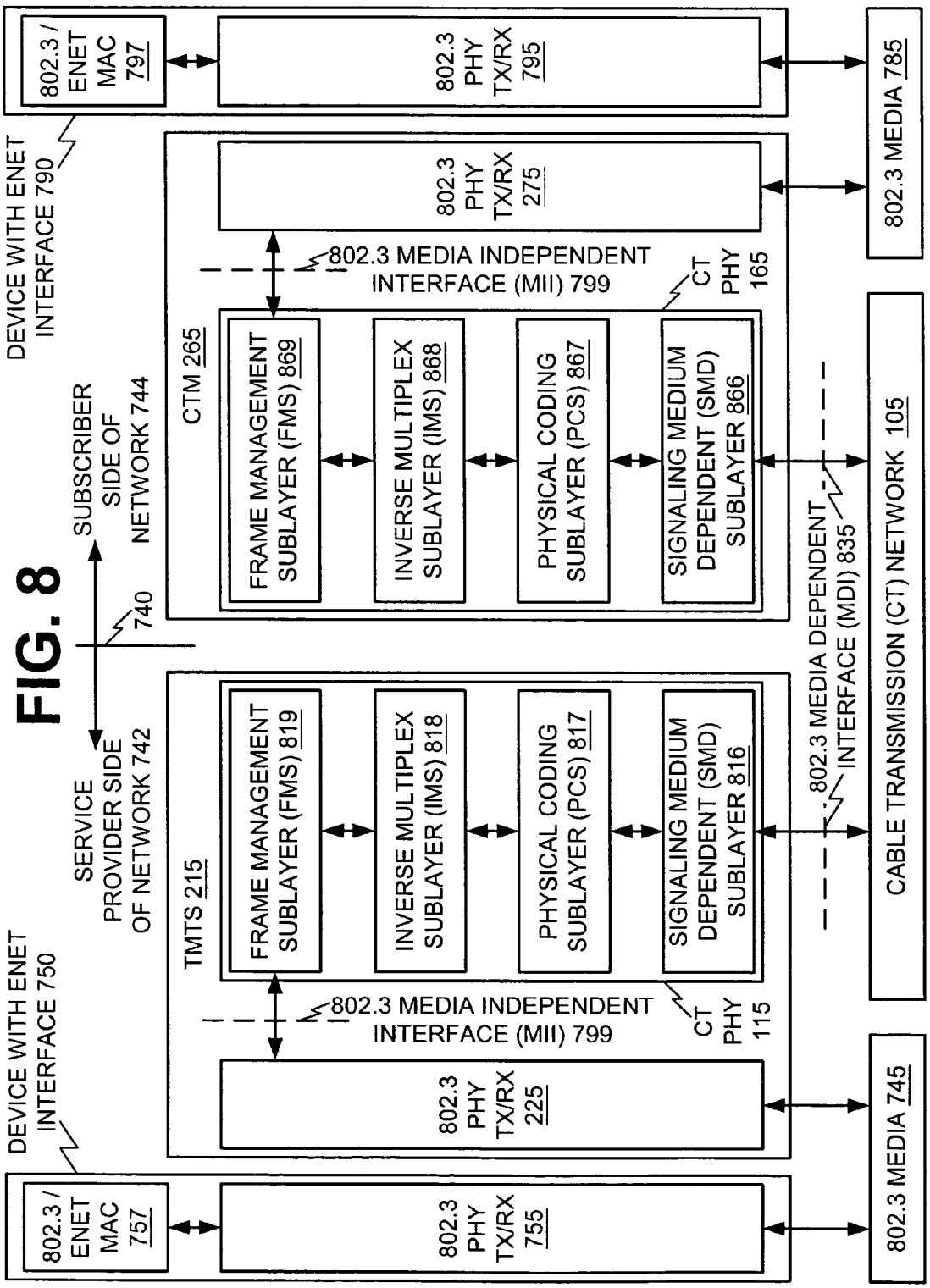
FIG. 8 shows an expanded block diagram of the protocol sublayers within the physical layer of the TMTS and the cTM.

FIG. 8. shows a more detailed diagram for connecting ethernet devices through a transport modem termination system (TMTS) 215 and a client transport modem (cTM) 265. FIG. 8 further divides the cable transmission (CT) physical (PHY) transceiver (TX/RX) 115 and 165. TMTS 215 comprises CT PHY 115, which further comprises signaling medium dependent (SMD) sublayer 816, physical coding sublayer (PCS) 817, inverse multiplex sublayer (IMS) 818, and frame management sublayer (FMS) 819. FMS 819 connects to 802.3/ethernet physical transceiver 225 through 802.3/ethernet media interface (MII) 799. SMD sublayer 816 communicates through cable transmission (CT) network 105 across 802.3/ethernet media dependent interface (MDI) 835.

Also client transport modem 265 has a cable transmission physical transceiver 165 that comprises signaling medium dependent (SMD) sublayer 866, physical coding sublayer (PCS) 867, inverse multiplex sublayer (IMS) 868, and frame management sublayer (FMS) 869. SMD sublayer 866 communicates through cable transmission network 105 across 802.3 media dependent interface (MDI) 835. FMS 869 provides an 802.3 media independent interface (MII) 799, which may be connected to an 802.3 ethernet physical transceiver 275.

In general, FMS 819 and 869 provide management functions that allow control traffic to be combined with and separated from data traffic. A frame management sublayer (such as FMS 819 and/or 869) may support a plurality of 802.X interfaces. Each active 802.X port of FMS 869 in client transport modem 265 generally has a one-to-one relationship with an associated active 802.X port in a transport modem termination system 215. Generally FMS 819 within TMTS 215 has similar behavior to FMS 869 in cTM 265. However, as TMTS 215 generally is a concentrator that may support a plurality of client transport modems, such as cTM 265, FMS 819 of TMTS 215 usually has more 802.X interfaces than FMS 869 of cTM 265.

The inverse multiplex sublayer of IMS 818 and IMS 868 generally is responsible for multiplexing and inverse multiplexing data streams of FMS 819 and 869 across multiple frequency-division multiplexed (FDM) carriers. The asymmetrical differences in cable transmission networks between one-to-many downstream broadcast and many-to-one upstream transmission generally lead to different techniques for downstream multiplexing than the techniques for upstream multiplexing. In the preferred embodiment of the present invention downstream multiplexing utilizes streams of MPEG (Moving Picture Experts Group) frames on shared frequencies of relatively larger bandwidth allocations, while upstream multiplexing utilizes non-shared frequencies of relatively smaller bandwidth allocations. Even though the upstream and downstream bandwidth allocation techniques of the inverse multiplexing sublayer (IMS) are different, the preferred embodiments of the present invention are still capable of providing symmetrical upstream and downstream data rates (as well as asymmetrical data rates). Furthermore, the inverse multiplexing sublayer (IMS) splits the incoming sequential octets of FMS data flows (i.e., flows of data from and/or to FMS ports) for parallel transmission across a cable transmission network utilizing a plurality of frequency bands in parallel. This parallel transmission of data flows will tend to have lower latency than serial transmission.

The physical coding sublayer (such as PCS 817 and 867) generally is responsible for handling forward error correction (FEC) and quadrature amplitude modulation (QAM) coding and decoding of the information communicated between IMS sublayer peer entities (such as IMS 818 and IMS 868). The signaling medium dependent (SMD) sublayer (such as the SMD peer entities 816 and 866) generally is responsible for communicating the encoded and modulated information from the physical coding sublayer onto a cable transmission network 105 at the proper frequency ranges and in the proper optical and/or electrical carrier waves.

Figure 9:
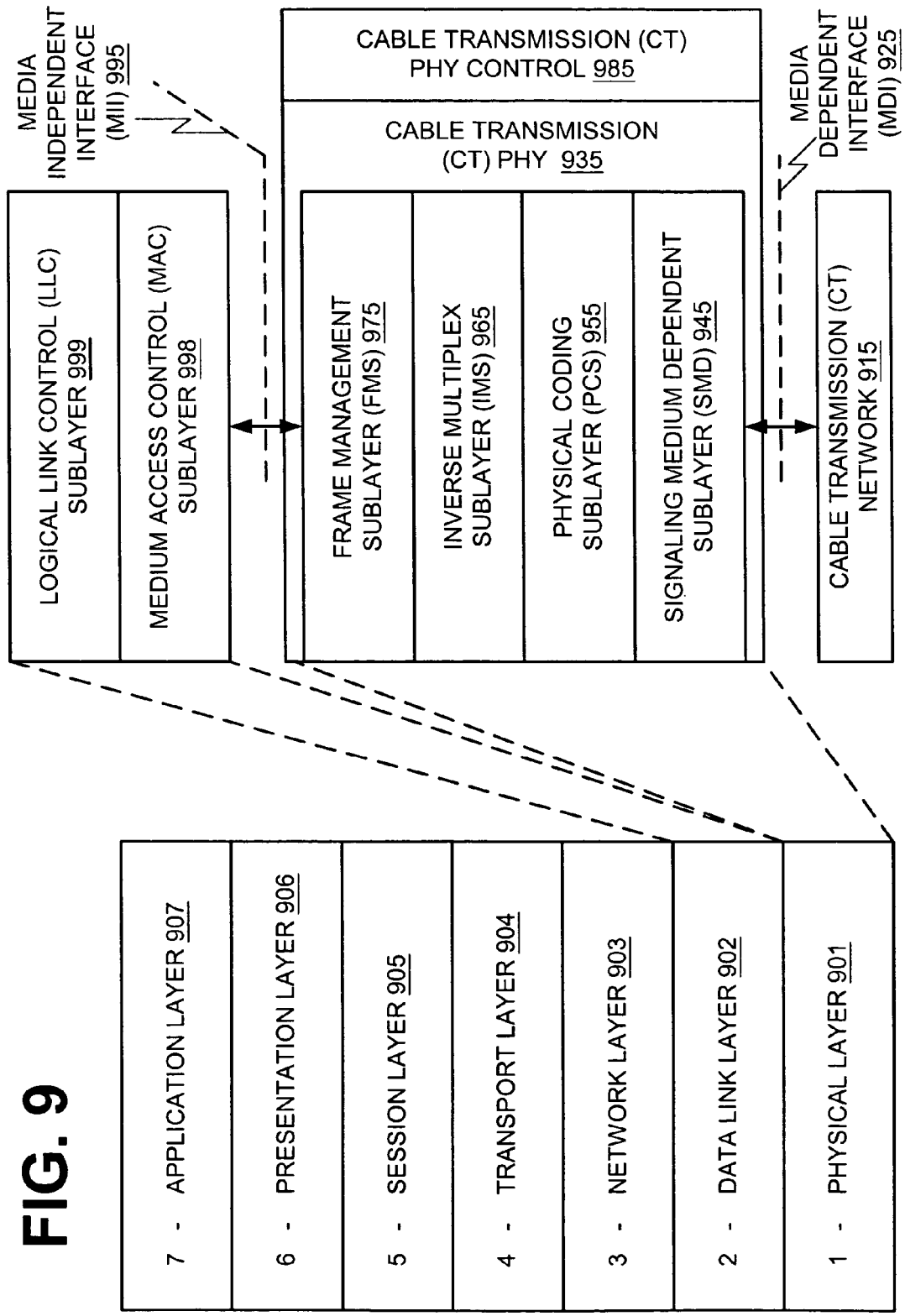
FIG. 9 shows how a cable transmission physical layer fits in the OSI model.

FIG. 9 shows the open systems interconnect (OSI) seven-layer model, which is known to one of skill in the art, as well as the relationship of the OSI model to the physical layer specification of the preferred embodiments of the present invention and to some portions of the IEEE 802.X standards. In OSI terminology corresponding layers (such as the layer 3 Internet Protocol) of two communicating devices (such as IP hosts) are known as peer entities. The OSI model comprises the level 1 physical layer 901, the level 2 data link layer 902, the level 3 network layer 903, the level 4 transport layer 904, the level 5 session layer 905, the level 6 presentation layer 906, and the level 7 application layer 907. The preferred embodiments of the present invention generally operate over communication media that function as cable transmission network 915. Although cable transmission network 915 certainly comprises hybrid fiber-coax (HFC) cable plants, CT network 915 more generally also comprises all coax and all fiber transmission plants. Furthermore, cable transmission network 915 even more generally comprises any communication medium using frequency-division multiplexing (FDM) and/or the optical variation of frequency division multiplexing known as wavelength division multiplexing (WDM).

The cable transmission network 915 communicates information across a media dependent interface (MDI) 925 with cable transmission physical layer 935. FIG. 9 shows that cable transmission physical layer 935 is associated with the physical layer 901 of the OSI model. Similarly to FIG. 8, cable transmission PHY 935 is shown in FIG. 9 with the four sublayers of the signaling medium dependent sublayer (SMD) 945, physical coding sublayer (PCS) 955, inverse multiplex sublayer (IMS) 965, and frame management sublayer (FMS) 975. The SMD 945, PCS 955, IMS 965, and FMS 975 sublayers form a user plane that generally is concerned with communicating user data. In addition, cable transmission PHY control 985 provides functions generally associated with management and/or control of communications through cable transmission physical layer 935 and the corresponding four sublayers (945, 955, 965, and 975).

FIG. 9 further shows how data link layer 902 is divided into medium access control sublayer (MAC) 998 and logical link control sublayer (LLC) 999 that are generally described in the IEEE 802 standards. IEEE 802.3 generally describes the carrier sense multiple access with collision detection (CSMA/CD) medium access control (MAC) protocol, while IEEE 802.2 generally describes the logical link control (LLC) protocol. Cable transmission physical layer 935 generally has a media independent interface (MII) 995 that provides connectivity between FMS 975 and an IEEE 802.3 MAC. Furthermore, one skilled in the art will be aware that the OSI model as well as other communication models are only abstractions that are useful in describing the functionality, behavior, and/or interrelationships among various portions of communication systems and the corresponding protocols. Thus, portions of hardware and/or software of actual networkable devices and the associated protocols may not perfectly match the abstractions of various communication models. Often when multi-layer abstract models of communication systems are mapped onto actual hardware and/or software the dividing line between one layer (or sublayer) and an adjacent layer (or sublayer) becomes somewhat blurred as to which hardware and/or software elements are part of which abstract layer. Furthermore, it is often efficient to used shared portions of hardware and/or software to implement interfaces between the abstract layers. However, the abstract models are useful in describing the characteristics, behavior, and/or functionality of communication systems.

Figure 10:
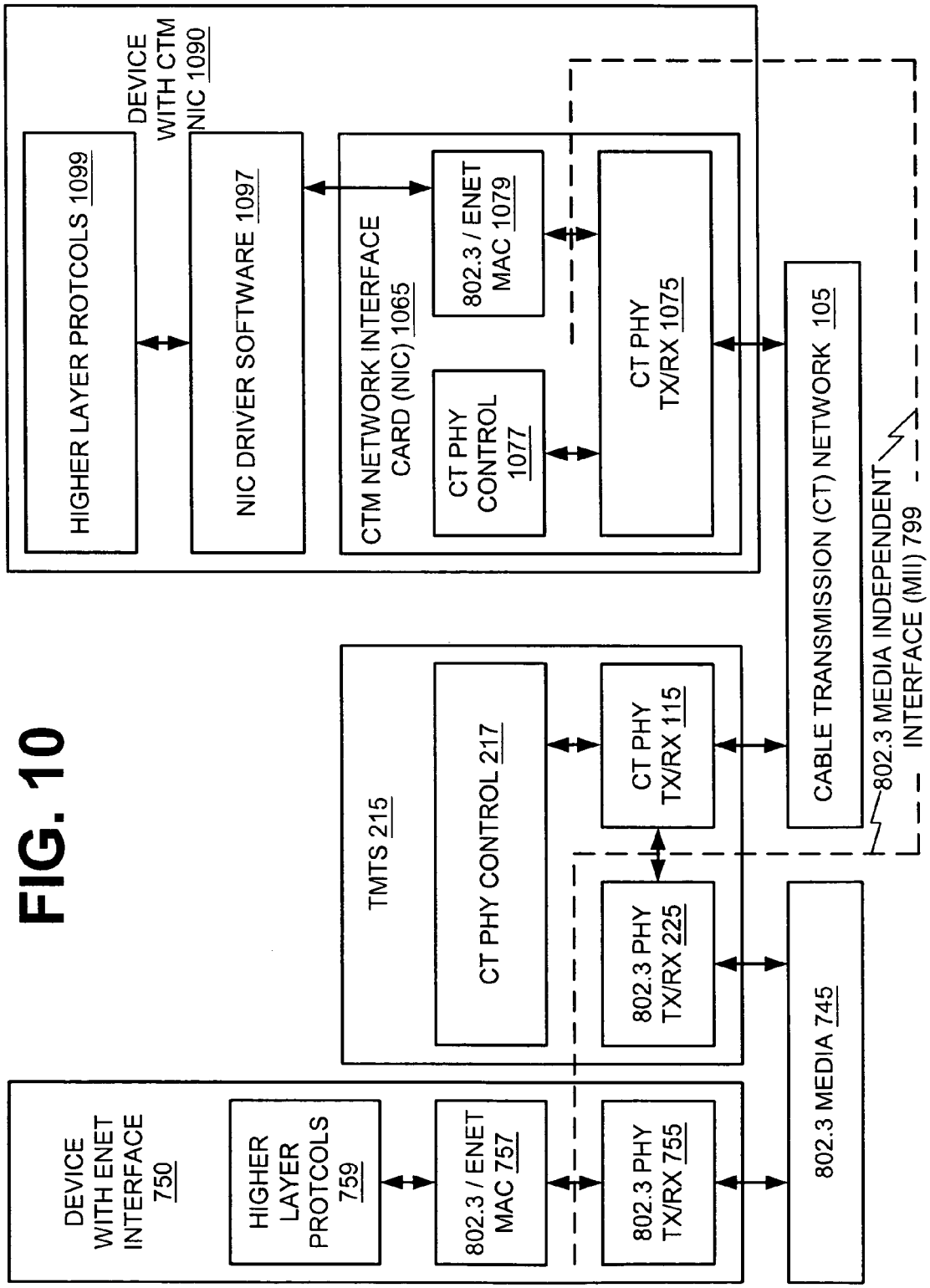
FIG. 10 shows a cable transmission physical layer that is part of a network interface card.
Figure 11:
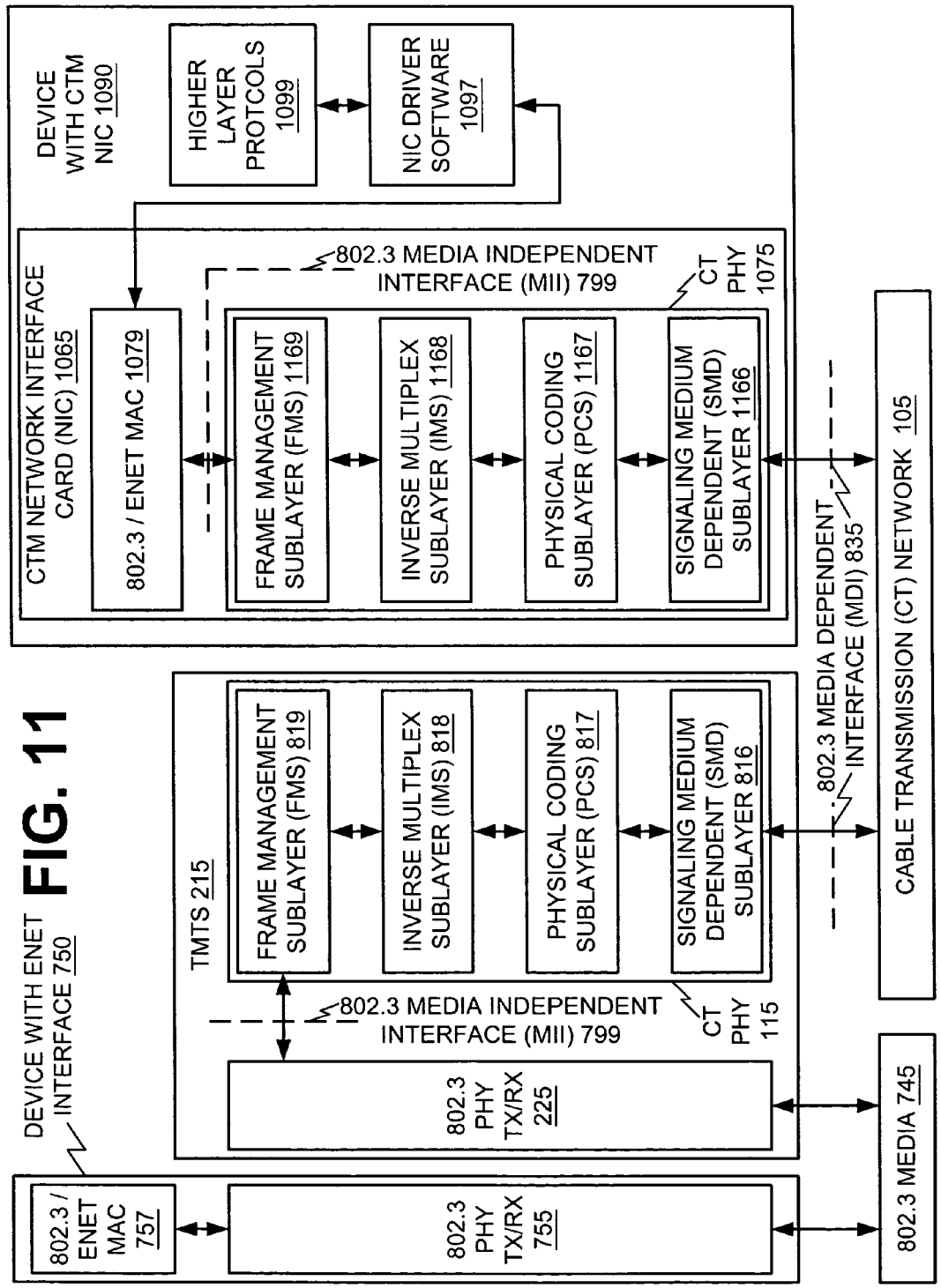
FIG. 11 shows an expansion of the cable transmission physical layer expanded into four sublayers in a network interface card.

Much like peer entities of OSI protocol layers, there can also be peer entities of protocol sublayers. Thus, corresponding FMS, IMS, PCS, and/or SMD sublayers in communicating devices could be considered peer entities. Given this peer entity relationship, one of many alternative embodiments of the present invention is shown in FIG. 10. TMTS 215 and device with ethernet interface 750 are shown again in FIG. 10 but this time TMTS 215 transfers information with a client transport modem network interface card (NIC) 1065. CTM NIC 1065 comprises a CT physical layer transceiver (TX/RX) 1075 that is a peer entity of CT physical layer transceiver 115 of TMTS 215. Also, cTM NIC 1065 further comprises CT physical layer control 1077 that is a peer entity of CT physical layer control 217 of TMTS 215. Also, cTM NIC 1065 comprises 802.3/ethernet MAC 1079 that is a peer entity of 802.3/ethernet MAC 757 in device with ethernet interface 750.

Client transport modem NIC 1065 is shown within device with cTM NIC 1090, which further contains NIC driver software 1097 and higher layer protocols 1099. If device with cTM NIC 1090 is a personal computer, then NIC driver software 1097 might conform to one of the driver specifications, such as but not limited to, NDIS (Network Driver Interface Specification), ODI (Open Data-Link Interface), and/or the Clarkson packet drivers. Usually a network interface card plugs into a bus card slot and then uses driver software to interface with higher layer protocols. One skilled in the art will be aware that the cable transmission physical layer of the preferred embodiment of the present invention could be implemented in any type of networkable device in addition to PCs and workstations. Some non-limiting examples of networkable devices include computers, gateways, routers, switches, bridges, and repeaters. Sometimes these devices have expansion card buses that could be used to interface to logic implementing the cable transmission physical layer 1075 of the preferred embodiments of the present invention. Alternatively, the preferred embodiments of the present invention could be directly integrated into the base units of networkable devices. FIG. II further expands cable transmission physical layer 1075 (and the associated physical layer transceiver) into SMD sublayer 1166, PCS sublayer 1167, IMS sublayer 1168, and frame management sublayer 1169.

Frame Management Sublayer (FMS) Data Flows

Figure 12:
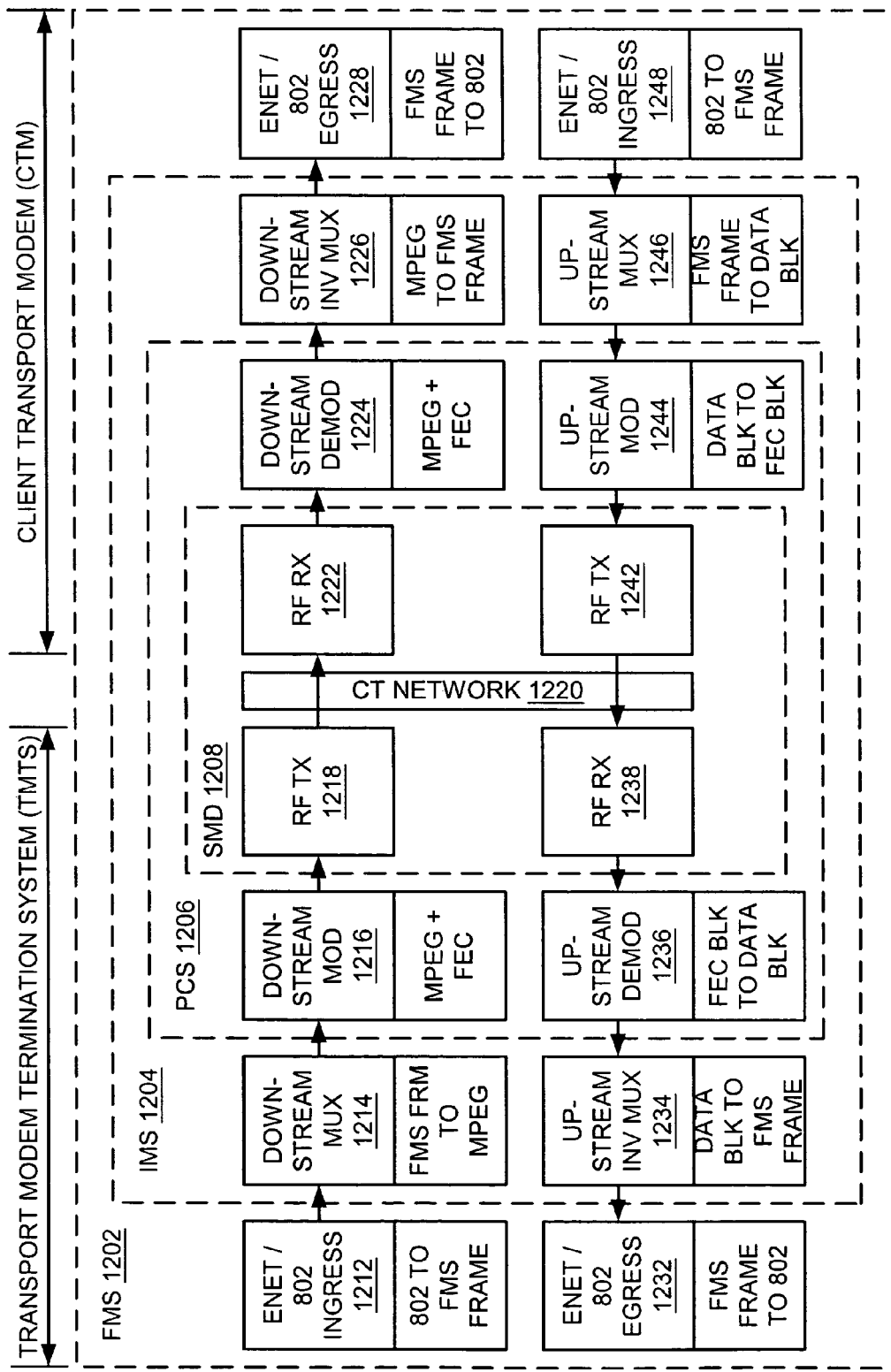
FIG. 12 shows a reference diagram of the downstream and upstream functions of the four sublayers.

FIG. 12 shows a system diagram using the physical layer of the preferred embodiment of the present invention for communication between a transport modem termination system and a client transport. The four sublayers (FMS 1202, IMS 1204, PCS 1206, and SMD 1208) are shown within dashed boxes. The upper portion of FIG. 12 shows downstream communication from a TMTS to a cTM, while the lower portion of FIG. 12 shows upstream communication from a cTM to a TMTS.

In the downstream communication ethernet/802 packets ingress into a cable transmission physical layer of the preferred embodiments of the present invention at ethernet/802 ingress 1212, which performs a conversion from ethernet/802 packets to FMS frames. FMS frames are then communicated to downstream multiplexer 1214 which converts the octets in FMS frames to octets in MPEG frames. MPEG headers and MPEG forward error correction (FEC) coding, which generally is a Reed-Solomon code, generally are added for communication to downstream modulator(s) 1216. The output of downstream modulator(s) 1216 is passed through radio frequency (RF) transmitter (TX) 1218, which generates the electrical and/or optical signals in the proper frequencies. These signals are communicated over cable transmitter network 1220 into RF receiver (RX) 1222. The incoming information in the electrical and/or optical signals generally is recovered into the MPEG frames in downstream demodulator 1224. The downstream MPEG frames are then passed to downstream inverse multiplexer 1226, which extracts the proper octets from MPEG frames to recover frame management sublayer (FMS) frames. The FMS frames then are converted back to ethernet/802 frames and complete downstream conveyance at ethernet/802 egress 1228.

Upstream communication of ethernet/802 packets ingress into a physical layer of the preferred embodiments of the present invention at ethernet/802 ingress 1248 which converts the ethernet/802 frames into frame management sublayer (FMS) frames. The FMS frames are converted into blocks of data in preparation for forward error correction coding in upstream multiplexer 1246. These upstream blocks of data may carry the octets of ethernet/802 frames over multiple carrier frequencies. In the preferred embodiment of the present invention, a turbo product code forward error correction technique is utilized on the upstream blocks of data. One skilled in the art will be aware of the techniques of turbo product codes as well as alternative coding techniques for error detection and/or forward error correction. Upstream modulator 1244 modulates the information of the forward error correction blocks and passes the resulting modulating information to RF transmitter 1242, which generates the electrical and/or optical signals in the proper frequency ranges for communication over cable transmission network 1220. The upstream electrical and/or optical signals are received in RF receiver 1238. Upstream demodulator 1236 then handles recovering the forward error correction blocks of data. Also, upstream demodulator 1236 converts the forward error correction blocks back to the original blocks of data that were prepared in upstream multiplexer 1246. The octets of the data blocks are placed back into the proper FMS frames in upstream inverse multiplexer 1234. These FMS frames are then further converted back to ethernet/802 frames and leave the physical layer at ethernet/802 egress 1232.

Figure 13:
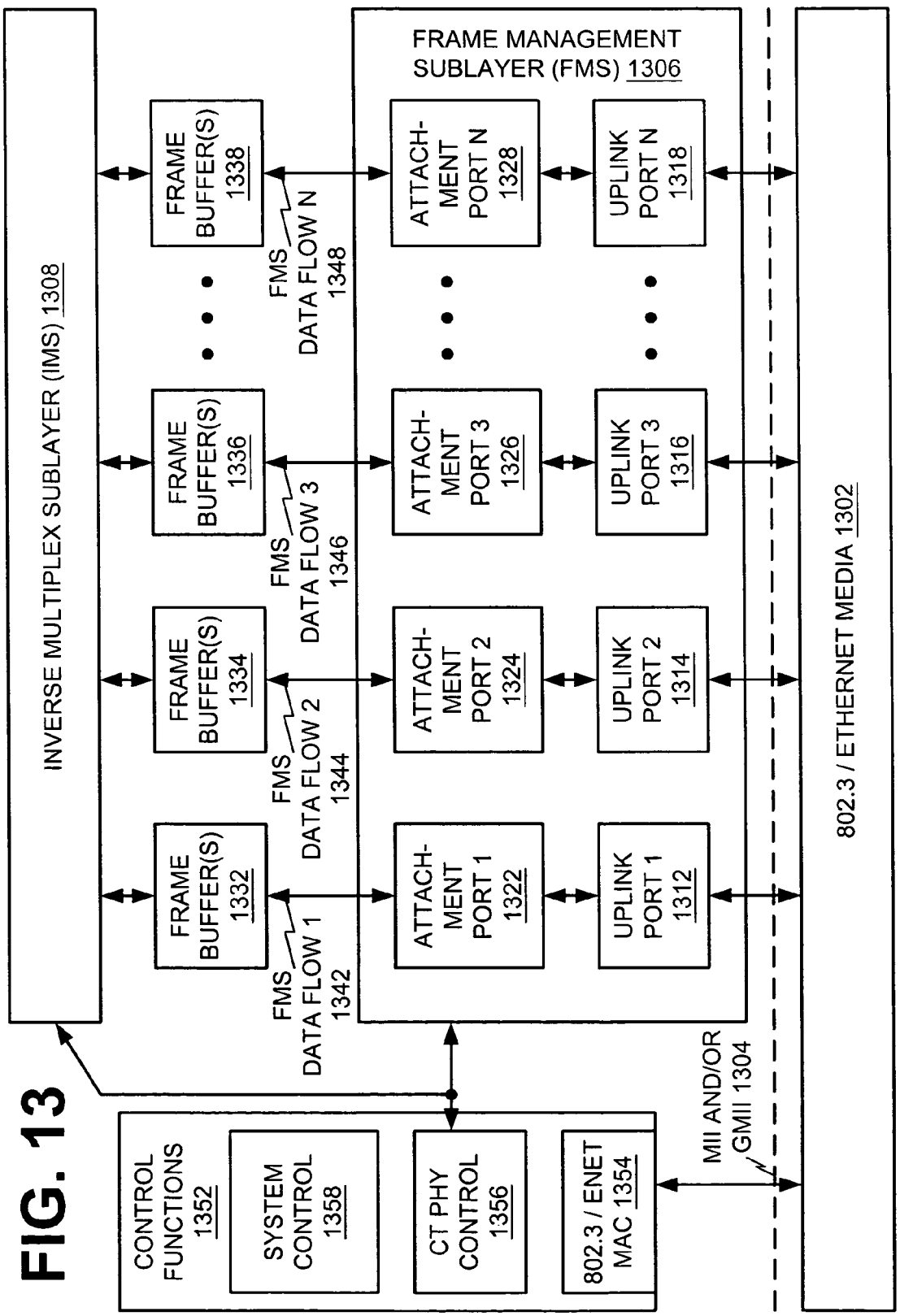
FIG. 13 shows the relationship among 802.3/ethernet media, the frame management sublayer, and the inverse multiplex sublayer.

FIG. 13 shows a more detailed diagram of the frame management sublayer (FMS). In FIG. 13 802.3/ethernet media 1302 is connected across media independent interface (MII) and/or gigabit media independent interface (GMII) 1304 to frame management sublayer (FMS) 1306, which is further connected to inverse multiplex sublayer (IMS) 1308. The connections of FMS 1306 to 802.3/ethernet media 1302 are known as uplink ports 1 through N (1312, 1314, 1316, and 1318). While the connections of FMS 1306 leading to IMS 1308 generally are known as attachment ports 1 through N (1322, 1324, 1326, and 1328). Each attachment port (1322, 1324, 1326, and 1328) is connected to its own set of at least one frame buffer (1332, 1334, 1336, and 1338, respectively) that provides at least part of the interface between FMS 1306 and IMS 1308. Frame buffer(s) (1332, 1334, 1336, and 1338) provide bi-directional communication of FMS data flows (1342, 1344, 1346, and 1348, respectively) between FMS 1306 and IMS 1308. In general, each active FMS data flow of a frame management sublayer in one device is associated one-to-one with an active data flow of a peer entity frame management sublayer in another device. Generally, each FMS data flow provides bi-directional connection-oriented communication between frame management sublayer peer entities in the associated devices. Thus, an FMS data flow generally provides bi-directional point-to-point connectivity between a pair of FMS peer entities.

FIG. 13 further shows various control functions 1352, which comprise 802.3/ethernet medium access control (MAC) interface 1354, cable transmission physical layer control 1356, and system control 1358. CT PHY 1356 generally handles control of the cable transmission physical layer, which includes the sublayers of FMS 1306 and IMS 1308 that are shown in FIG. 13. System control 1358 includes many of the network management, software download, and/or configuration setting file download and/or upload capabilities that generally utilize protocols from the TCP/IP suite for administering network devices.

Basically the frame management layer (FMS) 1306 is responsible for framing ethernet data into the proper frames for communications using the preferred embodiments of the present invention. Furthermore, control flows are communicated between cable transmission physical control 1356 and a corresponding peer entity cable transmission physical control in another device. These control flows are not part of the user data, and thus are not communicated through FMS 1306 to the uplink ports (1312, 1314, 1316, and 1318) that carry information to 802.3/ethernet media 1302. The control frames of control flows may be multiplexed with data frames by utilizing different start frame delimiters to indicate ethernet data frames and control frames.

FIG. 14 shows a general format for an 802.3/ethernet frame as is known by one of ordinary skill in the art. In general, an ethernet frame comprises a preamble 1402 that is used to synchronize the transmitter and receiver in 802.3/ethernet media. After the preamble, start frame delimiter 1404 is used to indicate the beginning of the 802.3/ethernet frame. In IEEE 802.3 and ethernet, this start frame delimiter is the one octet value of 0xAB (in hexadecimal). Following the start frame delimiter (SFD) 1402, 802.3/ethernet frames generally have a header 1406 that includes six octets of destination address, six octets of source address, and other information depending on whether the frame type is IEEE 802.3 raw, ethernet_II, IEEE 802.3 with an 802.2 LLC, or IEEE 802.3 with an 802.2 LLC and a Sub-Network Access Protocol (SNAP). In addition, one skilled in the art will be aware of various techniques for tagging or labeling ethernet/802.3 frames, such as but not limited to, Multi-Protocol Label Switching (MPLS), Resilient Packet Ring (RPR), and/or Virtual LAN (VLAN). After the labeling or tagging information and the 802.3/ethernet header 1406, data 1408 generally is carried in a variable length payload. At the end of 802.3/ethernet packets, a frame check sum (FCS) 1410 error detecting code (usually using a cyclic redundancy check (CRC)) is computed.

To allow all the ethernet/802.3 frame types and various labeling and/or tagging protocols to be transparently communicated using the preferred embodiments of the present invention, the start frame delimiter is used as a field for multiplexing control frames with ethernet/802.3 data frames. Normally, ethernet/802.3 frames do not use the start frame delimiter (SFD) field 1404 for multiplexing because the SFD octet is responsible for providing proper frame alignment in ethernet/802.3 networks. FIG. 15 shows the frame format for control frames in the preferred embodiment of the present invention. In some ways, control frames are similar to ethernet II and 802.3 raw frames with a preamble 1502, a start frame delimiter (SFD) 1504, a six-octet destination address 1505, a six-octet source address 1506, a two-octet length and/or type field 1507, a variable length payload 1508 for carrying control information, and a four-octet frame check sequence (FCS) or cyclic redundancy code (CRC) 1510.

However, in comparing the prior art ethernet/802.3 data frame of FIG. 14 with the control frame of FIG. 15 utilized in communication systems using the preferred embodiments of the present invention, the start frame delimiter fields 1404 and 1504 are different. For ethernet/802.3 data frames in FIG. 14, the start frame delimiter has a value of 0xAB in hexadecimal, while for control frames in FIG. 15 the start frame delimiter has a value of 0xAE in hexadecimal. This difference in the octet of the start frame delimiter (SFD) allows data frames and control frames to be multiplexed together without affecting the transparency of the communication system to all types of ethernet/802.3 frame variations. Control frames transmitted by cable transmission physical control (such as 1356) are multiplexed with the data of an FMS data flow (such as 1342, 1344, 1346, and/or 1348) that is destined for the same location as the data of that FMS data flow.

Figure 16:
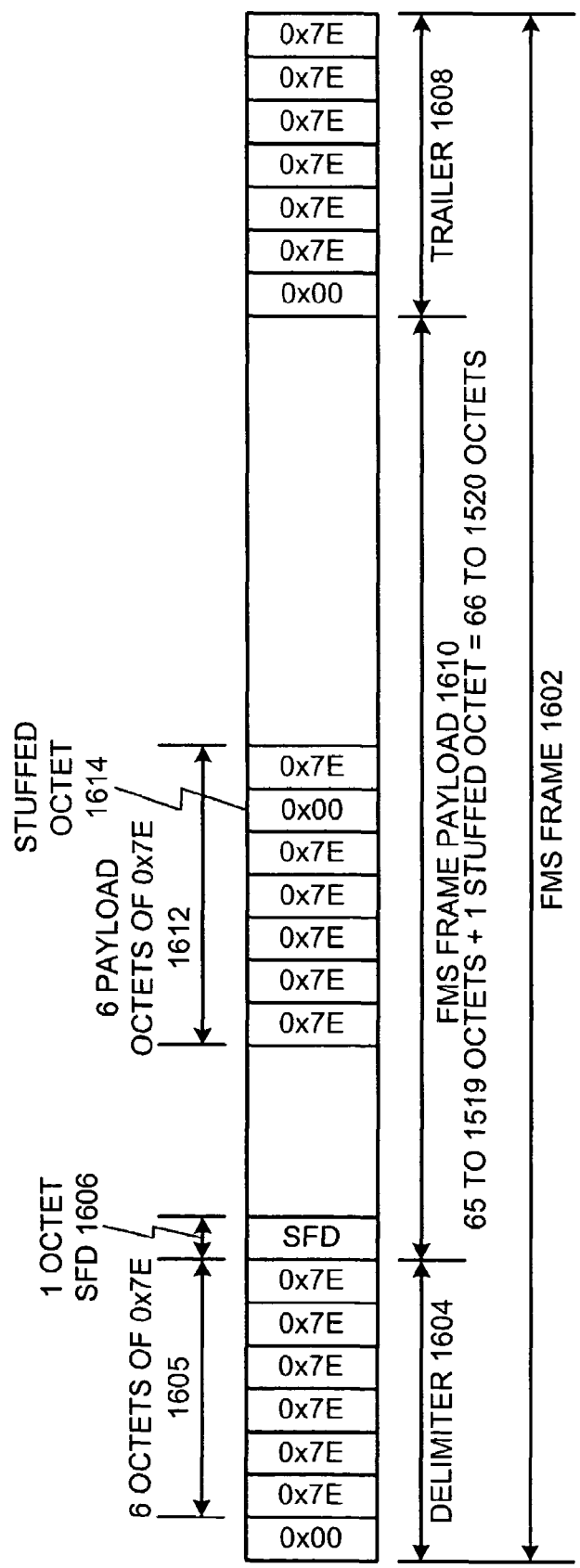
FIG. 16 shows the frame management sublayer (FMS) frame format.

In addition, FIG. 16 shows the FMS frames 1602 communicated between FMS peer entities in a system utilizing the preferred embodiments of the present invention. In general, because of the one-to-one or point-to-point, non-shared relationship of connection-oriented communications between active FMS attachment ports and associated active peer entity FMS attachment ports, bits may be continuously transmitted to maintain synchronization. In the absence of any data frames or control frames to transmit, the system continuously communicates an octet of 0x7E hexadecimal, which functions similarly to the continuous communication of HDLC (High-level Data-Link Control) flags in many point-to-point synchronous connections. Furthermore, as shown in FIG. 16, the delimiter 1604 for an FMS frame 1602 is one octet of 0x00 followed by six octets of 0x7E hexadecimal 1605. The frame delimiter of an FMS frame 1602 is followed by a one octet start frame delimiter (SFD) 1606 that contains the value 0xAB hexadecimal for ethernet/802.3 data frames and that contains the value 0xAE hexadecimal for control frames as shown in FIG. 15. FMS frame 1602 generally has a frame trailer 1608 and a payload 1610. When two FMS frames are transmitted immediately after each other, only one octet of 0x00 and six octets of 0x7E 1605 are needed between the two FMS frames. In other words, there is no need to transmit both a trailer 1608 for a first FMS frame 1602 and a starting delimiter 1604 for a second FMS frame 1602 when the second FMS frame is transmitted immediately after the first FMS frame. Thus, when a second FMS frame is transmitted immediately after a first FMS frame, either the trailer 1608 of the first FMS frame or the starting delimiter 1604 of the second FMS frame may be omitted.

In general, the payload 1610 of an FMS frame 1602 generally may carry an ethernet/802.3 frame or a control frame beginning with the SFD octets of 0xAB and 0xAE, respectively, and continuing through the frame check sequence (FCS) 1410 or 1510. Because one hexadecimal octet (or a consecutive sequence of a plurality of hexadecimal octets) with the value of 0x7E may appear in ethernet/802.3 and/or control frames, an octet stuffing technique is used to ensure that the information in an FMS frame payload 1610 is communicated transparently and that the FMS frame 1602 boundaries can be detected by a starting FMS delimiter 1604 and an FMS trailer 1608 (i.e., a trailing FMS delimiter). The FMS sublayer handles this process of framing ethernet and control frames using the FMS frame delimiters of one octet of 0x00 followed by six octets of 0x7E. In addition, byte or octet stuffing allows a payload containing octet or byte values that might cause misinterpretations of starting delimiter 1604 or trailing delimiter 1608 to be communicated transparently. Various techniques for byte, octet, and/or character stuffing in byte-oriented protocols as well as bit stuffing in bit-oriented protocols are known by one of ordinary skill in the art, and one technique is described in Andrew S. Tanenbaum's Second and Third Editions of "Computer Networks", which are both incorporated by reference in their entirety herein. Furthermore, the HDLC formatted frames communicated using an asynchronous, byte- or octet-oriented version of the Point-to-Point Protocol (PPP) generally use another octet-stuffing procedure to maintain transparency. This, octet stuffing procedure is described in Internet Request For Comments (RFC) 1662, which is entitled "PPP in HDLC Framing" and is incorporated in its entirety by reference herein.

In general, octet stuffing involves adding additional octets to a frame whenever a pattern in the frame might cause an ambiguity in a receiver trying to determine frame boundaries. For example, six payload octets of 0x7E at 1612 in FIG. 16 could have an extra octet of 0x00 added as a stuffed octet 1614. The additional stuffed octets generally increase the size of the payload. One or more stuffed octets 1614 may be added to a payload to handle each situation where a receiver might have had some ambiguity in determining correct frame boundaries based on the patterns in the payload data matching or overlapping with the bit patterns used to specify frame boundaries.

Figure 17:
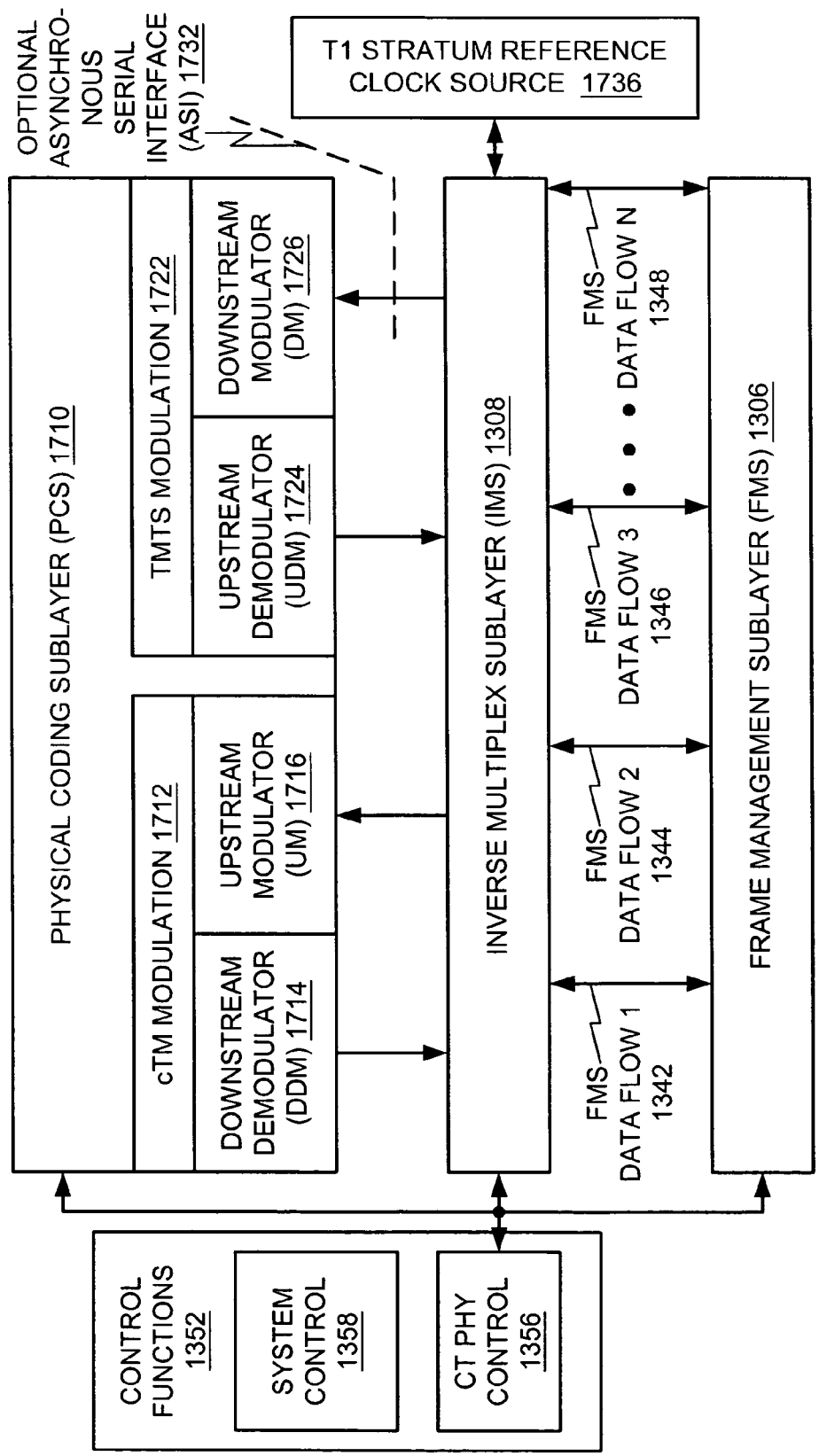
FIG. 17 shows the relationship among the frame management sublayer (FMS), the inverse multiplex sublayer (IMS), and the physical coding sublayer (PCS).

FIG. 17 shows the relationships of inverse multiplex sublayer 1308 to frame management sublayer 1306 and physical coding sublayer 1710. Several of the items from FIG. 13 have been repeated including control functions 1352, systems control 1358, CT PHY control 1356 as well as FMS data flows 1 through N (1342, 1344, 1346, and 1348). The frame buffers between FMS 1306 and IMS 1308 have been omitted for simplicity of the discussion of FIG. 17. Physical coding sublayer 1710 varies depending on whether client transport modem modulation 1712 or transport modem termination system modulation 1722 is being used. Client transport modem modulation comprises a downstream demodulator 1714 that provides input into IMS 1308 and further comprises upstream modulator 1716 that receives the output of an inverse multiplex sublayer 1308. In contrast to the cTM modulation 1712, the TMTS modulation 1722 comprises upstream demodulator 1724 that provides input to an IMS 1308 and further comprises downstream modulator 1726 that receives input from IMS 1308. The IMS 1308 performs different multiplexing/demultiplexing functions depending on whether the direction of communication is upstream or downstream. As discussed previously the downstream modulator 1726 of a transport modem termination system may include integrated QAM modulators. Alternatively, the downstream MPEG packets and/or frames may be communicated over an optional asynchronous serial interface (ASI) 1732 to an external QAM modulator. One skilled in the art is aware of many mechanisms and devices that are commonly used in communicating MPEG frames over ASI interfaces to QAM modulators. Furthermore, because the downstream communication of IMS 1308 utilizes MPEG streams that can carry clock information, IMS 1308 is connected to a T1 stratum reference clock source 1736 or another clock source commonly used for various N×64 and/or N×56 digital telephone company services that may involve plesiochronous digital hierarchy (PDH) or synchronous digital hierarchy (SDH) multiplexing. On the TMTS-side, T1 stratum reference clock source 1736 (or another clock source as would be known by someone of ordinary skill in the art) generally is an input to IMS 1308 in a TMTS. In contrast on the cTM-side, T1 stratum reference clock source 1736 (or another clock source as would be known by someone of ordinary skill in the art) generally is an output that is driven by the IMS 1308 in a cTM.

MPEG Packets

Figure 18:
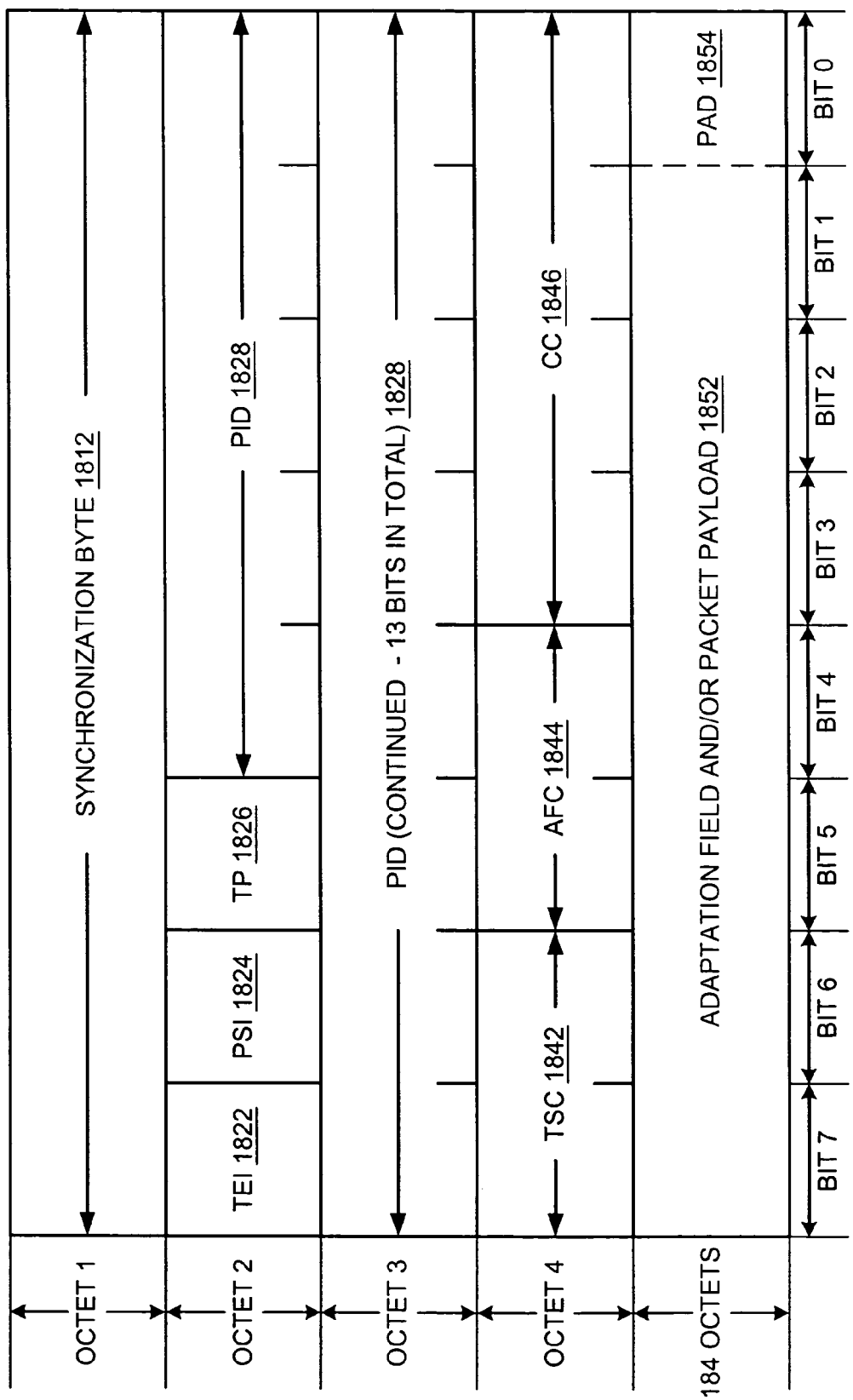
FIG. 18 shows the MPEG frame format.

FIG. 18 shows the layout of an MPEG frame that is known to one of skill in the art and is described in ITU-T H.222.0 entitled "Audiovisual and Multimedia Systems" and ITU-T J.83 entitled "Transmission of Television, Sound Program and Other Multimedia Signals", which are both incorporated by reference in their entirety herein. Synchronization Byte (SB) 1812 contains the eight bit value 0x47 hexadecimal. The transport error indicator (TEI) 1822 is set in a communication system using the preferred embodiments of the present invention to indicate frame decoding errors of MPEG packets to an 802.3 MII interface connected to a frame management sublayer. The cable transmission physical layer (including the four sublayers of FMS, IMS, PCS, and SMD) in a communication system utilizing the preferred embodiments of the present invention generally does not utilize payload start indicator (PSI) 1824, transport priority (TP) bit 1826, and the transport scrambling control (TSC) bits 1842.

The cable transmission physical (CT PHY) layer of a communication system utilizing the preferred embodiments of the present invention does utilize the thirteen-bit packet identifier (PID) field to specify various streams of MPEG packets. In general, the PID numbers 0x0000 through 0x000F are not used to carry the cable transmission physical (CT PHY) layer communications in a system operating with the preferred embodiments of the present invention. These PIDs of 0x0000 through 0x000F are utilized for other MPEG functions such as but not, limited to, program association table (PAT), conditional access table (CAT), and transport stream description table that are known to one of skill in the art. In addition, the preferred embodiments of the present invention do not utilize the PIDs of 0x1FFF, which indicates the null packet, and 0x1FFE, which indicates DOCSIS downstream communications. PIDs in the range of 0x0010 through 0x1FFD are utilized to carry the cable transmission physical layer (CT PHY) information in a communication system using the preferred embodiments of the present invention. The PIDs are allocated for carrying the information of FMS data flows by starting at 0x1FFD and working downward.

The four bits of the continuity counter (CC) 1846 increment sequentially for each packet that belongs to the same PID. The IMS downstream communication of MPEG packets are generated contemporaneously in parallel with the same value for the continuity counter (CC) 1846 across all the parallel packets. The continuity counter 1846 is incremented in unison across all the MPEG streams to help ensure that inverse multiplexing operations across multiple MPEG streams are performed utilizing the correctly aligned set of packet payloads.

The two bits of the adaptation field control (AFC) 1844 specifies whether the payload contains a packet payload only, an adaptation field only, or a packet payload and an adaptation field. The 184 octets of an MPEG packet or frame after the four-octet header may contain an adaptation field and/or a packet payload 1852, and is padded to the fixed size of 184 octets with pad 1854. In general, the preferred embodiments of the present invention do not generate MPEG packets containing both adaptation fields and other payload information. However, one skilled in the art will be aware that other implementations are possible using various combinations of adaptation fields and payload information in MPEG packets.

Figure 19:
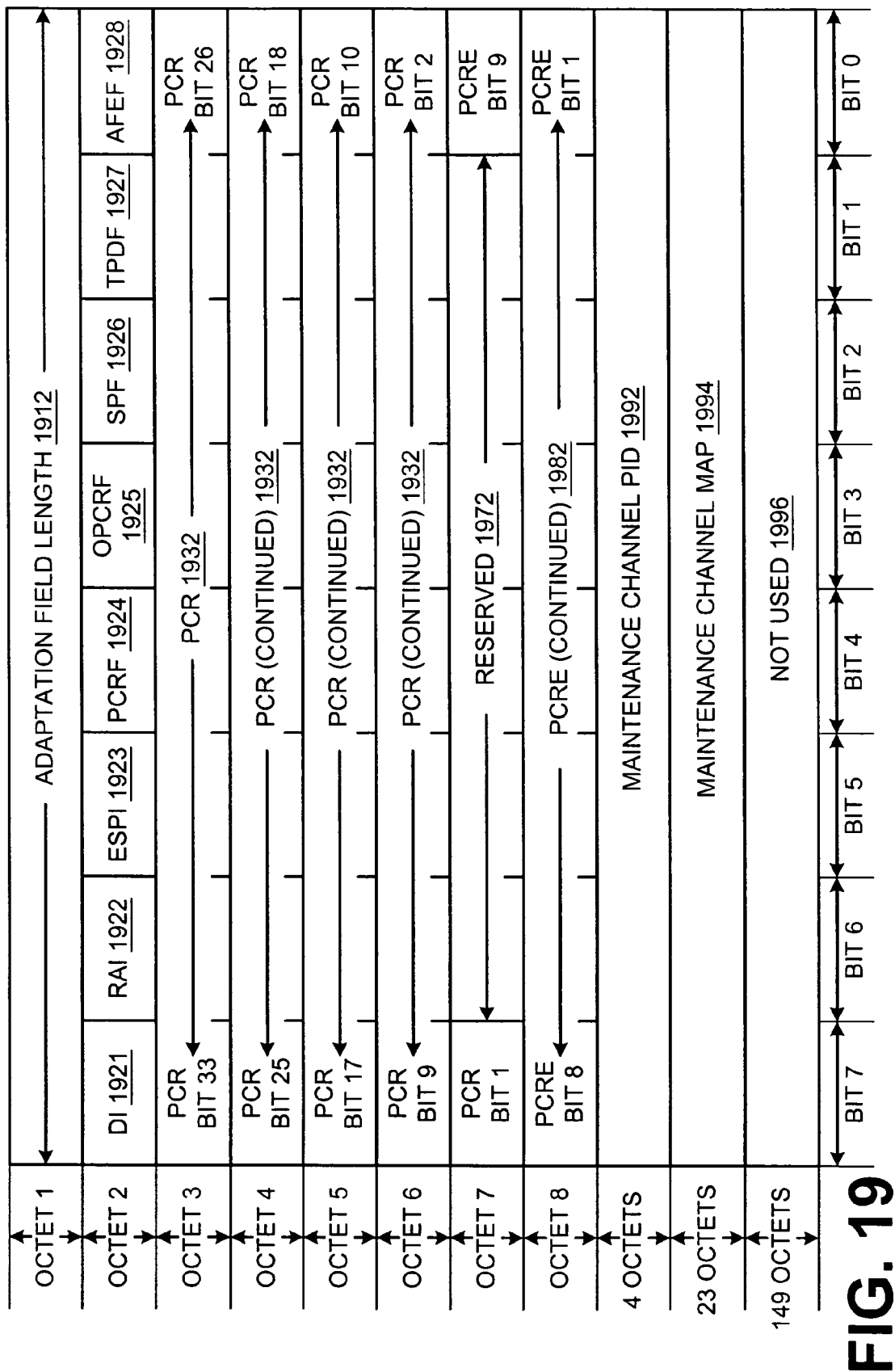
FIG. 19 shows the MPEG adaptation field format.

FIG. 19 further shows an MPEG adaptation field that has been slightly modified from the standard MPEG adaptation field known to one of ordinary skill in the art. The cable transmission physical layer (CT PHY) of a communication system using the preferred embodiments of the present invention generally does not utilize the MPEG adaptation field bits of the discontinuity indicator (DI) 1921, the random access indicator (RAI) 1922, the elementary stream priority indicator (ESPI) 1923, the original program clock reference flag (OPCRF) 1925, the splice point flag (SPF) 1926, the transport private data flag (TPDF) 1927, and the adaptation field extension flag (AFEF) 1928.

The adaptation field length 1912 comprises eight bits that specify the number of octets in an adaptation field after the adaptation field length itself. In the preferred embodiments of the present invention, if an MPEG packet includes an adaptation field, the adaptation field length (AFL) 1912 may range from 0 to 182 octets (with the count starting at the first octet after the AFL octet 1912). The MPEG packets generated by the preferred embodiments of the present invention that carry an adaptation field generally have the program clock reference flag (PCRF) set to 1 to indicate that a program clock reference is carried in the adaptation field. The thirty-three bit program clock reference (PCR) 1932 and the nine bit program clock reference extension (PCRE) 1982 are concatenated into a forty-two bit counter with the PCRE being the least significant bits of the counter. The forty-two bit counter generally is used to indicate the intended time of arrival of the octet containing the last bit of the program clock reference (PCR) at the input to an inverse multiplex sublayer (IMS) of a client transport modem (cTM). Also, the reserved bits 1972 are not utilized in the preferred embodiments of the present invention.

The maintenance channel PID (MC PID) 1992 is used to allow a client transport modem (cTM) to startup and establish communications with a transport modem termination system (TMTS) to begin a registration process. Initially, the cTM listens to at least one low bandwidth maintenance channel established by the TMTS. The TMTS continuously broadcasts maintenance-oriented information on at least one low bandwidth maintenance channel that is specified by at least one MC PID 1992. The maintenance information includes multiplexing maps as well as other registration information. The client transport modem determines the maintenance channel PID 1992 by listening to downstream MPEG packets containing the adaptation field. Based on the value of the MC PID 1992, the client transport modem will know which downstream MPEG packets contain maintenance channel information. Furthermore, the maintenance channel map (MC-MAP) 1994 comprises twenty-three octets or 23×8=184 bits that specify the octets in the downstream MPEG packets with a PID equal to MC-PID 1992. Each bit in the MC-MAP represents one octet in the 184 octet MPEG payload of the MPEG packets with a PID value equal to MC-PID. This map of bits (MC-MAP) and the PID value (MC-PID) allow a client transport modem to select and inverse multiplex through the IMS sublayer the information of the low bandwidth downstream maintenance channel.

Network Clocking

Although most of the description of the preferred embodiments of the present invention has related to communication of ethernet/802.3 frames between cable transmission physical (CT PHY) layer peer entities, the preferred embodiments of the present invention also allow communication of circuit emulation services (CES) that generally are associated with the N×56 and N×64 interfaces of telephone company service providers. Despite the increasing deployment of packetized voice connectivity, many communication systems still utilize these various N×56 and N×64 services and will continue to do so for the foreseeable future. Thus, offering a T1 or other type of N×56/64 interface allows customers to easily connect their existing voice networking equipment to a client transport modem. This allows the preferred embodiments of the present invention to support remote offices with packetized service of ethernet for data as well as circuit emulation service for legacy voice applications.

However, most customer-oriented N×56 and N×64 equipment such as, but not limited to, a PBX (private branch exchange) with a T1 interface usually expects the T1 line from the service provider to supply the necessary network clocking. To be able to replace current T1 services of a customer, the preferred embodiments of the present invention generally should also be able to supply the necessary network clocking to customer premises equipment (CPE) such as a PBX. Because more accurate clocks such as atomic clocks are more expensive, the more expensive central office and/or service provider equipment (such as a central office switch or exchange) generally has a more accurate clock than the less expensive customer premises equipment (such as a private branch exchange). Thus, equipment primarily designed for use at a customer premises as opposed to in a service provider network generally is designed to use the clock derived from the clock delivered over service provider transmission lines or loops. One skilled in the art will be aware that these network clocking issues apply to all networking equipment and not just the limited example of PBXs and central office switches. These clocking issues for 8 kHz clocks are particularly relevant for equipment designed to utilize N×56/64 services (i.e., services based on multiples of a DS0).

Figure 20:
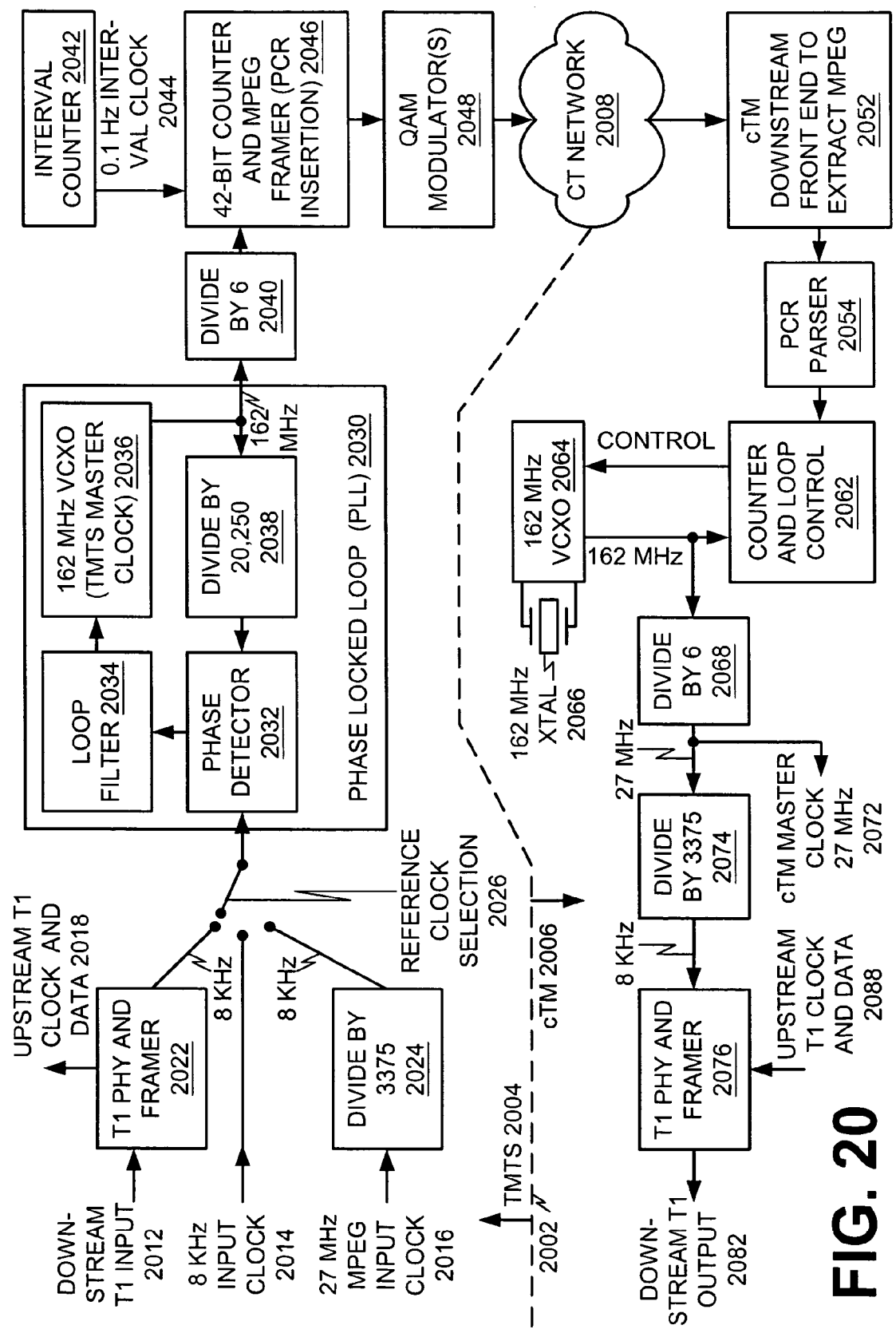
FIG. 20 shows clock distribution from a TMTS to a cTM.

FIG. 20 shows a way of delivering the proper clocking to customer premises equipment using a transport modem termination system and a client transport modem. Dashed line 2002 generally divides FIG. 20 between TMTS 2004 and cTM 2006. Both TMTS 2004 and cTM 2006 are connected into cable transmission network 2008. Furthermore, TMTS 2004 comprises various potential clock inputs including, but not limited to, downstream T1 input 2012, 8 kHz input clock 2014, as well as 27 MHz MPEG input clock 2016. These clock inputs are expected to be commonly found in the headend and/or distribution hub of cable service providers.

Generally, the 8 kHz clock 2014 is related to the N×56 kbps and N×64 kbps services. 8 kHz is the Nyquist sampling rate to be able to properly sample a 0 to 4 kHz analog POTS (Plain Old Telephone Service) voice frequency channel. With each sample having eight bits (or one octet), eight bits transmitted at 8 kHz (or 8000 cycles per second) yields 8×8000=64,000 bits per second or 64 kbps. Many higher order PDH and SDH multiplexing techniques are based on multiples of this DS0 speed of 64 kbps or 56 kbps. Thus, an 8 kHz clock with a 1/8 kHz or 125-microsecond period is commonly available at N×56/64 interfaces to the public switched telephone network (PSTN).

Downstream T1 input 2012 generally also has a corresponding upstream T1 clock and data 2018 because T1 services are bi-directional. However, the service provider (or in this case downstream) clock generally is considered to be the master reference. Customer equipment clocking generally is derived from reference clocking of service provider or downstream services. As further shown in FIG. 20, the downstream T1 input 2012 and upstream T1 clock and data 2018 generally are connected in the TMTS to a T1 physical layer and framer (2022). One skilled in the art will be aware of various issues in T1 framing including various framing issues such as extended superframe (ESF) and D4 framing, synchronization based on the 193rd bit, as well as various physical layer technologies such as, but not limited to, alternate mark inversion (AMI) and 2B1Q of HDSL (High bit rate Digital Subscriber Line) for carrying the 1.536 Mbps (or 1.544 Mbps) T1 service. In addition, though the preferred embodiments of the present invention generally are described with respect to North American T1 service, European N×56/64 services such as E1 also could be used. The output of T1 physical (PHY) layer interface and framer 2022 comprises an 8 kHz clock source.

In addition, because a TMTS using the preferred embodiments of the present invention generally is expected to be often deployed at cable headends and/or distribution hubs, a 27 MHz MPEG input clock 2016 is expected to be available based on the ubiquitous deployment of MPEG in digital cable television (CATV) networks. An 8 kHz reference clock may be derived from the 27 MHz clock by dividing by 3375 at item 2024. The 27 MHz MPEG clock, which generally is used for digital movies, turns out to be an exact multiple of 3375 times the 8 kHz clock, which generally is used for N×56/64 services associated with the PSTN. The three input clocks from MPEG, T1, and an 8 kHz reference are converted to 8 kHz clocks. Reference clock selection 2026 may be a switch that selects among the various 8 kHz reference clocks. As would be known by one of skill in the art, this clock selection switching could be implemented by mechanisms such as, but not limited to, software controlled switches, manual physical switches, and/or jumpers.

The selected 8 kHz clock reference is then input into phase locked loop (PLL) 2030, which further comprises phase detector 2032, loop filter 2034, a 162 MHz voltage controlled crystal oscillator (VCXO) of TMTS master clock 2036. The 162 MHz output of TMTS master clock 2036 is divided by 20,250 at item 2038 and fed back into phase detector 2032. As a result, phase locked loop (PLL) provides a loop that is used for locking the relative phases of the 8 kHz clock relative to the 162 MHz TMTS master clock 2036. Phase locked loops are known to one of skill in the art.

The 162 MHz master clock 2036 is divided by 6 at item 2040 to generate a 27 MHz clock before being input into a 42-bit counter and MPEG framer 2046 that performs the function of inserting the program clock reference into MPEG frames. Interval counter 2042 generates a 0.1 Hz interval clock 2044 that generally determines that rate at which snapshots of the 42-bit counter are sent downstream as the program clock reference (PCR) in the adaptation field of MPEG packets. The MPEG frames are communicated downstream to client transport modem 2006 using QAM modulator(s) 2048, which may be integrated into TMTS 2004 or could be external to TMTS 2004.

On the downstream side the client transport modem (cTM) 2006 includes the hardware and/or software to properly extract the MPEG frames and interpret the fields. These functions might be performed in a cTM downstream front end to extract MPEG 2052 and program clock reference parser 2054. Based on the PCR value extracted from MPEG adaptation fields, the client transport modem 2006 determines how much the cTM master clock has drifted relative to the TMTS master clock. Counter and loop control 2062 determines the amount and direction of the relative clock drifts between the cTM and the TMTS and sends control signals to the cTM oscillator to correct the relative clock drift. Thus, the counter and loop control 2062 regulates the cTM clock to ensure the proper relationship relative the TMTS master clock 2036.

In the preferred embodiment of the present invention, the cTM utilizes a 162 MHz voltage controlled crystal oscillator (VCXO) 2064 that operates based on a 162 MHz crystal (XTAL) 2066. The 162 MHz clock is divided by 6 at item 2068 to result in a 27 MHz clock that is the cTM master clock 2072. This 27 MHz cTM master clock has been generally locked to the TMTS master clock 2036, which was further locked to the 8 kHz reference source in phase locked loop (2030) of TMTS 2004. After dividing the 27 MHz cTM master clock 2072 by 3375 in item 2074, an 8 kHz clock is recovered that generally is locked to the 8 kHz reference clocks of TMTS 2004. As a result the 8 kHz clock of cTM 2006 generally can be used similarly to a service provider master clock for N×56/64 services such as, but not limited to, T1. The 8 kHz clock is an input into T1 physical layer interface and framer 2076 which provide downstream T1 output 2082 that can be used as a network service provider clock by other CPE (such as but not limited to a PBX). In addition, the upstream T1 clock and data from CPE such as, but not limited to a PBX, provides the bi-directional communication generally associated with T1. However, the clock associated with upstream T1 clock and data 2088 from a PBX or other CPE generally is not a master clock, but a derived clock based on the downstream T1 output 2082, that is based on the master clock of a service provider.

In general, the downstream delivery of MPEG packets with PCR information is used as a network clock distribution mechanism to clock transfers of information in the opposite direction to distribution of the clock. Normally, MPEG PCR information in downstream MPEG packets is used to clock downstream flows of audio/visual information. However, in the preferred embodiments of the present invention, the downstream delivery of MPEG PCR clock information is used to provide a stratum clock to lock the upstream transmissions of circuit emulation services (CES) or N×56/N×64 services to the downstream network clock normally provided by service providers. Also, in the preferred embodiments of the present invention, the downstream distribution of MPEG packet containing PCR information is used to synchronoize the upstream transmissions over multiple tones from a plurality of cTMs to a TMTS. Thus, the PCR information contained in MPEG packets is used to provide network clocking for communication that is in the opposite direction from the direction that MPEG packets are propagated.

Figure 21:
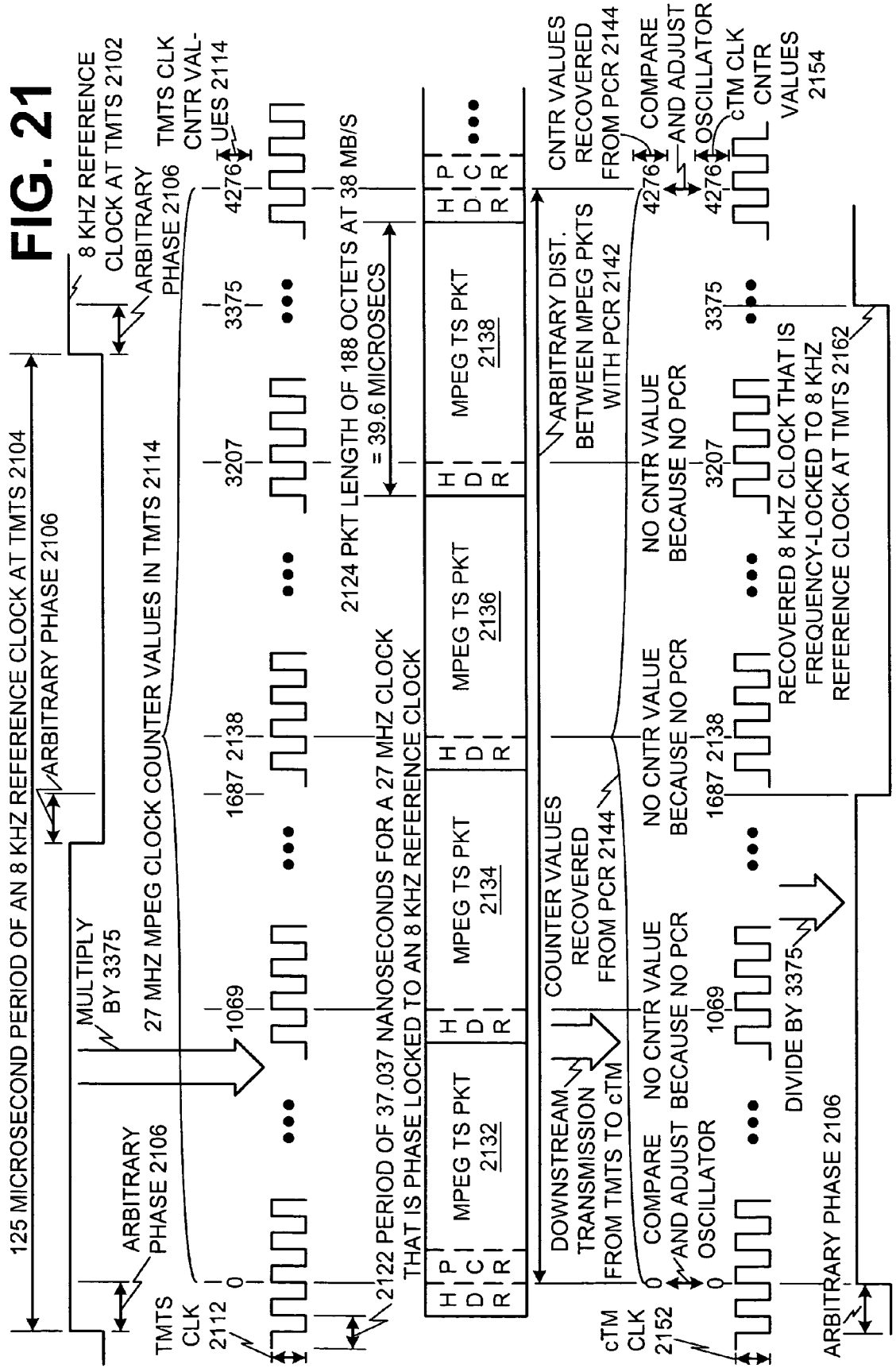
FIG. 21 shows a clock timing diagram for the TMTS and the cTM.

FIG. 21 shows a timing diagram of delivering an 8 kHz clock from a TMTS to a cTM using MPEG packets carrying program clock references (PCR). The timing diagram includes an 8 kHz reference clock 2102 that generally is associated with N×56/64 kbps services. An 8 kHz reference clock 2102 has a 125-microsecond period 2104. Normally, MPEG has a 27 MHz clock 2112 that has a period 2122 of approximately 37.037 nanoseconds. In general, the 8 kHz reference clock 2102 and the 27 MHz reference clock 2112 will have an arbitrary relative phase difference 2106. However, the relative phase difference 2106 between the 8 kHz clock 2102 and the 27 MHz clock 2114 is not significant so long as the clocks can be controlled so that they do not significantly drift relative to each other. In 6 MHz cable transmission frequency channels, MPEG packets may be transmitted at 38 Mbps. Given a 188 octet fixed length MPEG packet, this packet can be transmitted in approximately (188 octets×8 bits/octet)/38 Mbps=39.6 microseconds as illustrated at item 2124. A 27 MHz MPEG clock generally will complete approximately 1069 clock ticks in the 39.6 microseconds needed to transmit an MPEG packet of 188 octets at 38 Mbps on a 6 MHz frequency channel ((188 octets×8 bits/octet)/38 Mbps )/(1/27 MHz clock rate)). Moreover, two 188 octet MPEG packets can be transmitted in 2×1069=2138 clock ticks of a 27 MHz clock; three 188 octet MPEG packets can be transmitted in 3×1069=3207 clock ticks of a 27 MHz clock; and four 188 octet MPEG packets can be transmitted in 4×1069=4276 clock ticks of a 27 MHz clock. Also, 27 MHz/8 kHz=3375 clock ticks of the MPEG 27 MHz clock 2112 occur in one clock tick of an 8 kHz clock 2102 with a 125 microsecond period 2104. The 8 kHz clock 2102 has a transition in 125 microseconds/2=62.5 microseconds, which is associated with 3375/2=1687 clock ticks of the 27 MHz MPEG clock 2112. These relevant clock counts are shown in FIG. 21 as 27 MHz TMTS clock counter values 2114.

The four MPEG packets (or MPEG transport stream (TS) packets) shown in FIG. 21 are labeled as 2132, 2134, 2136, and 2128. Although all the MPEG packets have headers (HDR) only some of the MPEG packets (namely MPEG packet 2132 and the MPEG packet following MPEG packet 2138) contain program clock reference (PCR) values. The time distance between MPEG packets containing PCR values generally is arbitrary as shown at item 2142. However, the preferred embodiments of the present invention generally should send PCR update values often enough to keep the TMTS and cTM clocks aligned to the desired level of accuracy. Item 2144 in FIG. 21 shows the counter values that are recovered from the MPEG PCR information received at a client transport modem (cTM). Because some of the MPEG packets received by a cTM generally will not contain PCR values (e.g., MPEG packets 2134, 2136, and 2138), a cTM generally will not recover a clock counter value from those MPEG packets.

As shown in FIG. 21, MPEG PCR values 2144 can be used in the client transport modem (cTM) to compare and adjust the client transport modem clock 2152 using a voltage controlled crystal oscillator (VCXO) to keep it in sync with the transport modem termination system (TMTS) clock 2112. Basically, the counter values recovered from the PCR 2144 are compared with client transport modem (cTM) counter values 2154 to allow adjustment of the cTM clock 2152. The 27 MHz client transport modem (cTM) clock 2152 can then be used to generate a recovered 8 kHz stratum clock 2162 by dividing by 3375. In general, the recovered 8 kHz clock 2162 at a cTM will have the same frequency as the 8 kHz reference clock 2102 at the TMTS. However, because the TMTS clock counter 2114 may start at an arbitrary phase difference 2106 from a reference 8 kHz clock 2102 at the TMTS, the 8 kHz clock 2162 recovered at a cTM will have an arbitrary (but generally fixed) phase difference 2106 from the 8 kHz reference clock 2102 at a TMTS.

Furthermore, because the MPEG packets carrying PCR values are delivered to one or more cTMs and because the propagation delay on the cable distribution network may be different to each cTM, the 8 kHz clock 2162 recovered at any cTM generally will have an arbitrary (but basically fixed) phase difference 2106 from the 8 kHz reference clock 2102 of the TMTS and an arbitrary (but basically fixed) phase difference 2106 from each of the other 8 kHz recovered clocks 2162 at the other cTMs. Although the recovered 8 kHz clock 2162 at a cTM will have an arbitrary phase difference 2106 from the 8 kHz input reference clock 2102 of the TMTS, this clock phase difference 2106 is not a problem. Generally, the phase of a reference clock at a telephone company central office is different from the phase of the clock delivered to customer premises equipment due at least to the propagation delays in the transmission lines between the service provider and the customer premises. However, it generally is important to synchronize the frequency of the service provider clock and the customer premises clocks so that the clocks do not significantly drift relative to each other. The recovered 8 kHz clock 2162 at the cTM is frequency-locked to the 8 kHz reference stratum clock 2102 at the TMTS (i.e., the clocks do not significantly drift relative to each other).

By frequency-locking each cTM clock to the TMTS clock, frequency stability of the poorly regulated cTM clocks is ensured. In addition, the multi-tone upstream frequency division multiplexing receiver in the TMTS generally performs optimally when the frequency error of the transmissions of different cTMs is small. Significant frequency differences in cTM clocks as well as the TMTS clock may create problems in selecting the correct carrier frequency of the upstream multi-tone frequency-division multiplexing. Thus, the downstream delivery of PCR information allows a plurality of client transport modems to properly set their respective oscillation clocks that are used in generating the frequency carrier signals. In this way each cTM can ensure that it is accurately transmitting in the right upstream frequency range for a tone instead of slightly interfering with an adjacent tone.

Downstream Multiplexing

The preferred embodiments of the present invention generally involve providing a frequency-division multiple access (FDMA) architecture to transparently carry frames of data between customer premises equipment and service provider equipment. The preferred embodiments of the present invention will function over not only hybrid fiber-coax systems but also over all fiber systems. Furthermore, the preferred embodiments of the present invention will work over cable distribution networks in a sub-split configuration that may be carrying legacy CATV video channels. Additionally, the preferred embodiments will work over bandwidth-split configurations.

In the downstream direction the preferred embodiments of the present invention support a point-to-multi-point configuration where a single 6 MHz channel is capable of providing one direction of traffic flow for one or more customer premises devices known as client transport modems (cTM). Downstream traffic in a 6 MHz channel may be shared by more than one cTM with each cTM being allocated a certain number of bits from the downstream modulators. To provide synchronization that allows a cTM to properly select the correct downstream bits and ignore the downstream bits destined for other cTMs, a framing method is used.

The MPEG 2 (Moving Picture Experts Group) transport stream is one non-limiting way of handling this framing functionality. Advantageously, MPEG 2 transport already is commonly used in CATV networks to deliver digital video and audio. Furthermore, MPEG 2 transport already includes synchronization mechanisms that can be used to align the clocks of cTMs. Also, MPEG 2 transport is a multiplexing mechanism that allows the high speed data of the preferred embodiments of the present invention to be potentially multiplexed with other MPEG 2 data in CATV networks.

In the upstream direction the standard 6 MHz channels of RF cable networks may be subdivided into multiple tones to allow frequency allocations to be managed at a much smaller granularity. Each one of these tones can be allocated to a different cTM. The preferred embodiments of the present invention avoid all the problems of DOCSIS in ranging and contention resolution (or media access control) by limiting the allocation of an upstream tone to one cTM at any particular time. Thus, the upstream direction generally represents a point-to-point architecture with one cTM communicating with one server transport modem (sTM) function. A plurality of these server transport modems may be implemented in a central-site concentrator known as a transport modem termination system (TMTS).

Figure 22:
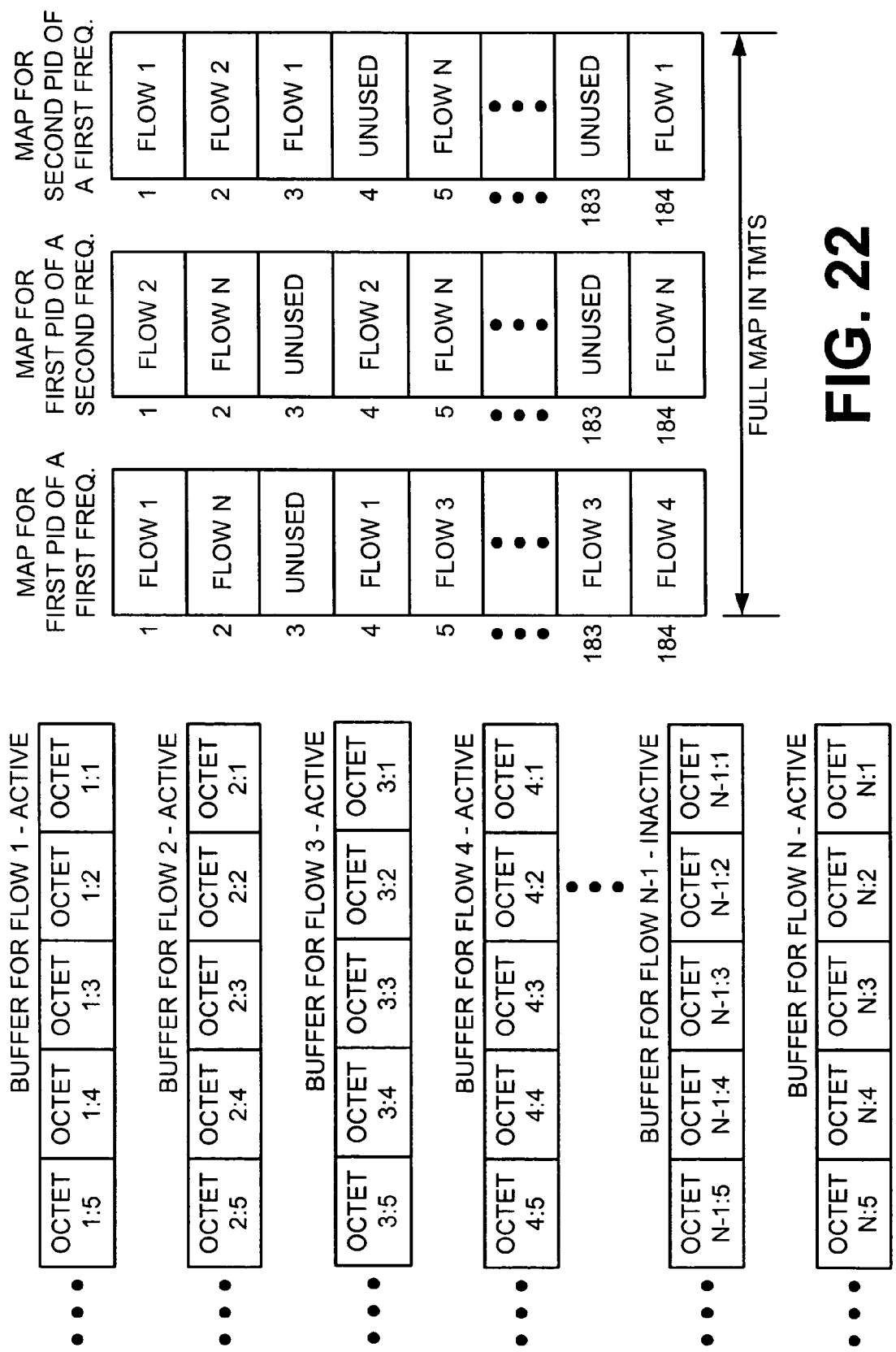
FIG. 22 shows buffers for N data flows, which may be FMS data flows, and also shows a non-limiting example of a full map in the TMTS.

As discussed above the preferred embodiments of the present invention generally carry downstream information in MPEG packets. The IMS sublayer of the TMTS is generally responsible for placing the downstream information into MPEG packets while the IMS sublayer of the cTM generally is responsible for recovering the information from the MPEG packets. FIG. 22 shows buffers for N data flows numbered 1 through N. The buffers exist in the TMTS. In the preferred embodiments of the present invention, N is selected to be 24, and this value for N is non-limiting. The octets in the buffers are labeled using the convention of (data flow number: octet number) with octet 2:3 being octet 3 of data flow 2 and with octet N–1:4 being octet 4 of data flow N–1 as non-limiting examples. Each data flow that is active is being communicated from the TMTS to a cTM, and in FIG. 22 data flows 1, 2, 3, 4, and N are active, while data flow N–1 is inactive or not currently being used. In the preferred embodiments of the present invention, the data flows may be the FMS data flows of FIG. 16, although the techniques and devices for MPEG multiplexing described herein are not limited to applications of carrying FMS data flows between a TMTS and at least one cTM.

Each active data flow will have entries in the map that specify the placement of octets in MPEG (or other fixed length) packets with potentially different PIDs and across potentially different 6 MHz carrier frequencies. In FIG. 22, the full map for the TMTS is shown with the TMTS supporting data flows 1, 2, 3, 4, and N that are mapped into MPEG packets with a first PID on a first frequency channel, MPEG packets with a first PID on a second frequency channel, and MPEG packets with a second PID on a first frequency channel. The first PID on the first frequency channel may or may not be the same as the first PID on the second frequency channel.

Utilizing two different frequency channels provides frequency-division multiplexing (FDM), while utilizing two different PIDs as well as the individual octets within an MPEG packet provides time-division multiplexing (TDM). With FDM, an MPEG packet with either the first PID or the second PID for the first frequency channel can be contemporaneously transmitted on the first frequency channel while another MPEG packet with the first PID for the second frequency channel is transmitted on the second frequency channel. Also, the time-division multiplexing nature of MPEG 2 transport allows the first frequency channel to carry an MPEG packet with the first PID for the first frequency channel during one time interval, and then carry an MPEG packet with the second PID for the first frequency channel during another time interval.

In a non-limiting implementation, each data flow may be stored in its own circular ring buffer that is associated with a pointer indicating the next octet or byte that has not yet been multiplexed into an MPEG packet. The pointer increments to the next octet entry in the buffer after the currently pointed to octet is copied to the MPEG packet. In this way, the octets of each data flow are sequentially copied into MPEG packets and possibly intermingled with octets from other data flows according to the map. Although not shown in FIG. 22, generally some state information is maintained regarding the next octet that should be transmitted from each data flow. Another non-limiting implementation might involve a shifter that shifts all octets of a data flow one position after the leading octet has been copied to the MPEG packet. However, such an implementation is likely to result in the inefficient copying and shifting of a large number of octets as opposed to just updating a pointer or index value to identify the next octet from a data flow to be multiplexed into the MPEG packet.

The TMTS generally will contain the full information that allows for a mapping of each active data flow to the proper frequency channel, to the MPEG packet with the proper PID on that frequency channel, and to the proper octets within that MPEG packet. As shown in FIG. 22, this full map may be implemented in a non-limiting embodiment as a lookup table for each frequency, each PID on a frequency, and each octet of an MPEG packet. As MPEG packets, which do not carry adaptation fields, have a payload of 184 octets, the lookup tables have 184 entries numbered 1 to 184. For each active data flow, entries in the full map specify how the TMTS should form the MPEG packets with specific PIDs that are to be transmitted on specific frequency channels. If all data flows were active in the TMTS, the TMTS buffers in FIG. 22 potentially have N active data flows numbered 1 to N. Also, an indication of an unused octet can be represented by a 0. Thus, the possible uses for an octet of an MPEG packet can be encoded using the integer values 0, 1, 2, . . . , N−1, N, which results in N+1 possible values in the lookup table map. Using a minimum fixed number of bits for each entry in the map requires ceil ($\log_2$ (N+1))=$\lceil \log_2$ (N+1)$\rceil$ bits for each entry on the map, where the well-known ceiling mathematical function is the next largest integer that is greater than or equal to $\log_2$ (N+1).

In FIG. 22, the full map in the TMTS includes a map for MPEG packets communicated using the first PID on the first frequency channel with octet 1 being utilized by flow 1, octet 2 being utilized by flow N, octet 3 being unused, octet 4 being utilized by flow 1, octet 5 being utilized by flow 3, octets 6-182 being unused (or utilized by other flows 5 through N−2, which are not shown in FIG. 22), octet 183 being utilized by flow 3, and octet 184 being utilized by flow 4. Also, the full map in the TMTS includes a map for MPEG packets communicated using the first PID on the second frequency channel with octet 1 being utilized by flow 2, octet 2 being utilized by flow N, octet 3 being unused, octet 4 being utilized by flow 2, octet 5 being utilized by flow N, octets 6-182 being unused (or utilized by other flows 5 through N−2, which are not shown in FIG. 22), octet 183 being unused, and octet 184 being utilized by flow N. Furthermore, the full map in the TMTS includes a map for MPEG packets communicated using the second PID on the first frequency channel with octet 1 being utilized by flow 1, octet 2 being utilized by flow 2, octet 3 being utilized by flow 1, octet 4 being unused, octet 5 being utilized by flow N, octets 6-182 being unused (or utilized by other flows 5 through N−2, which are not shown in FIG. 22), octet 183 being unused, and octet 184 being utilized by flow 1.

The full map in the TMTS allows transmission of the octets from all the data flows and also would allow recovery of the octets in all the data flows at the receiver(s). In addition, some preference ordering for filling octets of MPEG packets on different frequency channels and with different PIDs on the same channel should be selected. In the non-limiting example of FIGS. 22 and 23, the filling preference order is a round-robin cycle that starts with an MPEG packet with the first PID of the first frequency channel, followed by an MPEG packet with the first PID of the second frequency channel, followed by an MPEG packet with the second PID of the first frequency channel, and then repeating the generation starting with another MPEG packet with the first PID of the first frequency channel. Note that the fill order may affect latency of the transmissions, and the round-robin rule is only for simple example purposes and not intended to be limiting.

Figure 23:
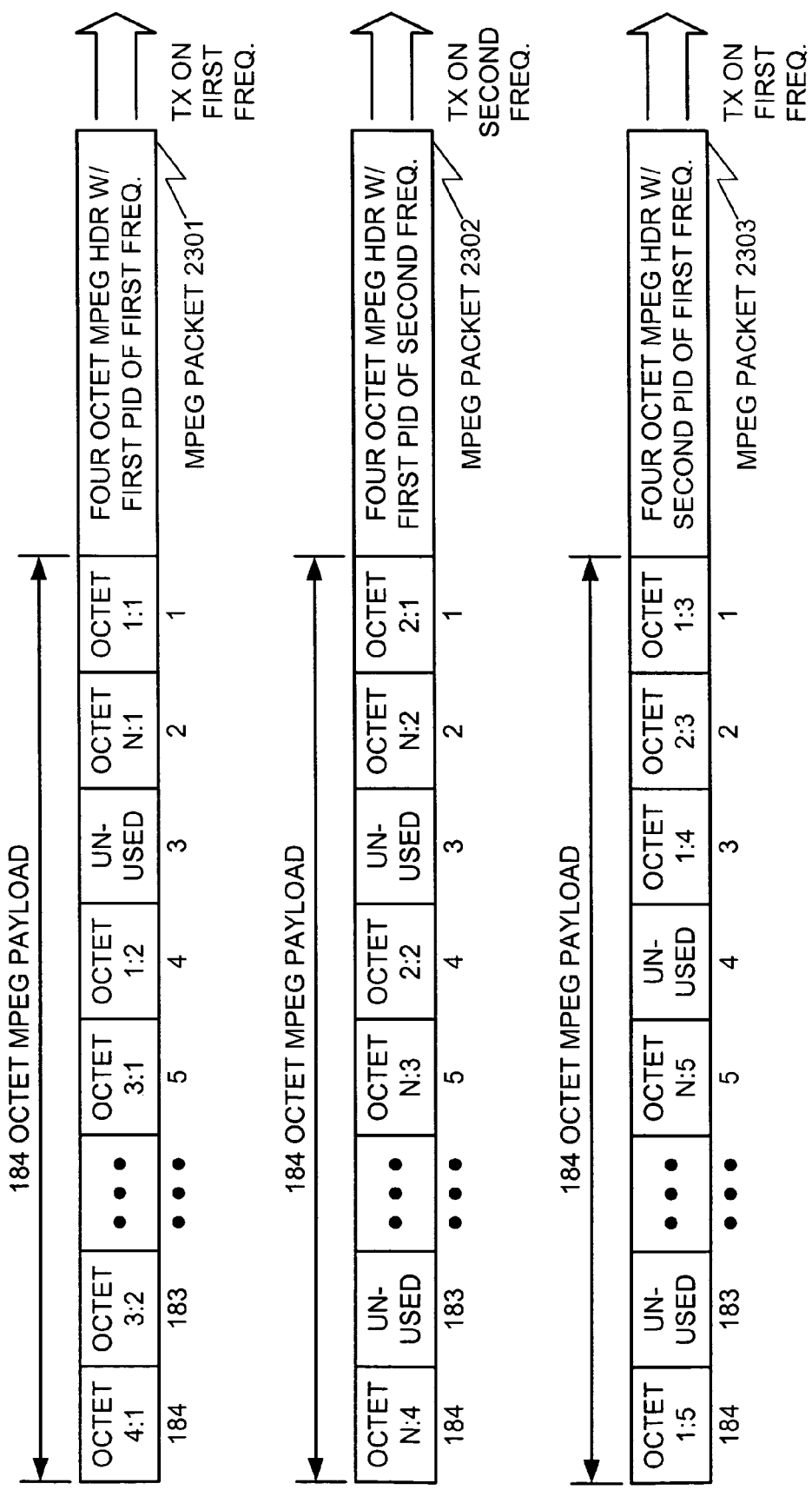
FIG. 23 shows three MPEG packets with octets from the FIG. 22 data flows that are placed into the MPEG packets according to the TMTS full map of FIG. 22.

FIG. 23 shows the formation of three 188-octet MPEG packets with 4-octet MPEG headers and 184-octet MPEG payloads. The MPEG packets in FIG. 23 are formed based on the data flow buffers and full TMTS map of FIG. 22 using the non-limiting round-robin cycle through frequencies and PIDs as described above. MPEG packet 2301 is formed with the first PID of the first frequency contained in the four-octet MPEG header, and MPEG packet 2301 is to be transmitted on the first frequency. As shown in FIG. 23, octet 1:1 from data flow 1 in FIG. 22 is placed into payload octet 1 of MPEG packet 2301 as indicated in the lookup for octet 1 of the map for the first PID of a first frequency channel in FIG. 22. Octet N:1 from data flow N in FIG. 22 is placed into payload octet 2 of MPEG packet 2301 as indicated in the lookup for octet 2 of the map for the first PID of a first frequency channel in FIG. 22. Payload octet 3 of MPEG packet 2301 is unused as indicated in the lookup for octet 3 of the map for the first PID of a first frequency channel in FIG. 22. Octet 1:2 from data flow 1 (i.e., the next unmapped octet from the buffer for data flow 1) in FIG. 22 is placed into payload octet 4 of MPEG packet 2301 as indicated in the lookup for octet 4 of the map for the first PID of a first frequency channel in FIG. 22. Octet 3:1 from data flow 3 in FIG. 22 is placed into payload octet 5 of MPEG packet 2301 as indicated in the lookup for octet 5 of the map for the first PID of a first frequency channel in FIG. 22. Payload octets 6-182 of MPEG packet 2301 are either unused or used by data flows 5 through N−2 that are not shown in FIGS. 22 and 23. Octet 3:2 from data flow 3 (i.e., the next unmapped octet from the buffer for data flow 3) in FIG. 22 is placed into payload octet 183 of MPEG packet 2301 as indicated in the lookup for octet 183 of the map for the first PID of a first frequency channel in FIG. 22. Octet 4:1 from data flow 4 in FIG. 22 is placed into payload octet 184 of MPEG packet 2301 as indicated in the lookup for octet 184 of the map for the first PID of a first frequency channel in FIG. 22.

MPEG packet 2302 is formed with the first PID of the second frequency contained in the four-octet MPEG header, and MPEG packet 2302 is to be transmitted on the second frequency. As shown in FIG. 23, octet 2:1 from data flow 2 in FIG. 22 is placed into payload octet 1 of MPEG packet 2302 as indicated in the lookup for octet 1 of the map for the first PID of a second frequency channel in FIG. 22. Octet N:2 from data flow N (i.e., the next unmapped octet from the buffer for data flow N) in FIG. 22 is placed into payload octet 2 of MPEG packet 2302 as indicated in the lookup for octet 2 of the map for the first PID of a second frequency channel in FIG. 22. Payload octet 3 of MPEG packet 2302 is unused as indicated in the lookup for octet 3 of the map for the first PID of a second frequency channel in FIG. 22. Octet 2:2 from data flow 2 (i.e., the next unmapped octet from the buffer for data flow 2) in FIG. 22 is placed into payload octet 4 of MPEG packet 2302 as indicated in the lookup for octet 4 of the map for the first PID of a second frequency channel in FIG. 22. Octet N:3 from data flow N (i.e., the next unmapped octet from the buffer for data flow N) in FIG. 22 is placed into payload octet 5 of MPEG packet 2302 as indicated in the lookup for octet 5 of the map for the first PID of a second frequency channel in FIG. 22. Payload octets 6-182 of MPEG packet 2302 are either unused or used by data flows 5 through N−2 that are not shown in FIGS. 22 and 23. Payload octet 183 of MPEG packet 2302 is unused as indicated in the lookup for octet 183 of the map for the first PID of a second frequency channel in FIG. 22. Octet N:4 from data flow N (i.e., the next unmapped octet from the buffer for data flow N) in FIG. 22 is placed into payload octet 184 of MPEG packet 2302 as indicated in the lookup for octet 184 of the map for the first PID of a second frequency channel in FIG. 22.

MPEG packet 2303 is formed with the second PID of the first frequency contained in the four-octet MPEG header, and MPEG packet 2303 is to be transmitted on the first frequency. As shown in FIG. 23, octet 1:3 from data flow 1 (i.e., the next unmapped octet from the buffer for data flow 1) in FIG. 22 is placed into payload octet 1 of MPEG packet 2303 as indicated in the lookup for octet 1 of the map for the second PID of a first frequency channel in FIG. 22. Octet 2:3 from data flow 2 (i.e., the next unmapped octet from the buffer for data flow 2) in FIG. 22 is placed into payload octet 2 of MPEG packet 2303 as indicated in the lookup for octet 2 of the map for the second PID of a first frequency channel in FIG. 22. Octet 1:4 from data flow 1 (i.e., the next unmapped octet from the buffer for data flow 1) in FIG. 22 is placed into payload octet 3 of MPEG packet 2303 as indicated in the lookup for octet 3 of the map for the second PID of a first frequency channel in FIG. 22. Payload octet 4 of MPEG packet 2303 is unused as indicated in the lookup for octet 4 of the map for the second PID of a first frequency channel in FIG. 22. Octet N:5 from data flow N (i.e., the next unmapped octet from the buffer for data flow N) in FIG. 22 is placed into payload octet 5 of MPEG packet 2303 as indicated in the lookup for octet 5 of the map for the second PID of a first frequency channel in FIG. 22. Payload octets 6-182 of MPEG packet 2303 are either unused or used by data flows 5 through N−2 that are not shown in FIGS. 22 and 23. Payload octet 183 of MPEG packet 2303 is unused as indicated in the lookup for octet 183 of the map for the second PID of a first frequency channel in FIG. 22. Octet 1:5 from data flow 1 (i.e., the next unmapped octet from the buffer for data flow 1) in FIG. 22 is placed into payload octet 184 of MPEG packet 2303 as indicated in the lookup for octet 184 of the map for the second PID of a first frequency channel in FIG. 22.

Note that MPEG packet 2302 may be transmitted on the second frequency while MPEG packet 2301 and/or MPEG packet 2303 are being fully and/or partially transmitted on the first frequency. In addition, MPEG packets 2301 and 2303 generally are time-division multiplexed and therefore are not transmitted contemporaneously. The octet fill order into MPEG packets affects the latency of packet transmission and delivery. Also, the data rates of the frequency channels (which normally are the same in cable networks, but could be different in other environments) as well as the amount of additional MPEG 2 information that is also being multiplexed on the same channel (using PIDs for other services) should be considered when deciding on an octet fill order to minimize latency in waiting to fill an MPEG packet before transmission.

Figure 24A:
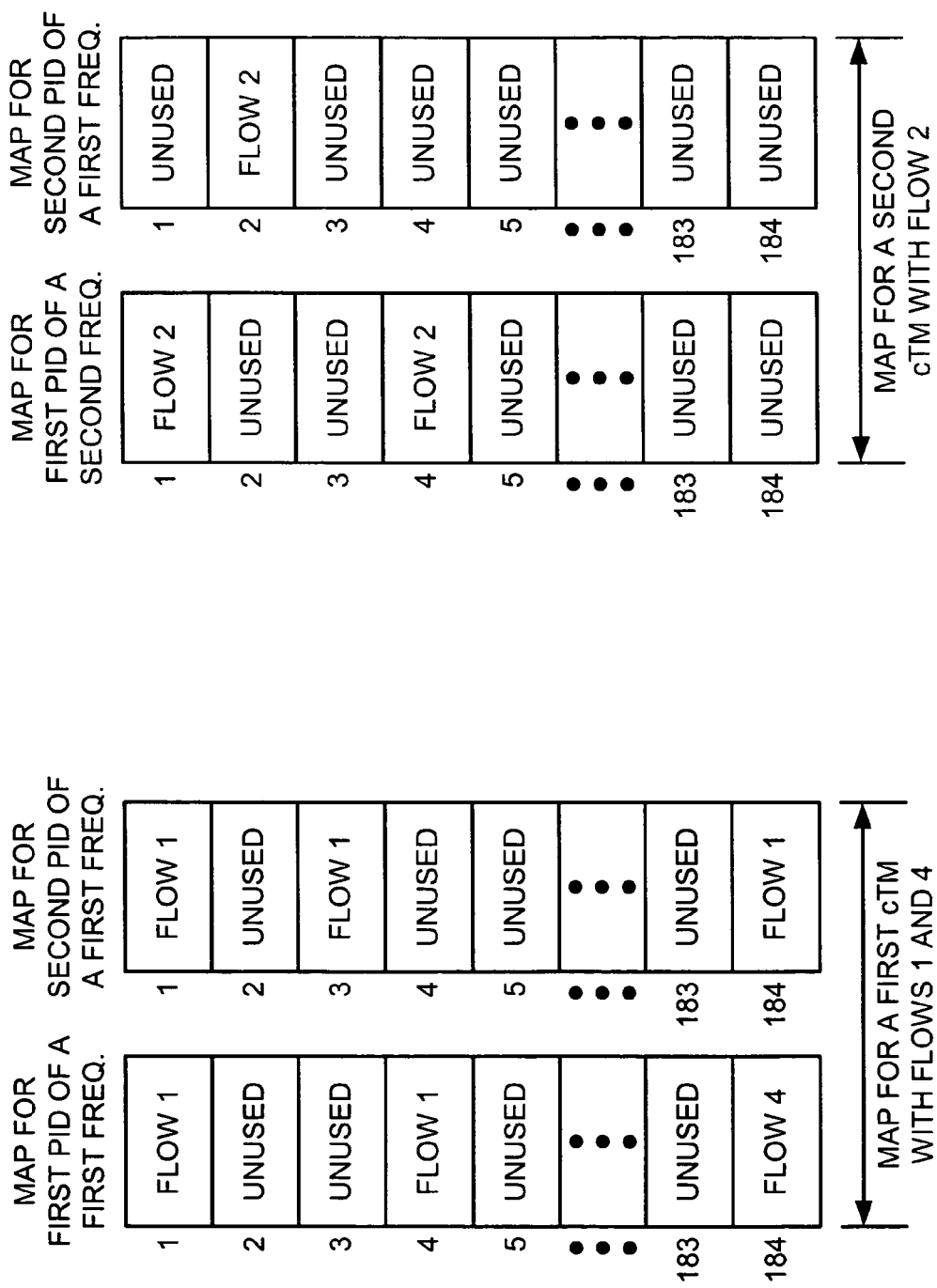
FIG. 24a shows non-limiting example partial maps for a first cTM and a second cTM.
Figure 24B:
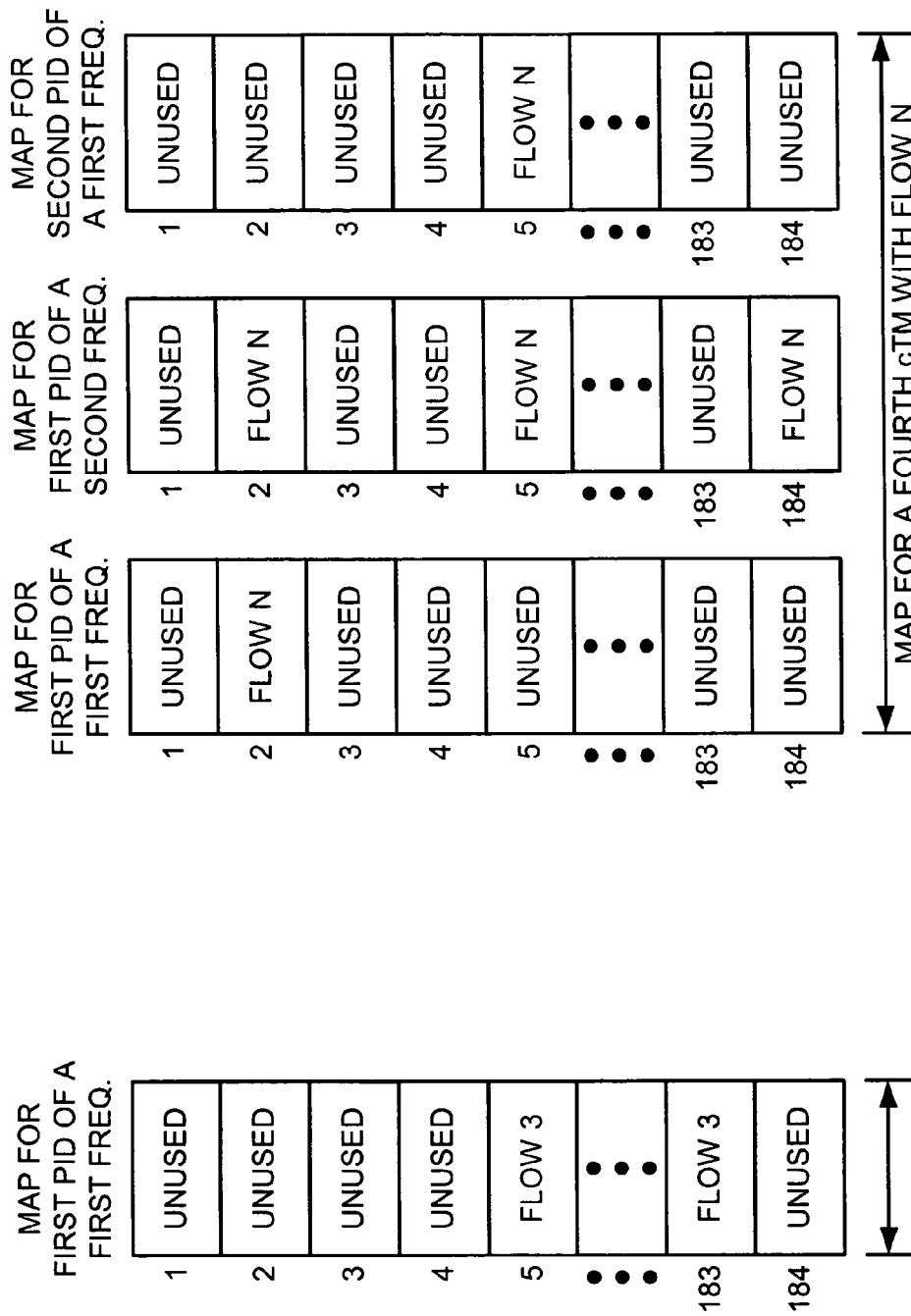
FIG. 24b shows non-limiting example partial maps for a third cTM and a fourth cTM.

Each cTM could have a complete copy of the full map in the TMTS from FIG. 22. However, such a scenario would allow one cTM to be able to determine the MPEG packet octets used by another cTM and possibly eavesdrop on the conversation. One non-limiting solution to this problem is to provide each cTM only with a partial map that just defines the octets needed for active data flows to the particular cTM. FIGS. 24*a* and 24*b* show partial maps that might be used by four different cTMs to only be able to determine the MPEG packet octets for data flows that are assigned to a particular cTM only. For example, FIG. 24*a* shows a partial map for a first cTM that has data flows 1 and 4 active. The partial map for the first cTM only includes entries from the full map of FIG. 22 for data flows 1 and 4 with the rest of the entries listed as unused. For the first cTM, MPEG packets with a first PID and a second PID on the first frequency are decoded to obtain the assigned octets. Thus, the first cTM decodes packets from two MPEG PIDs on the same frequency, and generally will need memory to support both the partial map for the first PID of a first frequency and the partial map for the second PID of the first frequency. In a non-limiting embodiment of the first cTM, the two data flows (1 and 4) for the first cTM could be used to support two logically separated 802.X interfaces on the cTM.

In addition, FIG. 24*a* shows a partial map for a second cTM that has data flow 2 active. The partial map for the second cTM only includes entries from the full map of FIG. 22 for data flow 2 with the rest of the entries listed as unused. For the second cTM, MPEG packets with a first PID on a second frequency and with a second PID on a first frequency are decoded to obtain the assigned octets. Thus, the second cTM decodes packets from two MPEG PIDs on two different frequencies, and generally will need memory to support both the partial map for the first PID of a second frequency and the partial map for the second PID of the first frequency. In addition, the second cTM generally will need two tuners and two demodulators to be able to contemporaneously tune in and demodulate the MPEG packets on two different frequencies. The additional cost of a second tuner and demodulator may be prohibitively costly to implement and meet market price points, but such an embodiment of a cTM is technically possible.

Furthermore, FIG. 24*b* shows a partial map for a third cTM that has data flow 3 active. The partial map for the third cTM only includes entries from the full map of FIG. 22 for data flow 3 with the rest of the entries listed as unused. For the third cTM, MPEG packets with a first PID on a first frequency are decoded to obtain the assigned octets. Thus, the third cTM decodes packets from only one MPEG PID on only one frequency, and generally will need memory to support only the partial map for the first PID of the first frequency. As the third cTM only utilizes a single frequency, it generally will only need one tuner and one demodulator, which would make such an implementation likely lower cost than a cTM with two tuners and two demodulators.

Also, FIG. 24*b* shows a partial map for a fourth cTM that has data flow N active. The partial map for the fourth cTM only includes entries from the full map of FIG. 22 for data flow N with the rest of the entries listed as unused. For the fourth cTM, MPEG packets with a first PID on a first frequency, with a first PID on a second frequency, and with a second PID on a first frequency are decoded to obtain the assigned octets. Thus, the fourth cTM decodes packets from three MPEG PIDs across two frequencies, and generally will need memory to support the partial map for the first PID of the first frequency, the partial map for the first PID of the second frequency, and the partial map for the second PID of the first frequency. In addition, the fourth cTM generally will need two tuners and two demodulators to be able to contemporaneously tune in and demodulate the MPEG packets on two different frequencies. The additional cost of a second tuner and demodulator may be prohibitively costly to implement and meet market price points, but such an embodiment of a cTM is technically possible.

While the partial maps of the cTMs in FIGS. 24*a* and 24*b* can be encoded using the same 0 to N values that are used for the full map of the TMTS in FIG. 22, such an encoding is not required. In FIGS. 22, 24a, and 24b, the data flows have been given global identifies from 1 to N with 0 capable of indicating an unused octet. However, identifiers for the data flows may be local to the TMTS and each cTM in a similar fashion to the way in which logical channel numbers (LCNs) may be local for X.25 devices, data link connection identifiers (DLCIs) may be local for frame relay devices, virtual path identifiers/virtual connection identifiers (VPI/VCI) may be local for asynchronous transfer mode (ATM) devices, and Q.931 call reference values may be local for narrowband integrated services digital network (ISDN) devices.

Therefore, the first cTM could use the local identifiers of 1 and 2 for the data flows that are identified as 1 and 4 by the TMTS with the values of 0, 1, and 2 indicating unused octets, data flow 1 octets, and data flow 4 octets respectively. Also, the second cTM could use the local identifier of 1 for the data flow that is identified as 2 by the TMTS with the values of 0 and 1 indicating unused octets and data flow 2 octets, respectively. In addition, the third cTM could use the local identifier of 1 for the data flow that is identified as 3 by the TMTS with the values of 0 and 1 indicating unused octets and data flow 3 octets, respectively. Moreover, the fourth cTM could use the local identifier of 1 for the data flow that is identified as N by the TMTS with the values of 0 and 1 indicating unused octets and data flow N octets, respectively. Furthermore, the partial map for the first cTM supporting the two data flows 1 and 4 could be further decomposed into two maps with one map only supporting data flow 1 (with 0 indicating unused octets and 1 indicating octets of data flow 1) and with one map only supporting data flow 4 (with 0 indicating unused octets and 1 indicating octets of data flow 4). Thus, the partial maps of the cTMs could be implemented as 184 single-bit or Boolean values for each data flow, each MPEG PID, and each frequency supported by a cTM.

In addition, the maps shown in FIGS. 22, 24a, and 24b have 184 entries each corresponding to the 184 payload octets in an MPEG packet. However, the embodiments of the present invention will work with other fixed-length packet sizes and types as well. In addition, other data structures could be used to contain the mapping information. In another non-limiting example, a linked list could be used that is sequentially accessed or transversed to fill the octets of an MPEG packet. Each item in the linked list might specify a starting octet number in the MPEG packet as well as a number of octets to copy from a specified data flow or to leave unused. Traversal of such a linked list could be used to fill the MPEG packet with octets from the plurality of data flows. In addition, all or portions of the linked list could be used to recover a data flow from MPEG packets in a receiver. One skilled in the art will be aware that other types of data structures also could be used to implement a mapping from data flows into the octets of fixed-length packets such as, but not limited to, the 184-octet MPEG packets.

FIGS. 25a, 25b, and 25c show a non-limiting example of an initial state for TMTS and cTM maps, communications and actions to change maps, and a final state for TMTS and cTM maps. Dashed line 2505 divides FIGS. 25a, 25, and 25c into TMTS and cTM sections. Also, dashed line 2506 in FIG. 25a divides the initial state for the TMTS and cTM maps from the communications and actions to change maps. In addition, dashed line 2507 in FIG. 25c divides the communications and actions to change maps from the final state for the TMTS and cTM maps.

As shown in FIG. 25a and 25c, the TMTS and each cTM generally have at least both an active or operational map and an inactive or non-operational map. For the initial TMTS state, map 1 2501 is active, while map 2 2502 is inactive. Also, in FIG. 25a the initial state for maps of two cTMs (cTM #1 and cTM #2) are shown. For cTM #1 map 1 2511 is active, while map 2 2512 is inactive. For cTM #2 map 1 2511 is active, while map 2 2512 is inactive. In FIGS. 25a, 25b, and 25c, only two cTMs are shown for example purposes. However, the concepts of the preferred embodiments of the present invention will work with one or more cTMs.

According to FIG. 25a, map changes generally begin in step 2532 with the TMTS updating the inactive map with a new or changed map. Next, the TMTS generally transmits at least the map changes to at least the cTMs that will be affected by the new or changed map in step 2534. The TMTS may send map updates to all cTMs, even those that will not have a change to the map of octets in MPEG transport streams with particular PIDs on particular frequency channels. However, at least the cTMs that will have a change to their allocated octets in MPEG packets should be informed of the upcoming change. Also, the TMTS may inform the cTMs only about changes to the maps or also could inform the cTMs about the revised map including any unchanged portions of the map. Furthermore, as described above, the TMTS could send the entire map to the cTMs or it could send only portions of the map to each cTM as a security precaution to reduce the ability of a cTM to eavesdrop on the communications of other cTMs on the broadcast RF channel carrying MPEG packets.

Arrow 2535 shows the map changes (and possibly relevant unchanged portions of the map as well) being communicated to at least the affected cTMs. In step 2536 at least the cTMs affected by the new map receive the map and store the changes to their inactive maps, which for the non-limiting case of cTM #1 and cTM #2 will be map 2 2512 and map 2 2522 respectively. After receiving the new map in step 2536, at least the affected cTMs send communication verifying correct receipt of the new map (i.e., that there were not errors in transmission) in step 2538. Arrow 2539 shows communication indicating verification of correct map receipt from at least the affected cTMs (i.e., the cTMs whose octet, PID, or frequency allocations will change when the new map becomes active).

In step 2542 the TMTS receives communication verifying receipt of the new map(s) from at least each of the affected cTMs. If the TMTS receives a negative acknowledgement from a cTM or if a cTM does not respond before a timeout period, the TMTS will assume that the new map(s) was not received at all or correctly at a cTM. As a result the TMTS will retransmit the new map to at least those cTMs that did not positively send a verification that the map(s) (or portions thereof) was received correctly. Once the TMTS is sure that the affected cTMs have each received the relevant portions of the changed map, the TMTS will transmit an indication to at least the affected cTMs to activate the new map in step 2544. Arrow 2547 shows that the command(s) to activate the new and/or revised map(s) are sent to at least the cTMs that will be affected by changes from the old map(s) to the new map(s). In step 2546, the TMTS activates the new map(s). Also in step 2548 at least the affected cTMs receive indication to activate the new map(s), which are then activated by at least the affected cTMs in step 2552. The relative timing of the activation of new map(s) in the TMTS in step 2546 and activation of the new map(s) in at least the affected cTMs in step 2552 should be implemented such that the TMTS and cTMs have a consistent view of the map(s) when the cTMs are receiving MPEG packets formed by the TMTS according to the particular active map(s). Given the transmission propagation delay, the TMTS could change map(s) and start sending packets using the new map(s) before the cTMs have activated their new map(s). The cTMs should activate their new map(s)

before processing incoming MPEG packets that were formed by the TMTS using the new map(s).

As another check on the proper distribution and activation of the octet allocation maps, in step 2554 at least the affected cTMs transmit an indication that the new map(s) has been activated. Arrow 2555 shows communication of verification of map activation from at least each of the affected cTMs. In step 2556 the TMTS receives communication verifying activation of the new map from at least each of the affected cTMs. If the TMTS does not receive verification of map activation from at least each of the affected cTMs (after a timeout or due to negative acknowledgements from one or more cTMs), then the TMTS would revert back to the previous map and send messages to the cTMs that changed maps to revert back to the previous map. If successful in changing the map(s), FIG. 25*c* shows the final state after the map change. In the final state shown in FIG. 25*c*, map 2 2502 of the TMTS is active, and map 1 2501 is inactive. Also, map 2 2512 of cTM #1 is active, and map 1 2511 of cTM #1 is inactive. In addition, map 2 2522 of cTM #2 is active, and map 1 2521 of cTM #2 is inactive.

FIGS. 25*a*, 25*b*, and 25*c* show one non-limiting embodiment for changing the active map, and one skilled in the art will be aware of variations in the order of performing the actions as well as different mechanisms such as, but not limited to, positive acknowledgements, negative acknowledgements, timeouts, and retransmissions that can be used to verify receipt of new map(s) or map changes and to verify receipt of commands to activate the new map(s).

One skilled in the art will recognize that the concepts of the preferred embodiments of the present invention can be scaled to utilize any number (from one to infinity) of frequency channels. Actual implementations of preferred embodiments of the present invention generally would be built with a number of tuners and/or transmitters based upon expected customer demands as well as the costs of adding additional hardware, logic, and/or circuitry to support the additional tuners and/or transmitters in a TMTS and/or a cTM.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, at least the following is claimed:

1. A method of multiplexing a plurality of incoming data flows into a plurality of outgoing packets, the method comprising:
    copying a first octet from a first incoming data flow into an outgoing packet;
    copying a second octet from a second incoming data flow into the outgoing packet, wherein the first octet and the second octet are placed into the outgoing packet according to a map, wherein the map specifies locations by incoming data flow number and octet number within the outgoing packet for octets associated with the first and second incoming data flows, and wherein the map further comprises packet identifiers (PIDs) and frequencies, and wherein the combination of PID, frequency, incoming data flow number, octet number, and specified location allows the octets from the first and second incoming data flows to be time division multiplexed, frequency division multiplexed, and/or copied into specified locations in the plurality of outgoing packets;
    copying a third octet from the first incoming data flow into the outgoing packet, the first octet and the third octet being contiguous in the first incoming data flow and being copied based on the map into noncontiguous locations in the outgoing packet;
    wherein the method is performed simultaneously for octets copied from the first and second incoming data flows to a second outgoing packet according the map, and wherein the outgoing packet and the second outgoing packet are transmitted on different frequencies.

2. The method of claim 1, wherein the outgoing packet is fixed length.

3. The method of claim 2, wherein the fixed length outgoing packet is an MPEG packet.

4. The method of claim 1, wherein the first octet and the third octet of the first incoming data flow are part of a single incoming packet from the first incoming data flow.

5. The method of claim 4, wherein the single incoming packet is an Ethernet packet.

6. The method of claim 4, wherein the single incoming packet is an Internet Protocol (IP) datagram.

7. The method of claim 4, wherein the single incoming packet is an Asynchronous Transfer Mode (ATM) cell.

8. The method of claim 4, wherein the single incoming packet is a frame relay frame.

9. The method of claim 1, wherein the PIDs are associated with the data flow number and octet number for octets from the first and second incoming data flows, wherein if the octets from the first and second incoming data flows arc associated with the PID of the outgoing packet then the associated octets are copied into the outgoing packet according to the specified locations in the map.

10. The method of claim 9, wherein one or more octets from each of the first and second incoming data flows associated with a first PID and copied into the outgoing packet are also associated with a second PID and the one or more octets are copied into the second outgoing packet according to the specified locations in the map.

11. The method of claim 1, wherein one of the frequencies in the map comprises a first frequency that associates the first and second octets with a first channel.

12. The method of claim 11, wherein one of the frequencies in the map comprises a second frequency that associates the third octet with a second channel.

13. The method of claim 12, wherein the first, second, and third octets are frequency division multiplexed over the first and second channels.

14. The method of claim 12, wherein two or more octets from the first incoming data flow are transmitted contemporaneously over the first and second channels.

15. A method of demultiplexing a plurality of incoming packets into at least two outgoing data flows, the method comprising:
    copying a first octet from an incoming packet into a first outgoing data flow;
    copying a second octet from the incoming packet into a second outgoing data flow, wherein the first octet and the second octet are obtained from the incoming packet according to a map, wherein the map specifies locations by data flow number and octet number within the incoming packet for octets associated with the first and second outgoing data flows, and wherein the map further comprises packet identifiers (PIDs) and frequencies, wherein the combination of PID, frequency, data flow number, octet number, and specified location allows the octets from the plurality of incoming packets to be time division demultiplexed, frequency division demultiplexed, and/or copied into specified locations into the at least two outgoing data flows; and copying a third octet from the incoming packet into the first outgoing data flow, the first octet and the third octet being in noncontiguous locations in the incoming packet and being copied based on the map into contiguous locations in the first outgoing data flow;

wherein the method is performed simultaneously to copy octets in a second incoming packet to the first and second outgoing data flows according the map, and wherein the incoming packet and the second incoming packet are received on different frequencies.

16. The method of claim 15, wherein the incoming packet is fixed length.

17. The method of claim 16, wherein the fixed length incoming packet is an MPEG packet.

18. The method of claim 15, wherein the first octet and the third octet in the first outgoing data flow are part of a single outgoing packet.

19. The method of claim 18, wherein the single outgoing packet is an Ethernet packet.

20. The method of claim 18, wherein the single outgoing packet is an Internet Protocol (IP) datagram.

21. The method of claim 18, wherein the single outgoing packet is an Asynchronous Transfer Mode (ATM) cell.

22. The method of claim 18, wherein the single outgoing packet is a frame relay frame.

23. A device that multiplexes a plurality of incoming data flows into a plurality of outgoing packets, the device comprising:

logic configured to copy a first octet from a first incoming data flow into an outgoing packet;

logic configured to copy a second octet from a second incoming data flow into the outgoing packet, wherein the first octet and the second octet are placed into the outgoing packet according to a map, wherein the map specifies locations by data flow number and octet number within the outgoing packet for octets associated with the first and second incoming data flows, and wherein the map further comprises packet identifiers (PIDs) and frequencies, and wherein the combination of PID, frequency, incoming data flow number, octet number, and specified location allows the octets from the first and second incoming data flows to be time division multiplexed, frequency division multiplexed, and/or copied into specified locations in the plurality of outgoing packets;

logic configured to copy a third octet from the first incoming data flow into the outgoing packet, the first octet and the third octet being contiguous in the first incoming data flow and being copied based on the map into noncontiguous locations in the outgoing packet; and logic configured to copy other octets from the first and second incoming data flows to a second outgoing packet according the map, and wherein the outgoing packet and the second outgoing packet are transmitted on different frequencies.

24. The device of claim 23, wherein the outgoing packet is fixed length.

25. The device of claim 24, wherein the fixed length outgoing packet is an MPEG packet.

26. The device of claim 23, wherein the first octet and the third octet of the first incoming data flow are part of a single incoming packet from the first incoming data flow.

27. The device of claim 26, wherein the single incoming packet is an Ethernet packet.

28. The device of claim 26, wherein the single incoming packet is an Internet Protocol (IP) datagram.

29. The device of claim 26, wherein the single incoming packet is an Asynchronous Transfer Mode (ATM) cell.

30. The device of claim 26, wherein the single incoming packet is a frame relay frame.

31. The device of claim 23, wherein the PIDs are associated with the data flow number and octet number for octets from the first and second incoming data flows, wherein if the octets from the first and second incoming data flows are associated with the PID of the outgoing packet then the associated octets are copied into the outgoing packet according to the specified locations in the map.

32. The device of claim 23, wherein one or more octets from each of the first and second incoming data flows associated with a first PID and copied into the outgoing packet are also associated with a second PID and the one or more octets are copied into the second outgoing packet according to the specified locations in the map.

33. The device of claim 23, wherein the map comprises a first frequency that associates the first and second octets with a first channel and comprises a second frequency that associates the third octet with a second channel, wherein the first, second, and third octets are frequency division multiplexed over the first and second channels.

34. The device of claim 33, wherein two or more octets from the first incoming data flow are transmitted contemporaneously over the first and second channels.

35. A device that demultiplexes a plurality of incoming packets into at least two outgoing data flows, the device comprising:

logic configured to copy a first octet from an incoming packet into a first outgoing data flow;

logic configured to copy a second octet from the incoming packet into a second outgoing data flow, wherein the first octet and the second octet are obtained from the incoming packet according to a map, wherein the map specifies locations by data flow number and octet number within the incoming packet for octets associated with the first and second outgoing data flows, and wherein the map further comprises packet identifiers (PIDs) and frequencies, wherein the combination of PID, frequency, data flow number, octet number, and specified location allows the octets from the plurality of incoming packets to be time division demultiplexed, frequency division demultiplexed, and/or copied into specified locations into the at least two outgoing data flows;

logic configured to copy a third octet from the incoming packet into the first outgoing data flow, the first octet and the third octet being in noncontiguous locations in the incoming packet and being copied based on the map into contiguous locations in the first outgoing data flow; and logic configured to copy octets from a second incoming packet to the first and second outgoing data flows according the map, wherein the incoming packet and the second incoming packet are received on different frequencies.

36. The device of claim 35, wherein the incoming packet is fixed length.

37. The device of claim 36, wherein the fixed length incoming packet is an MPEG packet.

38. The device of claim 35, wherein the first octet and the third octet in the first outgoing data flow are part of a single outgoing packet.

39. The device of claim 38, wherein the single outgoing packet is an Ethernet packet.

40. The device of claim 38, wherein the single outgoing packet is an Internet Protocol (IP) datagram.

41. The device of claim 38, wherein the single outgoing packet is an Asynchronous Transfer Mode (ATM) cell.

42. The device of claim 38, wherein the single outgoing packet is a frame relay frame.

* * * * *